US011277844B2

(12) United States Patent
Fakoorian et al.

(10) Patent No.: US 11,277,844 B2
(45) Date of Patent: Mar. 15, 2022

(54) COORDINATION OF SEMI-PERSISTENT SCHEDULING DOWNLINK TRANSMISSIONS AND DYNAMIC DOWNLINK TRANSMISSIONS

(71) Applicant: QUALCOMM Incorporated, San Diego, CA (US)

(72) Inventors: Seyed Ali Akbar Fakoorian, San Diego, CA (US); Jing Sun, San Diego, CA (US); Tao Luo, San Diego, CA (US); Xiaoxia Zhang, San Diego, CA (US); Yan Zhou, San Diego, CA (US); Sony Akkarakaran, Poway, CA (US); Wei Yang, San Diego, CA (US); Vinay Joseph, Calicut (IN); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 16/992,999

(22) Filed: Aug. 13, 2020

(65) Prior Publication Data

US 2021/0051670 A1    Feb. 18, 2021

Related U.S. Application Data

(60) Provisional application No. 62/888,135, filed on Aug. 16, 2019.

(51) Int. Cl.
*H04W 72/04* (2009.01)
*H04W 72/14* (2009.01)
(Continued)

(52) U.S. Cl.
CPC ....... *H04W 72/0493* (2013.01); *H04L 1/1854* (2013.01); *H04W 72/044* (2013.01);
(Continued)

(58) Field of Classification Search
CPC ........... H04W 72/0493; H04W 72/044; H04W 72/1257; H04W 72/1273; H04W 72/14;
(Continued)

(56) References Cited

U.S. PATENT DOCUMENTS 8,432,845 B2 * 4/2013 Yu ...................... H04W 72/042
370/311
8,830,938 B2 * 9/2014 Wang ................ H04W 72/1231
370/329

(Continued)

OTHER PUBLICATIONS

Huawei et al. "Discussions on Remaining Issues for SPS", 3GPP TSG RAN WG2 Meeting #96, R2-167930, 6 pages (Year: 2016).*

(Continued)

*Primary Examiner* — Ivan O Latorre
(74) *Attorney, Agent, or Firm* — Holland & Hart LLP

(57) ABSTRACT

Methods, systems, and devices for wireless communication are described. Generally, the described techniques provide for efficiently scheduling semi-persistent scheduling (SPS) downlink transmissions and dynamic downlink transmissions to maximize throughput in a wireless communications system. In one example, a user equipment (UE) may receive downlink data in a dynamic downlink transmission and receive the same downlink data or no data in an SPS downlink transmission when the dynamic downlink transmission is scheduled to occur after the SPS downlink transmission and before an uplink feedback transmission for the SPS downlink transmission. In another example, a UE may receive downlink data in a dynamic downlink transmission and receive the same downlink data or no downlink data in an SPS downlink transmission when the SPS downlink transmission is scheduled to occur after the dynamic downlink transmission and before an uplink feedback transmission for the dynamic downlink transmission.

29 Claims, 24 Drawing Sheets

US 11,277,844 B2
Page 2

(51) Int. Cl.
*H04L 1/18* (2006.01)
*H04W 72/12* (2009.01)

(52) U.S. Cl.
CPC ... *H04W 72/1257* (2013.01); *H04W 72/1273* (2013.01); *H04W 72/14* (2013.01)

(58) Field of Classification Search
CPC ............. H04W 72/1242; H04L 1/1854; H04L 1/1822; H04L 1/1848; H04L 1/1864
See application file for complete search history.

(56) References Cited

U.S. PATENT DOCUMENTS

| | | | |
|---|---|---|---|
| 9,999,039 B2* | 6/2018 | Vajapeyam | H04W 72/04 |
| 10,264,595 B2* | 4/2019 | Li | H04W 72/1242 |
| 10,667,267 B2* | 5/2020 | Li | H04W 52/281 |
| 10,798,731 B2* | 10/2020 | Lee | H04L 1/1822 |
| 10,979,200 B2* | 4/2021 | Yang | H04L 1/1861 |
| 2008/0310333 A1* | 12/2008 | Balachandran | H04L 1/1812 370/310 |
| 2009/0287976 A1* | 11/2009 | Wang | H04L 1/1812 714/748 |
| 2010/0075690 A1* | 3/2010 | Wu | H04W 72/042 455/452.1 |
| 2013/0201841 A1* | 8/2013 | Zhang | H04L 5/0055 370/252 |
| 2015/0098371 A1* | 4/2015 | Vajapeyam | H04L 1/1861 370/280 |
| 2016/0242176 A1* | 8/2016 | Sun | H04W 76/27 |
| 2017/0026942 A1* | 1/2017 | Vajapeyam | H04W 72/0446 |
| 2017/0034850 A1 | 2/2017 | Rico Alvarino et al. | |
| 2017/0289733 A1* | 10/2017 | Rajagopal | H04W 4/70 |
| 2017/0303302 A1* | 10/2017 | Bagheri | H04W 72/1284 |
| 2018/0049229 A1* | 2/2018 | Dinan | H04L 1/1896 |
| 2019/0069285 A1* | 2/2019 | Chandrasekhar | H04B 7/0695 |
| 2019/0075585 A1* | 3/2019 | Deogun | H04W 72/1273 |
| 2019/0254045 A1* | 8/2019 | Sadiq | H04W 72/0446 |
| 2019/0254053 A1* | 8/2019 | Ying | H04W 72/042 |
| 2019/0373630 A1* | 12/2019 | Gupta | H04W 72/042 |
| 2020/0059829 A1* | 2/2020 | Joseph | H04W 36/0011 |
| 2020/0112964 A1* | 4/2020 | Yang | H04L 5/0051 |
| 2020/0163067 A1* | 5/2020 | Phan | H04W 4/46 |
| 2020/0169364 A1* | 5/2020 | Hao | H04L 5/14 |
| 2020/0296757 A1* | 9/2020 | Feng | H04W 72/042 |
| 2020/0305138 A1* | 9/2020 | Li | H04W 72/042 |
| 2020/0337031 A1* | 10/2020 | Niu | H04W 72/042 |
| 2020/0351884 A1* | 11/2020 | Li | H04W 52/34 |
| 2020/0374748 A1* | 11/2020 | Ahn | H04L 1/1822 |
| 2021/0037484 A1* | 2/2021 | Zhou | H04W 52/325 |
| 2021/0083806 A1* | 3/2021 | Zou | H04L 1/1896 |
| 2021/0084650 A1* | 3/2021 | Fan | H04L 5/0055 |
| 2021/0160917 A1* | 5/2021 | Goto | H04W 72/0446 |
| 2021/0274519 A1* | 9/2021 | Fakoorian | H04W 76/36 |

OTHER PUBLICATIONS

NTT DOCOMO, "On URLLC Scheduling and HARQ Mechanism", 3GPP TSG RAN WG1 Meeting #87, R1-1612713, 9 pages (Year: 2016).*
Nokia (Rapporteur): "E-mail Discussion Summary [103bis#41] [NR/IIoT] Intra-UE Prioritization (Nokia)", 3GPP Draft, 3GPP TSG-RAN WG2 #104, R2-1817579, 3rd Generation Partnership Project (3GPP), Mobile Competence Centre, 650, Route Des Lucioles, F-06921 Sophia-Antipolis Cedex, France, Nov. 16, 2018 (Nov. 16, 2018), pp. 1-48, XP051481479, Retrieved from the Internet: URL:http://www.3gpp.org/ftp/tsg%5Fran/WG2%5FRL2/TSGR2%5F104/Docs/R2%2D1817579%2Ezip, http://www.3gpp.org/ftp/tsg%5Fran/WG2%5FRL2/TSGR2%5F104/Docs/R2%2D1817579%2Ezip[retrieved on Nov. 12, 2018] Paragraph [02.1],Sections 2.3 to 2.6.
Partial International Search Report—PCT/US2020/046531—ISA/EPO—Nov. 2, 2020.
International Search Report and Written Opinion—PCT/US2020/046531—ISA/EPO—Dec. 23, 2020.

* cited by examiner

COORDINATION OF SEMI-PERSISTENT SCHEDULING DOWNLINK TRANSMISSIONS AND DYNAMIC DOWNLINK TRANSMISSIONS

CROSS REFERENCE

The present application for patent claims the benefit of U.S. Provisional Patent Application No. 62/888,135 by FAKOORIAN et al., entitled "COORDINATION OF SEMI-PERSISTENT SCHEDULING DOWNLINK TRANSMISSIONS AND DYNAMIC DOWNLINK TRANSMISSIONS," filed Aug. 16, 2019, assigned to the assignee hereof, and expressly incorporated by reference herein.

BACKGROUND

The following relates generally to wireless communications and more specifically to coordination of semi-persistent scheduling (SPS) downlink transmissions and dynamic downlink transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipments (UEs). In some wireless communications systems, a base station may use semi-static grants to schedule multiple downlink transmissions to a UE. Such scheduling may be referred to as SPS and may be used to limit overhead and processing latency in a wireless communications system, since semi-static grants may be transmitted less frequently than dynamic grants. In some cases, a base station may support a large number of SPS configurations for downlink SPS transmissions to a UE, and the periodicities between the downlink SPS transmissions in some configurations may be short. In such cases, downlink SPS transmissions may be scheduled frequently, and it may be challenging for the base station to also schedule dynamic downlink transmissions or retransmissions, especially when the number of HARQ process identifiers (IDs) available for these downlink transmissions are limited and may conflict.

SUMMARY

The described techniques relate to improved methods, systems, devices, and apparatuses that support coordination of semi-persistent scheduling (SPS) downlink transmissions and dynamic downlink transmissions. Generally, the described techniques provide for efficiently scheduling SPS downlink transmissions and dynamic downlink transmissions to maximize throughput in a wireless communications system. In one example, a UE may receive downlink data in a dynamic downlink transmission and receive the same downlink data or no data in an SPS downlink transmission when the dynamic downlink transmission is scheduled to occur after the SPS downlink transmission and before an uplink feedback transmission for the SPS downlink transmission. In another example, a UE may receive downlink data in a dynamic downlink transmission and receive the same downlink data or no downlink data in an SPS downlink transmission when the SPS downlink transmission is scheduled to occur after the dynamic downlink transmission and before an uplink feedback transmission for the dynamic downlink transmission. Additional techniques are also described for handling the collision of SPS downlink transmissions and dynamic downlink transmissions and the collision of uplink feedback transmissions.

A method of wireless communication at a UE is described. The method may include receiving a downlink grant scheduling a dynamic downlink transmission from a base station, identifying a semi-persistent scheduling occasion allocated for a semi-persistent scheduling downlink transmission from the base station, the semi-persistent scheduling downlink transmission being associated with a same feedback process identifier as the dynamic downlink transmission, determining that the dynamic downlink transmission is scheduled to occur after the semi-persistent scheduling downlink transmission and before an uplink feedback transmission for the semi-persistent scheduling downlink transmission, receiving first downlink data in the dynamic downlink transmission, and receiving either the first downlink data or no data in the semi-persistent scheduling downlink transmission based on the determining.

An apparatus for wireless communication at a UE is described. The apparatus may include a processor, memory coupled with the processor, and instructions stored in the memory. The instructions may be executable by the processor to cause the apparatus to receive a downlink grant scheduling a dynamic downlink transmission from a base station, identify a semi-persistent scheduling occasion allocated for a semi-persistent scheduling downlink transmission from the base station, the semi-persistent scheduling downlink transmission being associated with a same feedback process identifier as the dynamic downlink transmission, determine that the dynamic downlink transmission is scheduled to occur after the semi-persistent scheduling downlink transmission and before an uplink feedback transmission for the semi-persistent scheduling downlink transmission, receive first downlink data in the dynamic downlink transmission, and receive either the first downlink data or no data in the semi-persistent scheduling downlink transmission based on the determining.

Another apparatus for wireless communication at a UE is described. The apparatus may include means for receiving a downlink grant scheduling a dynamic downlink transmission from a base station, identifying a semi-persistent scheduling occasion allocated for a semi-persistent scheduling downlink transmission from the base station, the semi-persistent scheduling downlink transmission being associated with a same feedback process identifier as the dynamic downlink transmission, determining that the dynamic downlink transmission is scheduled to occur after the semi-persistent scheduling downlink transmission and before an uplink feedback transmission for the semi-persistent scheduling downlink transmission, receiving first downlink data in the dynamic downlink transmission, and receiving either the first downlink data or no data in the semi-persistent scheduling downlink transmission based on the determining.

A non-transitory computer-readable medium storing code for wireless communication at a UE is described. The code may include instructions executable by a processor to receive a downlink grant scheduling a dynamic downlink transmission from a base station, identify a semi-persistent scheduling occasion allocated for a semi-persistent scheduling downlink transmission from the base station, the semi-persistent scheduling downlink transmission being associated with a same feedback process identifier as the dynamic downlink transmission, determine that the dynamic downlink transmission is scheduled to occur after the semi-persistent scheduling downlink transmission and before an uplink feedback transmission for the semi-persistent scheduling downlink transmission, receive first downlink data in the dynamic downlink transmission, and receive either the first downlink data or no data in the semi-persistent scheduling downlink transmission based on the determining.

Some examples of the method, apparatuses, and non-transitory computer-readable medium described herein may further include operations, features, means, or instructions for determining that the dynamic downlink transmission includes a retransmission of the first downlink data, and combining the first downlink data received in the semi-persistent scheduling downlink transmission with the first downlink data received in the dynamic downlink transmission. Some examples of the method, apparatuses, and non-transitory computer-readable medium described herein may further include operations, features, means, or instructions for avoiding monitoring for downlink data in the semi-persistent scheduling occasion. In some examples of the method, apparatuses, and non-transitory computer-readable medium described herein, avoiding monitoring for downlink data in the semi-persistent scheduling occasion may include operations, features, means, or instructions for starting a timer associated with the feedback process identifier upon receiving the downlink grant for the dynamic downlink transmission, and avoiding monitoring for semi-persistent scheduling downlink transmissions associated with the same feedback process identifier as the dynamic downlink transmission for the duration of the timer.

In some examples of the method, apparatuses, and non-transitory computer-readable medium described herein, determining that the dynamic downlink transmission may be scheduled to occur after the semi-persistent scheduling downlink transmission and before the uplink feedback transmission for the semi-persistent scheduling downlink transmission may include operations, features, means, or instructions for determining that the semi-persistent scheduling occasion overlaps in time with the downlink grant or that the semi-persistent scheduling occasion may be between the downlink grant and the dynamic downlink transmission. Some examples of the method, apparatuses, and non-transitory computer-readable medium described herein may further include operations, features, means, or instructions for transmitting the uplink feedback transmission for the semi-persistent scheduling downlink transmission, and transmitting an uplink feedback transmission for the dynamic downlink transmission.

In some examples of the method, apparatuses, and non-transitory computer-readable medium described herein, the uplink feedback transmission may include operations, features, means, or instructions for transmitting the single uplink feedback transmission for the semi-persistent scheduling downlink transmission and the dynamic downlink transmission. In some examples of the method, apparatuses, and non-transitory computer-readable medium described herein, the single uplink feedback transmission for the semi-persistent scheduling downlink transmission and the dynamic downlink transmission may be transmitted on an uplink control channel allocated in the downlink grant. In some examples of the method, apparatuses, and non-transitory computer-readable medium described herein, the single uplink feedback transmission for the semi-persistent scheduling downlink transmission and the dynamic downlink transmission includes individual feedback for each of the semi-persistent scheduling downlink transmission and the dynamic downlink transmission, combined feedback for the semi-persistent scheduling downlink transmission and the dynamic downlink transmission, or a combination thereof.

Some examples of the method, apparatuses, and non-transitory computer-readable medium described herein may further include operations, features, means, or instructions for determining whether the semi-persistent scheduling downlink transmission or a previous semi-persistent scheduling downlink transmission may be an initial transmission of the first downlink data. Some examples of the method, apparatuses, and non-transitory computer-readable medium described herein may further include operations, features, means, or instructions for determining that the semi-persistent scheduling downlink transmission may be the initial transmission of the first downlink data, and combining the first downlink data received in the semi-persistent scheduling downlink transmission with the first downlink data received in the dynamic downlink transmission. In some examples of the method, apparatuses, and non-transitory computer-readable medium described herein, determining that the semi-persistent scheduling downlink transmission may be the initial transmission of the first downlink data may include operations, features, means, or instructions for determining that the downlink grant overlaps with the semi-persistent scheduling occasion or that the number of symbols between the downlink grant and the semi-persistent scheduling occasion may be below a threshold.

In some examples of the method, apparatuses, and non-transitory computer-readable medium described herein, the threshold may be based on a capability of the UE. Some examples of the method, apparatuses, and non-transitory computer-readable medium described herein may further include operations, features, means, or instructions for determining that the previous semi-persistent scheduling downlink transmission may be the initial transmission of the first downlink data, and combining the first downlink data received in the semi-persistent scheduling downlink transmission and the previous semi-persistent scheduling downlink transmission with the first downlink data received in the dynamic downlink transmission. In some examples of the method, apparatuses, and non-transitory computer-readable medium described herein, determining that the previous semi-persistent scheduling downlink transmission may be the initial transmission of the downlink data may include operations, features, means, or instructions for determining that the downlink grant fails to overlap with the semi-persistent scheduling occasion or that the number of symbols between the downlink grant and the semi-persistent scheduling occasion may be above a threshold.

In some examples of the method, apparatuses, and non-transitory computer-readable medium described herein, the threshold may be based on a capability of the UE. In some examples of the method, apparatuses, and non-transitory computer-readable medium described herein, determining whether the semi-persistent scheduling downlink transmission or the previous semi-persistent scheduling downlink transmission may be the initial transmission of the first downlink data may include operations, features, means, or instructions for receiving downlink control information that indicates whether the semi-persistent scheduling downlink transmission or the previous semi-persistent scheduling downlink transmission may be the initial transmission of the first downlink data. In some examples of the method, apparatuses, and non-transitory computer-readable medium described herein, the downlink control information includes a bit that indicates whether the semi-persistent scheduling downlink transmission or the previous semi-persistent scheduling downlink transmission may be the initial transmission of the first downlink data.

In some examples of the method, apparatuses, and non-transitory computer-readable medium described herein, the downlink control information includes an indication of a redundancy version associated with the dynamic downlink transmission, and the redundancy version indicates whether the semi-persistent scheduling downlink transmission or the previous semi-persistent scheduling downlink transmission may be the initial transmission of the first downlink data. In some examples of the method, apparatuses, and non-transitory computer-readable medium described herein, a redundancy version index of zero indicates that the semi-persistent scheduling downlink transmission that overlaps with the downlink grant or starts after the downlink grant may be received may be the initial transmission of the first downlink data. In some examples of the method, apparatuses, and non-transitory computer-readable medium described herein, the redundancy version associated with the dynamic downlink transmission may be preconfigured.

In some examples of the method, apparatuses, and non-transitory computer-readable medium described herein, a non-zero redundancy version index indicates that the previous semi-persistent scheduling downlink transmission that ends before the downlink grant may be received may be the initial transmission of the first downlink data. In some examples of the method, apparatuses, and non-transitory computer-readable medium described herein, the redundancy version associated with the dynamic downlink transmission corresponds to the non-zero redundancy version index. In some examples of the method, apparatuses, and non-transitory computer-readable medium described herein, no data may be received in the semi-persistent scheduling downlink transmission, and a closest, previous semi-persistent scheduling downlink transmission that ends before the downlink grant may be received may be an initial transmission of the downlink data.

Some examples of the method, apparatuses, and non-transitory computer-readable medium described herein may further include operations, features, means, or instructions for determining that a first uplink control channel allocated for the uplink feedback transmission for the semi-persistent scheduling downlink transmission overlaps in time with a second uplink control channel allocated for an uplink feedback transmission for the dynamic downlink transmission. Some examples of the method, apparatuses, and non-transitory computer-readable medium described herein may further include operations, features, means, or instructions for avoiding transmitting the uplink feedback transmission for the semi-persistent scheduling downlink transmission on the first uplink control channel and transmitting the uplink feedback transmission for the dynamic downlink transmission on the second uplink control channel; or, and transmitting the uplink feedback transmission for the semi-persistent scheduling downlink transmission on the first uplink control channel and transmitting the uplink feedback transmission for the dynamic downlink transmission on the second uplink control channel.

A method of wireless communication at a base station is described. The method may include transmitting a downlink grant scheduling a dynamic downlink transmission to a UE, identifying a semi-persistent scheduling occasion allocated for a semi-persistent scheduling downlink transmission to the UE, the semi-persistent scheduling downlink transmission being associated with a same feedback process identifier as the dynamic downlink transmission, determining that the dynamic downlink transmission is scheduled to occur after the semi-persistent scheduling downlink transmission and before an uplink feedback transmission from the UE for the semi-persistent scheduling downlink transmission, transmitting first downlink data in the dynamic downlink transmission, and transmitting either the first downlink data or no data in the semi-persistent scheduling downlink transmission based on the determining.

An apparatus for wireless communication at a base station is described. The apparatus may include a processor, memory coupled with the processor, and instructions stored in the memory. The instructions may be executable by the processor to cause the apparatus to transmit a downlink grant scheduling a dynamic downlink transmission to a UE, identify a semi-persistent scheduling occasion allocated for a semi-persistent scheduling downlink transmission to the UE, the semi-persistent scheduling downlink transmission being associated with a same feedback process identifier as the dynamic downlink transmission, determine that the dynamic downlink transmission is scheduled to occur after the semi-persistent scheduling downlink transmission and before an uplink feedback transmission from the UE for the semi-persistent scheduling downlink transmission, transmit first downlink data in the dynamic downlink transmission, and transmit either the first downlink data or no data in the semi-persistent scheduling downlink transmission based on the determining.

Another apparatus for wireless communication at a base station is described. The apparatus may include means for transmitting a downlink grant scheduling a dynamic downlink transmission to a UE, identifying a semi-persistent scheduling occasion allocated for a semi-persistent scheduling downlink transmission to the UE, the semi-persistent scheduling downlink transmission being associated with a same feedback process identifier as the dynamic downlink transmission, determining that the dynamic downlink transmission is scheduled to occur after the semi-persistent scheduling downlink transmission and before an uplink feedback transmission from the UE for the semi-persistent scheduling downlink transmission, transmitting first downlink data in the dynamic downlink transmission, and transmitting either the first downlink data or no data in the semi-persistent scheduling downlink transmission based on the determining.

A non-transitory computer-readable medium storing code for wireless communication at a base station is described. The code may include instructions executable by a processor to transmit a downlink grant scheduling a dynamic downlink transmission to a UE, identify a semi-persistent scheduling occasion allocated for a semi-persistent scheduling downlink transmission to the UE, the semi-persistent scheduling downlink transmission being associated with a same feedback process identifier as the dynamic downlink transmission, determine that the dynamic downlink transmission is scheduled to occur after the semi-persistent scheduling downlink transmission and before an uplink feedback transmission from the UE for the semi-persistent scheduling downlink transmission, transmit first downlink data in the dynamic downlink transmission, and transmit either the first downlink data or no data in the semi-persistent scheduling downlink transmission based on the determining.

Some examples of the method, apparatuses, and non-transitory computer-readable medium described herein may further include operations, features, means, or instructions for starting a timer associated with the feedback process identifier upon transmitting the downlink grant for the dynamic downlink transmission, and avoiding transmitting semi-persistent scheduling downlink transmissions associated with the same feedback process identifier as the dynamic downlink transmission for the duration of the timer. In some examples of the method, apparatuses, and non-transitory computer-readable medium described herein, determining that the dynamic downlink transmission may be scheduled to occur after the semi-persistent scheduling downlink transmission and before the uplink feedback transmission for the semi-persistent scheduling downlink transmission may include operations, features, means, or instructions for determining that the semi-persistent scheduling occasion overlaps in time with the downlink grant or that the semi-persistent scheduling occasion may be between the downlink grant and the dynamic downlink transmission.

Some examples of the method, apparatuses, and non-transitory computer-readable medium described herein may further include operations, features, means, or instructions for receiving the uplink feedback transmission for the semi-persistent scheduling downlink transmission, and receiving an uplink feedback transmission for the dynamic downlink transmission. In some examples of the method, apparatuses, and non-transitory computer-readable medium described herein, the uplink feedback transmission may include operations, features, means, or instructions for receiving the single uplink feedback transmission for the semi-persistent scheduling downlink transmission and the dynamic downlink transmission. In some examples of the method, apparatuses, and non-transitory computer-readable medium described herein, the single uplink feedback transmission for the semi-persistent scheduling downlink transmission and the dynamic downlink transmission may be received on an uplink control channel allocated in the downlink grant.

In some examples of the method, apparatuses, and non-transitory computer-readable medium described herein, the single uplink feedback transmission for the semi-persistent scheduling downlink transmission and the dynamic downlink transmission includes individual feedback for each of the semi-persistent scheduling downlink transmission and the dynamic downlink transmission, combined feedback for the semi-persistent scheduling downlink transmission and the dynamic downlink transmission, or a combination thereof. Some examples of the method, apparatuses, and non-transitory computer-readable medium described herein may further include operations, features, means, or instructions for transmitting downlink control information that indicates whether the semi-persistent scheduling downlink transmission or a previous semi-persistent scheduling downlink transmission may be an initial transmission of the first downlink data.

In some examples of the method, apparatuses, and non-transitory computer-readable medium described herein, the downlink control information includes a bit that indicates whether the semi-persistent scheduling downlink transmission or the previous semi-persistent scheduling downlink transmission may be the initial transmission of the first downlink data. In some examples of the method, apparatuses, and non-transitory computer-readable medium described herein, the downlink control information includes an indication of a redundancy version associated with the dynamic downlink transmission, and the redundancy version indicates whether the semi-persistent scheduling downlink transmission or the previous semi-persistent scheduling downlink transmission may be the initial transmission of the first downlink data. In some examples of the method, apparatuses, and non-transitory computer-readable medium described herein, a redundancy version index of zero indicates that the semi-persistent scheduling downlink transmission that overlaps with the downlink grant or starts after the downlink grant may be transmitted may be the initial transmission of the first downlink data.

In some examples of the method, apparatuses, and non-transitory computer-readable medium described herein, the redundancy version associated with the dynamic downlink transmission may be preconfigured. In some examples of the method, apparatuses, and non-transitory computer-readable medium described herein, a non-zero redundancy version index indicates that the previous semi-persistent scheduling downlink transmission that ends before the downlink grant may be transmitted may be the initial transmission of the first downlink data. In some examples of the method, apparatuses, and non-transitory computer-readable medium described herein, the redundancy version associated with the dynamic downlink transmission corresponds to the non-zero redundancy version index.

Some examples of the method, apparatuses, and non-transitory computer-readable medium described herein may further include operations, features, means, or instructions for determining that a first uplink control channel allocated for the uplink feedback transmission for the semi-persistent scheduling downlink transmission overlaps in time with a second uplink control channel allocated for an uplink feedback transmission for the dynamic downlink transmission. Some examples of the method, apparatuses, and non-transitory computer-readable medium described herein may further include operations, features, means, or instructions for receiving the uplink feedback transmission for the dynamic downlink transmission on the second uplink control channel; or, and receiving the uplink feedback transmission for the semi-persistent scheduling downlink transmission on the first uplink control channel and receiving the uplink feedback transmission for the dynamic downlink transmission on the second uplink control channel.

A method of wireless communication at a UE is described. The method may include receiving a downlink grant scheduling a dynamic downlink transmission from a base station, identifying a semi-persistent scheduling occasion allocated for a semi-persistent scheduling downlink transmission from the base station, the semi-persistent scheduling downlink transmission being associated with a same feedback process identifier as the dynamic downlink transmission, determining that the semi-persistent scheduling downlink transmission is scheduled to occur after the dynamic downlink transmission and before an uplink feedback transmission for the dynamic downlink transmission, receiving first downlink data in the dynamic downlink transmission, and receiving either the first downlink data or no data in the semi-persistent scheduling downlink transmission based on the determining.

An apparatus for wireless communication at a UE is described. The apparatus may include a processor, memory coupled with the processor, and instructions stored in the memory. The instructions may be executable by the processor to cause the apparatus to receive a downlink grant scheduling a dynamic downlink transmission from a base station, identify a semi-persistent scheduling occasion allocated for a semi-persistent scheduling downlink transmission from the base station, the semi-persistent scheduling downlink transmission being associated with a same feedback process identifier as the dynamic downlink transmission, determine that the semi-persistent scheduling downlink transmission is scheduled to occur after the dynamic downlink transmission and before an uplink feedback transmission for the dynamic downlink transmission, receive first downlink data in the dynamic downlink transmission, and receive either the first downlink data or no data in the semi-persistent scheduling downlink transmission based on the determining.

Another apparatus for wireless communication at a UE is described. The apparatus may include means for receiving a downlink grant scheduling a dynamic downlink transmission from a base station, identifying a semi-persistent scheduling occasion allocated for a semi-persistent scheduling downlink transmission from the base station, the semi-persistent scheduling downlink transmission being associated with a same feedback process identifier as the dynamic downlink transmission, determining that the semi-persistent scheduling downlink transmission is scheduled to occur after the dynamic downlink transmission and before an uplink feedback transmission for the dynamic downlink transmission, receiving first downlink data in the dynamic downlink transmission, and receiving either the first downlink data or no data in the semi-persistent scheduling downlink transmission based on the determining.

A non-transitory computer-readable medium storing code for wireless communication at a UE is described. The code may include instructions executable by a processor to receive a downlink grant scheduling a dynamic downlink transmission from a base station, identify a semi-persistent scheduling occasion allocated for a semi-persistent scheduling downlink transmission from the base station, the semi-persistent scheduling downlink transmission being associated with a same feedback process identifier as the dynamic downlink transmission, determine that the semi-persistent scheduling downlink transmission is scheduled to occur after the dynamic downlink transmission and before an uplink feedback transmission for the dynamic downlink transmission, receive first downlink data in the dynamic downlink transmission, and receive either the first downlink data or no data in the semi-persistent scheduling downlink transmission based on the determining.

Some examples of the method, apparatuses, and non-transitory computer-readable medium described herein may further include operations, features, means, or instructions for determining that the semi-persistent scheduling downlink transmission includes a retransmission of the first downlink data, and combining the first downlink data received in the dynamic downlink transmission with the first downlink data received in the semi-persistent scheduling downlink transmission. Some examples of the method, apparatuses, and non-transitory computer-readable medium described herein may further include operations, features, means, or instructions for avoiding monitoring for downlink data in the semi-persistent scheduling occasion.

In some examples of the method, apparatuses, and non-transitory computer-readable medium described herein, avoiding monitoring for downlink data in the semi-persistent scheduling occasion may include operations, features, means, or instructions for starting a timer associated with the hybrid automatic repeat request identifier upon receiving the downlink grant for the dynamic downlink transmission, and avoiding monitoring for semi-persistent scheduling downlink transmissions associated with the same hybrid automatic repeat request identifier as the dynamic downlink transmission for the duration of the timer. Some examples of the method, apparatuses, and non-transitory computer-readable medium described herein may further include operations, features, means, or instructions for determining that the number of symbols between the semi-persistent scheduling downlink transmission and the uplink feedback transmission for the dynamic downlink transmission may be above a threshold, determining that the semi-persistent scheduling downlink transmission includes a retransmission of the first downlink data based on the number of symbols being above the threshold, and combining the first downlink data received in the dynamic downlink transmission with the first downlink data received in the semi-persistent scheduling downlink transmission.

Some examples of the method, apparatuses, and non-transitory computer-readable medium described herein may further include operations, features, means, or instructions for determining that the number of symbols between the semi-persistent scheduling downlink transmission and the uplink feedback transmission for the dynamic downlink transmission may be below a threshold, and avoiding monitoring for downlink data in the semi-persistent scheduling occasion based on the number of symbols being below the threshold. Some examples of the method, apparatuses, and non-transitory computer-readable medium described herein may further include operations, features, means, or instructions for transmitting the uplink feedback transmission for the dynamic downlink transmission, and transmitting an uplink feedback transmission or the semi-persistent scheduling downlink transmission. In some examples of the method, apparatuses, and non-transitory computer-readable medium described herein, the uplink feedback transmission may include operations, features, means, or instructions for transmitting the single uplink feedback transmission for the dynamic downlink transmission and the semi-persistent scheduling downlink transmission.

In some examples of the method, apparatuses, and non-transitory computer-readable medium described herein, the single uplink feedback transmission for the dynamic downlink transmission and the semi-persistent scheduling downlink transmission may be transmitted on an uplink control channel allocated in the downlink grant. In some examples of the method, apparatuses, and non-transitory computer-readable medium described herein, the single uplink feedback transmission for the semi-persistent scheduling downlink transmission and the dynamic downlink transmission includes individual feedback for each of the dynamic downlink transmission and the semi-persistent scheduling downlink transmission, combined feedback for the dynamic downlink transmission and the semi-persistent scheduling downlink transmission, or a combination thereof.

Some examples of the method, apparatuses, and non-transitory computer-readable medium described herein may further include operations, features, means, or instructions for determining that a first uplink control channel allocated for the uplink feedback transmission for the dynamic downlink transmission overlaps in time with a second uplink control channel allocated for an uplink feedback transmission for the semi-persistent scheduling downlink transmission. Some examples of the method, apparatuses, and non-transitory computer-readable medium described herein may further include operations, features, means, or instructions for transmitting the uplink feedback transmission for the dynamic downlink transmission on the first uplink control channel and avoiding transmitting the uplink feedback transmission for the semi-persistent scheduling downlink transmission on the second uplink control channel; or, and transmitting the uplink feedback transmission for the dynamic downlink transmission on the first uplink control channel and transmitting the uplink feedback transmission for the semi-persistent scheduling downlink transmission on the second uplink control channel.

A method of wireless communication at a base station is described. The method may include transmitting a downlink grant scheduling a dynamic downlink transmission to a UE, identifying a semi-persistent scheduling occasion allocated for a semi-persistent scheduling downlink transmission to the UE, the semi-persistent scheduling downlink transmission being associated with a same feedback process identifier as the dynamic downlink transmission, determining that the semi-persistent scheduling downlink transmission is scheduled to occur after the dynamic downlink transmission and before an uplink feedback transmission from the UE for the dynamic downlink transmission, transmitting first downlink data in the dynamic downlink transmission, and transmitting either the first downlink data or no data in the semi-persistent scheduling downlink transmission based on the determining.

An apparatus for wireless communication at a base station is described. The apparatus may include a processor, memory coupled with the processor, and instructions stored in the memory. The instructions may be executable by the processor to cause the apparatus to transmit a downlink grant scheduling a dynamic downlink transmission to a UE, identify a semi-persistent scheduling occasion allocated for a semi-persistent scheduling downlink transmission to the UE, the semi-persistent scheduling downlink transmission being associated with a same feedback process identifier as the dynamic downlink transmission, determine that the semi-persistent scheduling downlink transmission is scheduled to occur after the dynamic downlink transmission and before an uplink feedback transmission from the UE for the dynamic downlink transmission, transmit first downlink data in the dynamic downlink transmission, and transmit either the first downlink data or no data in the semi-persistent scheduling downlink transmission based on the determining.

Another apparatus for wireless communication at a base station is described. The apparatus may include means for transmitting a downlink grant scheduling a dynamic downlink transmission to a UE, identifying a semi-persistent scheduling occasion allocated for a semi-persistent scheduling downlink transmission to the UE, the semi-persistent scheduling downlink transmission being associated with a same feedback process identifier as the dynamic downlink transmission, determining that the semi-persistent scheduling downlink transmission is scheduled to occur after the dynamic downlink transmission and before an uplink feedback transmission from the UE for the dynamic downlink transmission, transmitting first downlink data in the dynamic downlink transmission, and transmitting either the first downlink data or no data in the semi-persistent scheduling downlink transmission based on the determining.

A non-transitory computer-readable medium storing code for wireless communication at a base station is described. The code may include instructions executable by a processor to transmit a downlink grant scheduling a dynamic downlink transmission to a UE, identify a semi-persistent scheduling occasion allocated for a semi-persistent scheduling downlink transmission to the UE, the semi-persistent scheduling downlink transmission being associated with a same feedback process identifier as the dynamic downlink transmission, determine that the semi-persistent scheduling downlink transmission is scheduled to occur after the dynamic downlink transmission and before an uplink feedback transmission from the UE for the dynamic downlink transmission, transmit first downlink data in the dynamic downlink transmission, and transmit either the first downlink data or no data in the semi-persistent scheduling downlink transmission based on the determining.

Some examples of the method, apparatuses, and non-transitory computer-readable medium described herein may further include operations, features, means, or instructions for starting a timer associated with the feedback process identifier upon transmitting the downlink grant for the dynamic downlink transmission, and avoiding transmitting semi-persistent scheduling downlink transmissions associated with the same feedback process identifier as the dynamic downlink transmission for the duration of the timer. Some examples of the method, apparatuses, and non-transitory computer-readable medium described herein may further include operations, features, means, or instructions for determining that the number of symbols between the semi-persistent downlink transmission and the uplink feedback transmission for the dynamic downlink transmission may be above a threshold, transmitting the first downlink data in the dynamic downlink transmission, and retransmitting the first downlink data in the semi-persistent scheduling downlink transmission.

Some examples of the method, apparatuses, and non-transitory computer-readable medium described herein may further include operations, features, means, or instructions for determining that the number of symbols between the semi-persistent downlink transmission and the uplink feedback transmission for the dynamic downlink transmission may be below a threshold, and avoiding transmitting downlink data in the semi-persistent scheduling occasion. Some examples of the method, apparatuses, and non-transitory computer-readable medium described herein may further include operations, features, means, or instructions for receiving the uplink feedback transmission for the dynamic downlink transmission, and receiving an uplink feedback transmission for the semi-persistent scheduling downlink transmission. In some examples of the method, apparatuses, and non-transitory computer-readable medium described herein, the uplink feedback transmission may include operations, features, means, or instructions for receiving the single uplink feedback transmission for the dynamic downlink transmission and the semi-persistent scheduling downlink transmission.

In some examples of the method, apparatuses, and non-transitory computer-readable medium described herein, the single uplink feedback transmission for the dynamic downlink transmission and the semi-persistent scheduling downlink transmission may be received on an uplink control channel allocated in the downlink grant. In some examples of the method, apparatuses, and non-transitory computer-readable medium described herein, the single uplink feedback transmission for the semi-persistent scheduling downlink transmission and the dynamic downlink transmission includes individual feedback for each of the dynamic downlink transmission and the semi-persistent scheduling downlink transmission, combined feedback for the dynamic downlink transmission and the semi-persistent scheduling downlink transmission, or a combination thereof.

Some examples of the method, apparatuses, and non-transitory computer-readable medium described herein may further include operations, features, means, or instructions for determining that a first uplink control channel allocated for the uplink feedback transmission for the dynamic downlink transmission overlaps in time with a second uplink control channel allocated for an uplink feedback transmission for the semi-persistent scheduling downlink transmission. Some examples of the method, apparatuses, and non-transitory computer-readable medium described herein may further include operations, features, means, or instructions for receiving the uplink feedback transmission for the dynamic downlink transmission on the first uplink control channel; or, and receiving the uplink feedback transmission for the dynamic downlink transmission on the first uplink control channel and receiving the uplink feedback transmission k for the semi-persistent scheduling downlink transmission on the second uplink control channel.

A method of wireless communication at a UE is described. The method may include receiving a downlink grant scheduling a dynamic downlink transmission from a base station, identifying a semi-persistent scheduling occasion allocated for a semi-persistent scheduling downlink transmission from the base station, the semi-persistent scheduling occasion overlapping with the scheduled dynamic downlink transmission, determining whether the downlink grant is received a threshold amount of time in advance of the semi-persistent scheduling occasion, and decoding first downlink data in the dynamic downlink transmission from the base station based at least in part on the downlink grant being received at least the threshold amount of time in advance of the semi-persistent scheduling occasion.

An apparatus for wireless communication at a UE is described. The apparatus may include a processor, memory coupled with the processor, and instructions stored in the memory. The instructions may be executable by the processor to cause the apparatus to receive a downlink grant scheduling a dynamic downlink transmission from a base station, identify a semi-persistent scheduling occasion allocated for a semi-persistent scheduling downlink transmission from the base station, the semi-persistent scheduling occasion overlapping with the scheduled dynamic downlink transmission, determine whether the downlink grant is received a threshold amount of time in advance of the semi-persistent scheduling occasion, and decode first downlink data in the dynamic downlink transmission from the base station based at least in part on the downlink grant being received at least the threshold amount of time in advance of the semi-persistent scheduling occasion.

Another apparatus for wireless communication at a UE is described. The apparatus may include means for receiving a downlink grant scheduling a dynamic downlink transmission from a base station, identifying a semi-persistent scheduling occasion allocated for a semi-persistent scheduling downlink transmission from the base station, the semi-persistent scheduling occasion overlapping with the scheduled dynamic downlink transmission, determining whether the downlink grant is received a threshold amount of time in advance of the semi-persistent scheduling occasion, and decoding first downlink data in the dynamic downlink transmission from the base station based at least in part on the downlink grant being received at least the threshold amount of time in advance of the semi-persistent scheduling occasion.

A non-transitory computer-readable medium storing code for wireless communication at a UE is described. The code may include instructions executable by a processor to receive a downlink grant scheduling a dynamic downlink transmission from a base station, identify a semi-persistent scheduling occasion allocated for a semi-persistent scheduling downlink transmission from the base station, the semi-persistent scheduling occasion overlapping with the scheduled dynamic downlink transmission, determine whether the downlink grant is received a threshold amount of time in advance of the semi-persistent scheduling occasion, and decode first downlink data in the dynamic downlink transmission from the base station based at least in part on the downlink grant being received at least the threshold amount of time in advance of the semi-persistent scheduling occasion.

Some examples of the method, apparatuses, and non-transitory computer-readable medium described herein may further include operations, features, means, or instructions for transmitting an uplink feedback transmission for the dynamic downlink transmission based at least in part on the semi-persistent scheduling occasion overlapping with the scheduled dynamic downlink transmission.

Some examples of the method, apparatuses, and non-transitory computer-readable medium described herein may further include operations, features, means, or instructions for determining whether a physical downlink control channel (PDCCH) carrying the downlink grant ends the threshold amount of time in advance to a start of the semi-persistent scheduling occasion.

Some examples of the method, apparatuses, and non-transitory computer-readable medium described herein may further include operations, features, means, or instructions for transmitting the uplink feedback transmission for the dynamic downlink transmission after a processing time (N) plus an additional amount of time (d). In some examples of the method, apparatuses, and non-transitory computer-readable medium described herein, the additional amount of time may be based on a processing capability of the UE, a duration of the dynamic downlink transmission, a number of overlapping symbols between the downlink grant and the semi-persistent scheduling occasion, or a combination thereof.

Some examples of the method, apparatuses, and non-transitory computer-readable medium described herein may further include operations, features, means, or instructions for transmitting the uplink feedback transmission for the dynamic downlink transmission after a processing time (N). In some examples of the method, apparatuses, and non-transitory computer-readable medium described herein, the semi-persistent scheduling downlink transmission may be associated with a same feedback process identifier as the dynamic downlink transmission. In some examples of the method, apparatuses, and non-transitory computer-readable medium described herein, the threshold amount of time may be based on a processing capability of the UE.

A method of wireless communication at a base station is described. The method may include identifying a semi-persistent scheduling occasion allocated for a semi-persistent scheduling downlink transmission to a UE, identifying resources on which to schedule a dynamic downlink transmission to the UE, where the identified resources overlap with the semi-persistent scheduling occasion, determining that there is sufficient time for a downlink grant to be transmitted a threshold amount of time in advance of the semi-persistent scheduling occasion, and transmitting the downlink grant scheduling the dynamic downlink transmission the threshold amount of time in advance of the semi-persistent scheduling occasion based on the determining.

An apparatus for wireless communication at a base station is described. The apparatus may include a processor, memory coupled with the processor, and instructions stored in the memory. The instructions may be executable by the processor to cause the apparatus to identify a semi-persistent scheduling occasion allocated for a semi-persistent scheduling downlink transmission to a UE, identify resources on which to schedule a dynamic downlink transmission to the UE, where the identified resources overlap with the semi-persistent scheduling occasion, determine that there is sufficient time for a downlink grant to be transmitted a threshold amount of time in advance of the semi-persistent scheduling occasion, and transmit the downlink grant scheduling the dynamic downlink transmission the threshold amount of time in advance of the semi-persistent scheduling occasion based on the determining.

Another apparatus for wireless communication at a base station is described. The apparatus may include means for identifying a semi-persistent scheduling occasion allocated for a semi-persistent scheduling downlink transmission to a UE, identifying resources on which to schedule a dynamic downlink transmission to the UE, where the identified resources overlap with the semi-persistent scheduling occasion, determining that there is sufficient time for a downlink grant to be transmitted a threshold amount of time in advance of the semi-persistent scheduling occasion, and transmitting the downlink grant scheduling the dynamic downlink transmission the threshold amount of time in advance of the semi-persistent scheduling occasion based on the determining.

A non-transitory computer-readable medium storing code for wireless communication at a base station is described. The code may include instructions executable by a processor to identify a semi-persistent scheduling occasion allocated for a semi-persistent scheduling downlink transmission to a UE, identify resources on which to schedule a dynamic downlink transmission to the UE, where the identified resources overlap with the semi-persistent scheduling occasion, determine that there is sufficient time for a downlink grant to be transmitted a threshold amount of time in advance of the semi-persistent scheduling occasion, and transmit the downlink grant scheduling the dynamic downlink transmission the threshold amount of time in advance of the semi-persistent scheduling occasion based on the determining.

In some examples of the method, apparatuses, and non-transitory computer-readable medium described herein, the semi-persistent scheduling downlink transmission may be associated with a same feedback process identifier as the dynamic downlink transmission. Some examples of the method, apparatuses, and non-transitory computer-readable medium described herein may further include operations, features, means, or instructions for transmitting the semi-persistent scheduling downlink transmission and the dynamic downlink transmission on the overlapping resources. In some examples of the method, apparatuses, and non-transitory computer-readable medium described herein, the threshold amount of time may be based on a processing capability of the UE.

A method of wireless communication at a base station is described. The method may include transmitting a downlink grant scheduling a dynamic downlink transmission to a UE, identifying a semi-persistent scheduling occasion allocated for a semi-persistent scheduling downlink transmission to the UE, the semi-persistent scheduling occasion overlapping with the scheduled dynamic downlink transmission, transmitting first downlink data in the dynamic downlink transmission to the UE, and receiving, from the UE, an uplink feedback transmission for the dynamic downlink transmission based on the semi-persistent scheduling occasion overlapping with the scheduled dynamic downlink transmission and whether the downlink grant is transmitted a threshold amount of time in advance of the semi-persistent scheduling occasion.

An apparatus for wireless communication at a base station is described. The apparatus may include a processor, memory coupled with the processor, and instructions stored in the memory. The instructions may be executable by the processor to cause the apparatus to transmit a downlink grant scheduling a dynamic downlink transmission to a UE, identify a semi-persistent scheduling occasion allocated for a semi-persistent scheduling downlink transmission to the UE, the semi-persistent scheduling occasion overlapping with the scheduled dynamic downlink transmission, transmit first downlink data in the dynamic downlink transmission to the UE, and receive, from the UE, an uplink feedback transmission for the dynamic downlink transmission based on the semi-persistent scheduling occasion overlapping with the scheduled dynamic downlink transmission and whether the downlink grant is transmitted a threshold amount of time in advance of the semi-persistent scheduling occasion.

Another apparatus for wireless communication at a base station is described. The apparatus may include means for transmitting a downlink grant scheduling a dynamic downlink transmission to a UE, identifying a semi-persistent scheduling occasion allocated for a semi-persistent scheduling downlink transmission to the UE, the semi-persistent scheduling occasion overlapping with the scheduled dynamic downlink transmission, transmitting first downlink data in the dynamic downlink transmission to the UE, and receiving, from the UE, an uplink feedback transmission for the dynamic downlink transmission based on the semi-persistent scheduling occasion overlapping with the scheduled dynamic downlink transmission and whether the downlink grant is transmitted a threshold amount of time in advance of the semi-persistent scheduling occasion.

A non-transitory computer-readable medium storing code for wireless communication at a base station is described. The code may include instructions executable by a processor to transmit a downlink grant scheduling a dynamic downlink transmission to a UE, identify a semi-persistent scheduling occasion allocated for a semi-persistent scheduling downlink transmission to the UE, the semi-persistent scheduling occasion overlapping with the scheduled dynamic downlink transmission, transmit first downlink data in the dynamic downlink transmission to the UE, and receive, from the UE, an uplink feedback transmission for the dynamic downlink transmission based on the semi-persistent scheduling occasion overlapping with the scheduled dynamic downlink transmission and whether the downlink grant is transmitted a threshold amount of time in advance of the semi-persistent scheduling occasion.

Some examples of the method, apparatuses, and non-transitory computer-readable medium described herein may further include operations, features, means, or instructions for receiving an uplink feedback transmission for the dynamic downlink transmission after a processing time (N) plus an additional amount of time (d). In some examples of the method, apparatuses, and non-transitory computer-readable medium described herein, the additional amount of time may be based on a processing capability of the UE, a duration of the dynamic downlink transmission, a number of overlapping symbols between the downlink grant and the semi-persistent scheduling occasion, or a combination thereof.

Some examples of the method, apparatuses, and non-transitory computer-readable medium described herein may further include operations, features, means, or instructions for receiving an uplink feedback transmission for the dynamic downlink transmission after a processing time (N). In some examples of the method, apparatuses, and non-transitory computer-readable medium described herein, the semi-persistent scheduling downlink transmission may be associated with a same feedback process identifier as the dynamic downlink transmission. In some examples of the method, apparatuses, and non-transitory computer-readable medium described herein, the threshold amount of time may be based on a processing capability of the UE.

DETAILED DESCRIPTION

Figure 1:
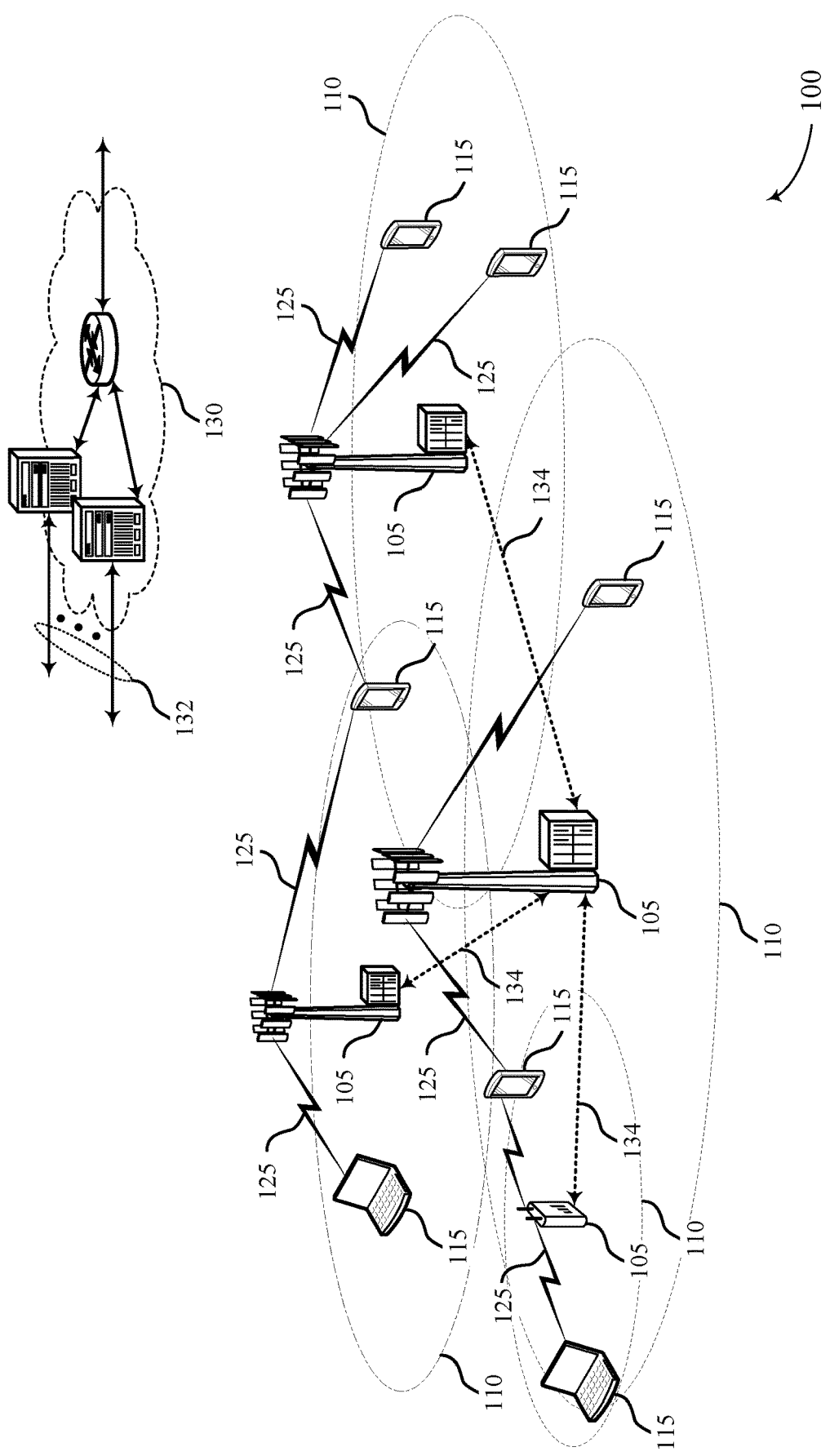
FIG. 1 illustrates an example of a wireless communications system that supports coordination of semi-persistent scheduling (SPS) downlink transmissions and dynamic downlink transmissions in accordance with aspects of the present disclosure.

In some wireless communications systems, a base station may use semi-static grants to schedule multiple downlink transmissions to a user equipment (UE). Such scheduling may be referred to as semi-persistent scheduling (SPS) and may be used to limit overhead and processing latency in a wireless communications system (e.g., since semi-static grants may be transmitted less frequently than dynamic grants). In some cases, a base station may support a large number of SPS configurations, where each SPS configuration may be associated with a certain periodicity, a set of hybrid automatic repeat request (HARQ) feedback process identifiers (IDs), etc. In such cases, the available HARQ feedback process IDs may be shared between the multiple SPS configurations, and some SPS configurations may be associated with few HARQ feedback process IDs (e.g., one or two). In addition, the periodicities of some SPS configurations may be short (e.g., if data traffic is expected to be high), and SPS downlink transmissions may be scheduled frequently.

In some aspects, because some SPS configurations may be associated with few HARQ process IDs and the periodicities associated with the SPS configurations may be short, subsequent SPS downlink transmissions scheduled based on these SPS configurations may be close together and may be associated with a same HARQ feedback process ID. In such aspects, if a base station identifies downlink data to be scheduled and transmitted dynamically to a UE (e.g., based on a downlink grant), it may be challenging for the base station to schedule the dynamic downlink transmission in between SPS transmissions. Specifically, in some systems, a UE may not be expected to receive a dynamic downlink transmission associated with a given HARQ feedback process ID until after the end of an expected transmission of HARQ feedback for an SPS downlink transmission associated with a given HARQ feedback process ID. Thus, a base station may avoid scheduling dynamic downlink transmissions associated with a HARQ process ID between SPS downlink transmissions associated with the same HARQ feedback process ID, which may result in reduced throughput in a wireless communications system.

As described herein, a wireless communications system may support efficient techniques for scheduling SPS downlink transmissions and dynamic downlink transmissions to maximize throughput. In one example, a UE may receive downlink data in a dynamic downlink transmission and receive the same downlink data or no data in an SPS downlink transmission when the dynamic downlink transmission is scheduled to occur after the SPS downlink transmission and before an uplink feedback transmission for the SPS downlink transmission. In another example, a UE may receive downlink data in a dynamic downlink transmission and receive the same downlink data or no downlink data in an SPS downlink transmission when the SPS downlink transmission is scheduled to occur after the dynamic downlink transmission and before an uplink feedback transmission for the dynamic downlink transmission. In the above examples, because the UE may be able to receive downlink data in the SPS downlink transmissions, throughput may be increased. Further, even if the SPS downlink transmissions include no data, a UE supporting the techniques described herein may be scheduled with SPS downlink transmissions and dynamic downlink transmissions freely without experiencing any errors.

Aspects of the disclosure introduced above are described below in the context of a wireless communications system. Examples of processes and signaling exchanges that support coordination of SPS downlink transmissions and dynamic downlink transmissions are then described. Aspects of the disclosure are further illustrated by and described with reference to apparatus diagrams, system diagrams, and flowcharts that relate to coordination of SPS downlink transmissions and dynamic downlink transmissions.

FIG. 1 illustrates an example of a wireless communications system 100 that supports coordination of SPS downlink transmissions and dynamic downlink transmissions in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., on a physical uplink shared channel (PUSCH) or a physical uplink control channel (PUCCH)), or downlink transmissions from a base station 105 to a UE 115 (e.g., in a physical downlink shared channel (PDSCH) or a physical downlink control channel (PDCCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In wireless communications system 100, a base station 105 may use semi-static grants to schedule multiple downlink transmissions to a UE 115. Such scheduling may be referred to as SPS and may be used to limit overhead and processing latency (e.g., since semi-static grants may be transmitted less frequently than dynamic grants). In some cases, a base station 105 may support a large number of SPS configurations (e.g., multiple active downlink SPS configurations), where each SPS configuration may be associated with a certain periodicity, a set of HARQ feedback process IDs, etc. In such cases, for a particular SPS configuration, the HARQ feedback process ID associated with an SPS occasion (e.g., resources scheduled for an SPS transmission) may be determined based the SPS occasion (e.g., the index, resources, etc.) from the set of configured HARQ feedback process IDs associated with the SPS configuration. Multiple SPS configurations may be used to handle multiple time sensitive networking (TSN) flows or support different service types (e.g., URLLC and eMBB). Multiple simultaneous active configured grants may also be supported for uplink configured grants.

When multiple SPS configurations are supported, the available HARQ feedback process IDs may be shared (or split) between the multiple SPS configurations, and some SPS configurations may be associated with few HARQ feedback process IDs (e.g., one or two). In addition, the periodicities of some SPS configurations may be short (e.g., with a minimum periodicity of 10 ms), and SPS downlink transmissions may be scheduled frequently. As an example, some systems may support shorter periodicities for downlink SPS with periodicities as low as one slot for all subcarrier spacings. Thus, a single SPS configuration may have certain constraints related to HARQ feedback and combinations of downlink and uplink subcarrier spacings. With an increased (or high) number of SPS configurations being supported, and reduced (or low) periodicities being supported for the SPS configurations, it may be possible that, for a given HARQ feedback process ID, a UE receives a dynamic PDSCH transmission or retransmission before the HARQ feedback for a previous SPS PDSCH associated with the same HARQ feedback process ID as the dynamic PDSCH transmission is sent.

Thus, to prevent the scheduling of a dynamic PDSCH transmission after an SPS PDSCH and before the HARQ feedback for the SPS PDSCH is sent, some systems may support increased (or higher) SPS periodicities (e.g., such that there may be sufficient time between SPS transmissions to schedule a dynamic transmission). However, if increased (or higher) SPS periodicities are supported, latency may be increased. Further, in some industrial internet of things (IIOT) applications, it may not be possible to increase SPS periodicity. Accordingly, if SPS periodicities remain low (i.e., are not increased), a UE may not be expected to receive a dynamic downlink transmission associated with a given HARQ feedback process ID until after the end of an expected transmission of HARQ feedback for an SPS downlink transmission associated with a given HARQ feedback process ID. Thus, a base station may avoid scheduling dynamic downlink transmissions associated with a HARQ process ID between SPS downlink transmissions associated with the same HARQ feedback process ID, which may result in reduced throughput in a wireless communications system.

Figure 2:
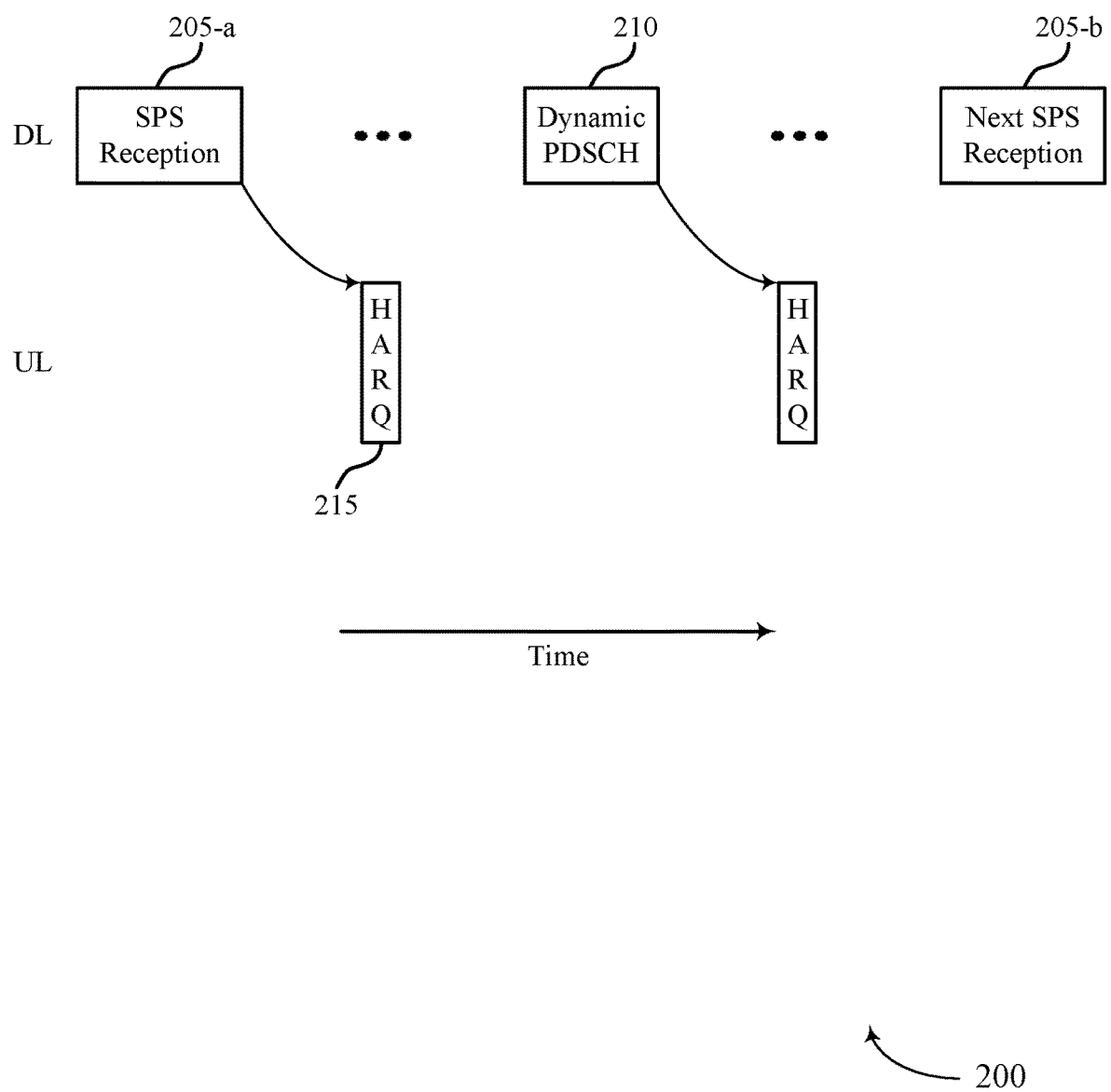
FIG. 2 illustrates an example of SPS and dynamic downlink transmission scheduling.

FIG. 2 illustrates an example of SPS and dynamic downlink scheduling 200. As illustrated in FIG. 2, to prevent error cases where a UE may not be able to identify the data being received in a downlink transmission, a base station 105 may avoid scheduling conflicting SPS downlink transmissions and dynamic downlink transmissions. In particular, a UE 115 may not be expected to receive a second downlink transmission associated with a HARQ process ID after a first downlink transmission associated with the same HARQ process ID, unless the second downlink transmission is scheduled after the HARQ feedback for the first downlink transmission is sent.

For instance, dynamic PDSCH reception 210 in between different SPS receptions 205-a and 205-b may not be possible unless the dynamic PDSCH 210 is scheduled after the HARQ feedback 215 for the SPS reception 205-a is sent (e.g., when the dynamic PDSCH and SPS occasions are associated with the same HARQ feedback process ID). Similarly, an SPS reception may not be possible after a dynamic PDSCH reception unless the SPS reception is scheduled after the HARQ feedback for the dynamic PDSCH reception is sent (e.g., when the dynamic PDSCH and the SPS occasions are associated with the same HARQ feedback process ID). In some cases, each SPS reception 205 may include a new (or unique) transport block (e.g., ignoring repetitions), and the dynamic PDSCH may correspond to a new (or unique) transport block transmission or a retransmission of a transport block that has been sent in an SPS occasion (e.g., SPS reception 205-a).

Figure 3:
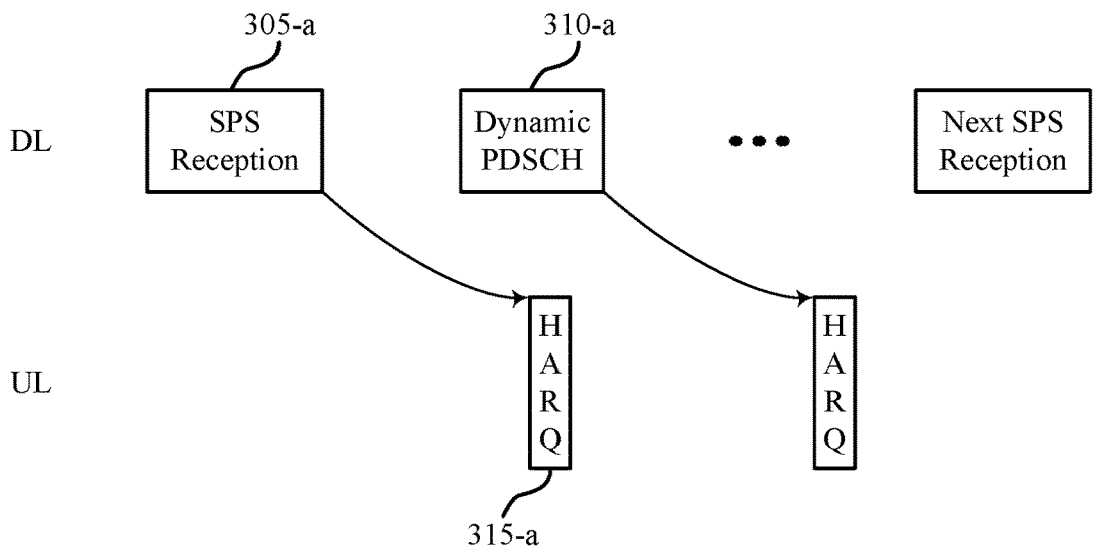
FIG. 3 illustrates an example of SPS and dynamic downlink transmission.
Figure 3:
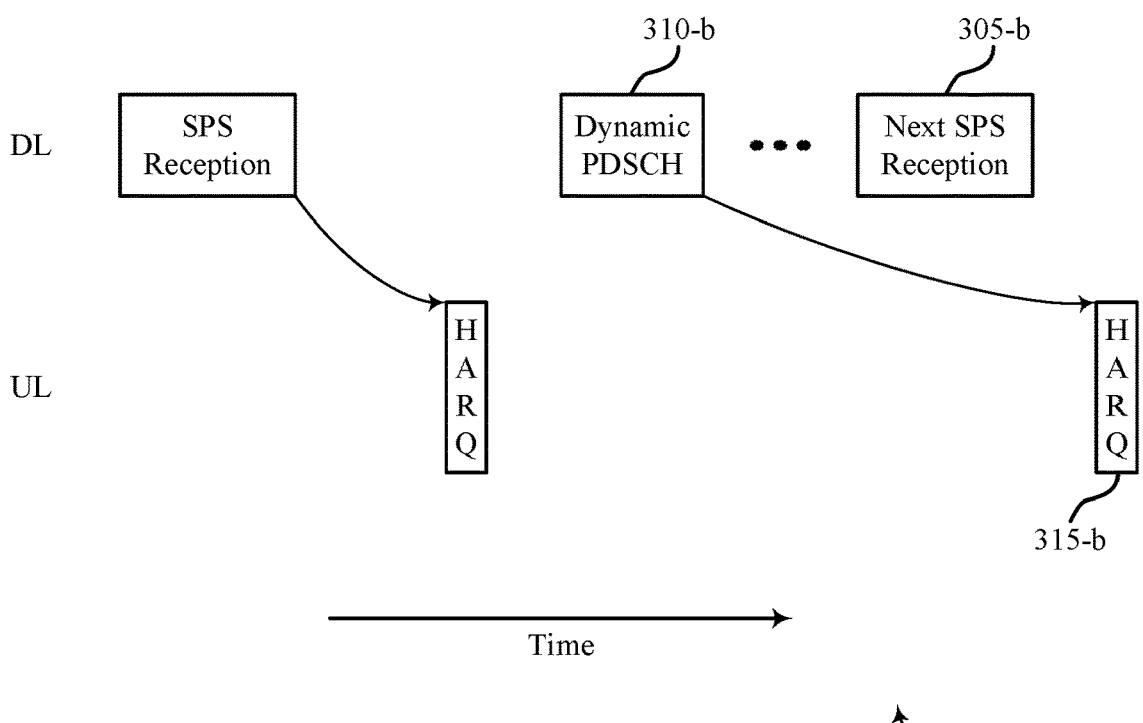

As described with reference to FIG. 1, however, when SPS periodicity and a number of configured HARQ feedback process IDs are reduced (e.g., due to having multiple active SPS configurations), a base station 105 may identify a downlink transmission to schedule after an SPS downlink transmission and before HARQ feedback for the SPS downlink transmission is sent. FIG. 3 illustrates an example of SPS and dynamic downlink transmission scheduling 300 where a second PDSCH is scheduled after a first PDSCH and before HARQ feedback for the first PDSCH is sent. In example 300-a, a dynamic PDSCH 310-a may be scheduled after an SPS reception 305-a and before the HARQ 315-a for the SPS reception 305-a is sent. In example 300-b, an SPS reception 305-b may be scheduled after a dynamic PDSCH 310-b and before the HARQ 315-b for the dynamic PDSCH 310-b is sent.

In some systems, however, if a UE 115 is scheduled as illustrated in FIG. 3, with a second PDSCH being scheduled after a first PDSCH and before the HARQ feedback for the first PDSCH is sent, the UE may not be able to identify the data included in the second PDSCH (e.g., there may be an error case). In particular, a UE 115 may not be expected to receive another PDSCH (dynamic or configured) for a given HARQ feedback process ID before HARQ feedback for the HARQ process is already sent. Thus, for a given HARQ feedback process ID, a quick dynamic retransmission or dynamic repetition for a transport block originally sent in an SPS PDSCH may not be possible if the dynamic PDSCH is scheduled after an SPS occasion and before the HARQ feedback for the SPS occasion is sent or if an SPS occasion is scheduled after a dynamic PDSCH and before the HARQ feedback for the dynamic PDSCH is sent. Because a base station 105 may avoid the scheduling illustrated in FIG. 3, and a quick dynamic retransmission or dynamic repetition for a transport block as described above may not be supported, throughput in a wireless communications system may be reduced. Wireless communications system 100 may support efficient techniques for scheduling SPS downlink transmissions and dynamic downlink transmissions to maximize throughput.

Figure 4:
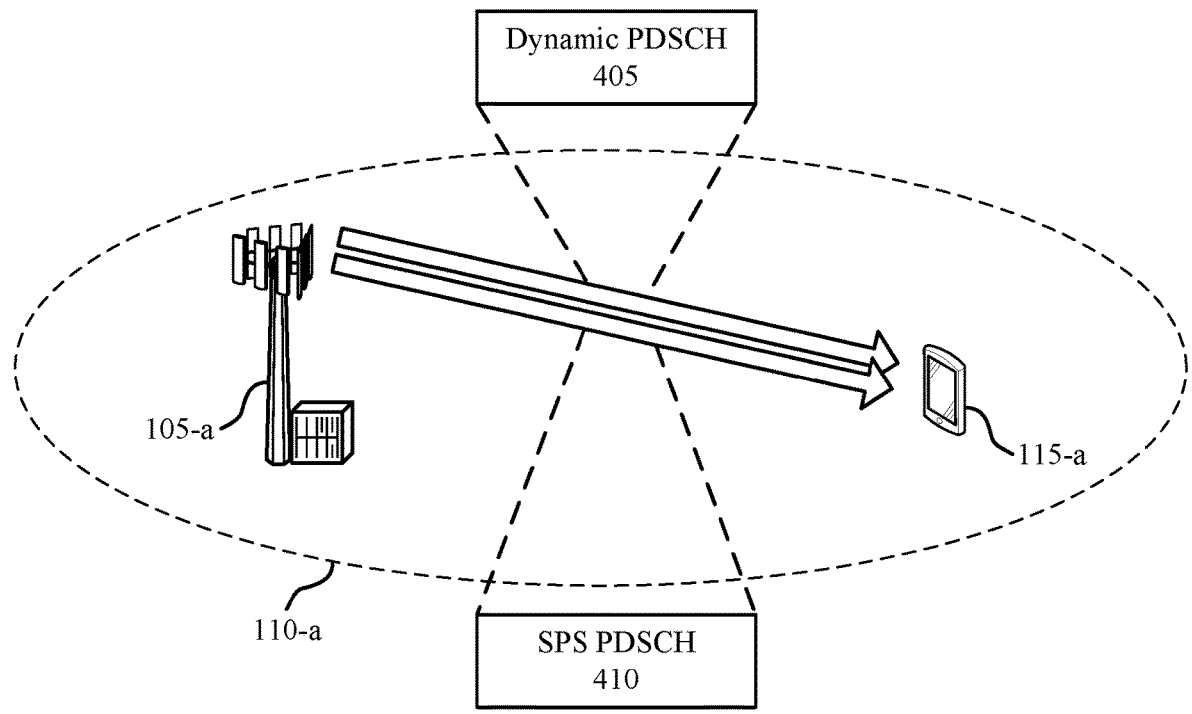
FIG. 4 illustrates an example of a wireless communications system that supports coordination of SPS downlink transmissions and dynamic downlink transmissions in accordance with aspects of the present disclosure.

FIG. 4 illustrates an example of a wireless communications system 400 that supports coordination of SPS downlink transmissions and dynamic downlink transmissions in accordance with aspects of the present disclosure. Wireless communications system 400 includes base station 105-a, which may be an example of a base station 105 described with reference to FIGS. 1-3. Wireless communications system 400 also includes UE 115-a, which may be an example of a UE 115 described with reference to FIGS. 1-3. Wireless communications system 400 may implement aspects of wireless communications system 100. For example, wireless communications system 400 may support efficient techniques for scheduling SPS downlink transmissions and dynamic downlink transmissions to maximize throughput.

In one example, base station 105-a may identify a dynamic PDSCH 405 to schedule after an SPS PDSCH 410 and before a HARQ feedback transmission for the SPS PDSCH. Thus, as described herein, rather than avoiding scheduling the dynamic PDSCH 405, the base station 105-a may schedule the dynamic PDSCH 405 after the SPS PDSCH 410 and before a HARQ feedback transmission for the SPS PDSCH. The UE 115-a may then receive downlink data or no data in the SPS PDSCH 410. In particular, the UE 115-a may either be configured to receive a same transport block in the SPS PDSCH 410 and the dynamic PDSCH 405, or the UE 115-a may be configured to determine that no data is transmitted in the SPS PDSCH 410. If the UE 115-a is configured to receive a retransmission of a transport block in the dynamic PDSCH 405, throughput may be improved in wireless communications system 400. Alternatively, if the UE 115-a is configured to receive no data in the SPS PDSCH 405, although throughput may not be affected, the UE 115-a may at least be able to be scheduled freely without experiencing errors, and the complexity at the base station 105-a associated with avoiding scheduling the dynamic PDSCH may be negated.

In another example, base station 105-a may identify an SPS PDSCH 410 that is scheduled after a dynamic PDSCH 405 and before a HARQ feedback transmission for the dynamic PDSCH 410. Thus, as described herein, rather than avoiding scheduling the dynamic PDSCH 405, the base station 105-*a* may schedule the dynamic PDSCH 405 with the SPS PDSCH 410 being scheduled after the dynamic PDSCH 405 and before the HARQ feedback transmission for the dynamic PDSCH 405. The UE 115-*a* may then receive downlink data or no data in the SPS PDSCH 410. In particular, the UE 115-*a* may either e configured to receive a same transport block in the dynamic PDSCH 405 and the SPS PDSCH 410, or the UE 115-*a* may be configured to determine that no data is transmitted in the SPS PDSCH 410. If the UE 115-*a* is configured to receive a retransmission of a transport block in the SPS PDSCH 410, throughput may be improved in wireless communications system 400. Alternatively, if the UE 115-*a* is configured to receive no data in the SPS PDSCH 405, although throughput may not be affected, the UE 115-*a* may at least be scheduled freely without experiencing errors, and the complexity at the base station 105-*a* associated with avoiding scheduling the dynamic PDSCH may be negated.

Figure 5:
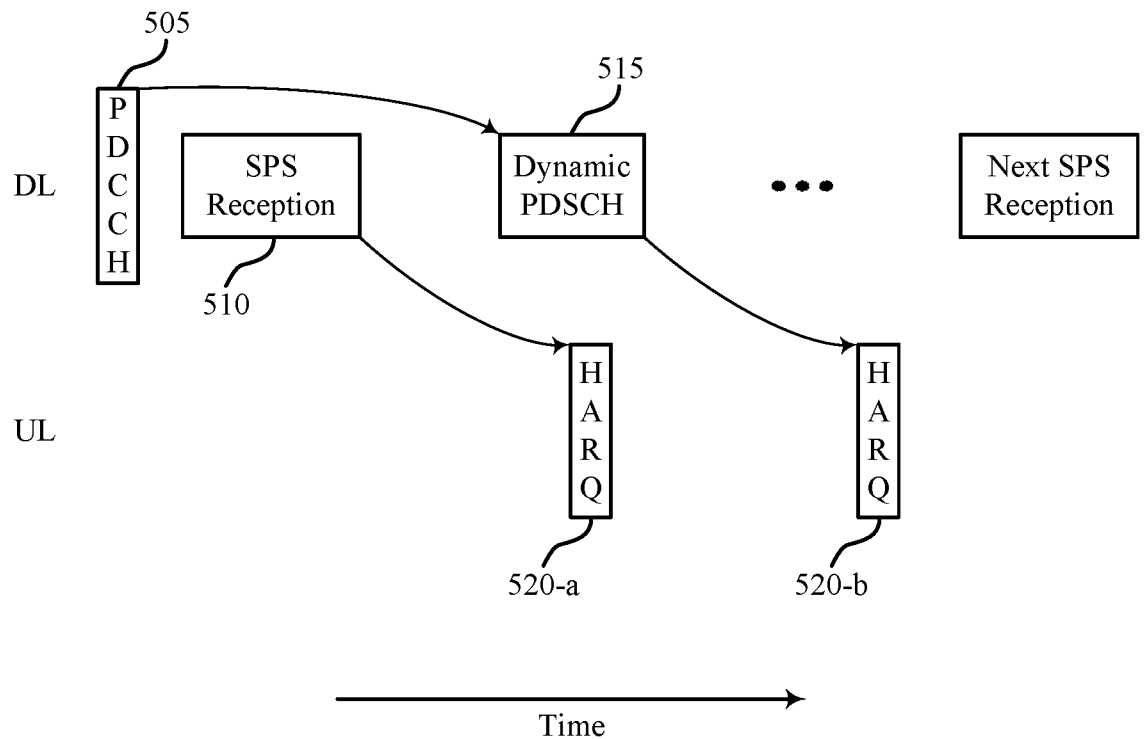
FIG. 5 illustrates an example of SPS and dynamic downlink transmission scheduling in accordance with aspects of the present disclosure.

FIG. 5 illustrates an example of SPS and dynamic downlink transmission scheduling 500 in accordance with aspects of the present disclosure. In the example of FIG. 5, a UE 115-*a* may be scheduled for SPS reception 510 and a dynamic PDSCH 515. In particular, the UE 115-*a* may be scheduled to receive the dynamic PDSCH 515 after SPS reception 510 and before transmitting HARQ feedback for the SPS reception 510. In some cases, the UE 115-*a* may determine that the UE 115-*a* is scheduled to receive the dynamic PDSCH 515 after SPS reception 510 and before transmitting HARQ feedback 520 for the SPS reception 510 based on receiving a downlink grant in PDCCH 505 for the dynamic PDSCH 515 in advance of SPS reception 510. Once UE 115-*a* determines that the dynamic PDSCH 515 is scheduled after SPS reception 510 and before transmitting HARQ feedback 520 for the SPS reception 510, UE 115-*a* may receive downlink data or no downlink data in SPS reception 510 based on a configuration at the UE 115-*a*.

In one example, UE 115-*a* may receive a same transport block in SPS reception 510 and the dynamic PDSCH 515. In this example, UE 115-*a* may combine the data received in SPS reception 510 and the dynamic PDSCH 515 and decode the combined data. In another example, UE 115-*a* may expect (or assume) no data in SPS reception 510. For instance, UE 115-*a* may start (or restart) a timer for the HARQ feedback process ID associated with dynamic SPS reception 510 and dynamic PDSCH 515 upon receiving the downlink grant in PDCCH 505 (e.g., similar to ULCG techniques), and UE 115-*a* may avoid monitoring for data associated with the HARQ feedback process ID for the duration of the timer (e.g., until UE 115-*a* transmits the HARQ feedback 520-*b* for the dynamic PDSCH 515). That is, the timer may prevent other SPS occasions corresponding to the same HARQ feedback process ID to be used. Using these techniques, if UE 115-*a* is scheduled by a PDCCH (with a configured scheduling radio network temporary identifier (CS-RNTI)) that ends in a symbol i to receive a PDSCH retransmission for a given HARQ process, where the dynamic PDSCH starts at symbol j, UE 115-*a* may either receive downlink data (e.g., a retransmission) or no data in all SPS occasions corresponding to the same HARQ process, if any, that overlap with the PDCCH or start after the symbol i and end before the symbol j.

If UE 115-*a* is configured to expect (or assume) no data in SPS reception 510, UE 115-*a* may determine that a previous SPS reception includes the initial transmission of the downlink data that is retransmitted in PDSCH 515. That is, the first SPS occasion corresponding to the same HARQ process that ends before receiving the PDCCH 505 may include the initial transmission of a new transport block, and the dynamic PDSCH 515 includes a retransmission of the transport block. If, however, UE 115-*a* is configured to receive a same transport block in SPS reception 510 and the dynamic PDSCH 515, it may be appropriate for UE 115-*a* to determine whether the downlink data in the SPS reception 510 is an initial transmission of the downlink data (e.g., since the HARQ process of SPS reception 515 and PDSCH 515 may be the same as the HARQ process of a previous SPS reception, and, therefore, the previous SPS reception may include an initial transmission of the downlink data). Once UE 115-*a* is able to identify the initial transmission of the downlink data, UE 115-*a* may combine all received transmissions (e.g., the initial transmission and retransmissions) of the downlink data to decode the downlink data from base station 105-*a*.

In one aspect, UE 115-*a* may determine whether the downlink data in the SPS reception 510 is an initial transmission of the downlink data based on a timeline between the PDCCH 505 and the SPS reception 510. In particular, if PDCCH 505 overlaps with SPS reception 510 (e.g., corresponding to the same HARQ process), UE 115-*a* may determine that the SPS reception 510 overlapping with the PDCCH 505 includes an initial transmission of a new transport block. Otherwise, if the number of symbols between the end of the PDCCH 505 and the beginning of the SPS reception 510 (i.e., the next SPS occasion corresponding to the same HARQ process) is less than a threshold ($N_0$), UE 115-*a* may determine that SPS occasion 510 (i.e., the first SPS occasion after PDCCH reception corresponding to the same HARQ process) includes the initial transmission of a new transport block. Further, if the number of symbols between the end of the PDCCH 505 and the beginning of the SPS reception 510 (i.e., the next SPS occasion corresponding to the same HARQ process) is greater than the threshold ($N_0$), UE 115-*a* may determine that a previous SPS occasion (e.g., the first SPS occasion corresponding to the same HARQ process that ends before receiving the PDCCH 505) includes the initial transmission of the new transport block. In some cases, the threshold ($N_0$) may be configured at UE 115-*a* (e.g., based on a processing capability of UE 115-*a*).

In another aspect, UE 115-*a* may determine whether the downlink data in the SPS reception 510 is an initial transmission of the downlink data based on receiving downlink control information (DCI) indicating which SPS occasion includes the initial transmission of a new transport block. For example, the DCI may include a bit used specifically to indicate whether SPS reception 510 (e.g., a first SPS occasion following the PDCCH 505) or a previous SPS reception (e.g., a first SPS occasion preceding the PDCCH 505) includes the initial transmission of the new transport block. Alternatively, the DCI may implicitly indicate whether SPS reception 510 or a previous SPS reception includes the initial transmission. In one example, if a redundancy version (RV) index in the downlink grant in PDCCH 505 is zero, UE 115-*a* may determine that the initial transmission is in SPS reception 510 (i.e., the first SPS occasion with the same HARQ process that either overlaps with the PDCCH or starts after the PDCCH). In this example, the redundancy version for the dynamic PDSCH 515 may be preconfigured (e.g., since the redundancy version in the downlink grant in PDCCH 505 may be used for the implicit indication). In another example, if an RV index in the downlink grant in PDCCH 505 is non-zero, UE 115-*a* may determine that the initial transmission is in a previous SPS reception (i.e., the first SPS occasion with the same HARQ process that ends before receiving the PDCCH 505). In this example, the redundancy version for the dynamic PDSCH 515 may be as indicated in the downlink grant in PDCCH 505.

Figure 6:
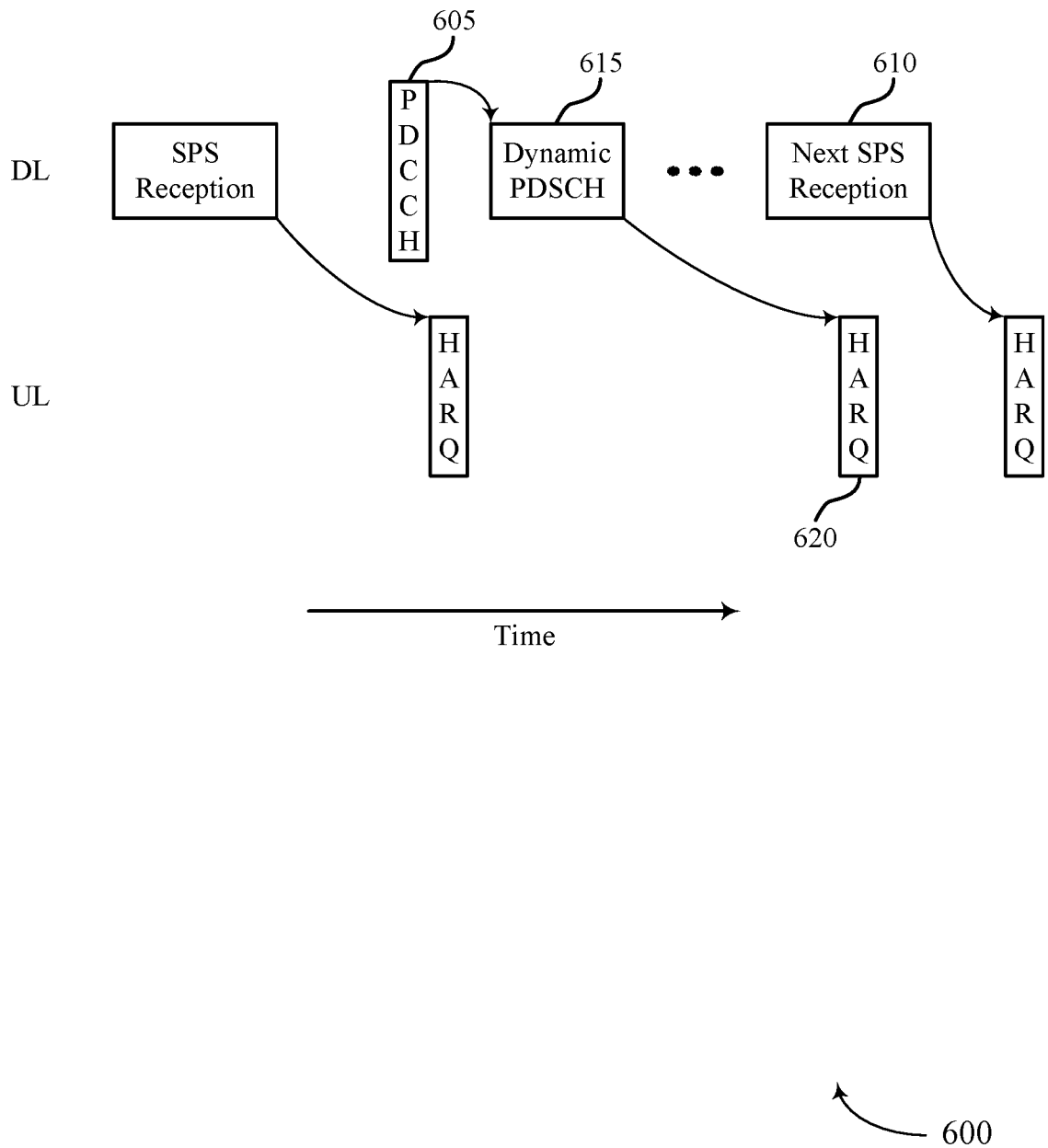
FIG. 6 illustrates an example of SPS and dynamic downlink transmission scheduling in accordance with aspects of the present disclosure.

FIG. 6 illustrates an example of SPS and dynamic downlink transmission scheduling 600 in accordance with aspects of the present disclosure. In the example of FIG. 6, a UE 115-*a* may be scheduled for a dynamic PDSCH 615 and SPS reception 610. In particular, the UE 115-*a* may be scheduled for the SPS reception 610 after the dynamic PDSCH 615 and before transmitting the HARQ feedback 620 for the dynamic PDSCH 615. That is, UE 115-*a* may be scheduled to receive a dynamic PDSCH 615 (for a new transmission or a retransmission) for a given HARQ process, and the corresponding HARQ feedback 620 for the dynamic PDSCH 615 may be scheduled for transmission after the starting symbol of the next SPS reception 610 associated with the same HARQ process. Thus, in one example, UE 115-*a* may expect (or assume) that no data is to be received in the next scheduled SPS reception 610 (e.g., the next SPS occasion associated with the same HARQ process as the dynamic PDSCH). In another example, UE 115-*a* may expect to receive and may receive a repetition of the same transport block transmitted in the dynamic PDSCH 615 in the next SPS reception 610 (e.g., the next SPS occasion associated with the same HARQ process as the dynamic PDSCH 615).

In yet another example, if the HARQ feedback 620 is scheduled for transmission more than a threshold ($N_1$) number of symbols after the end of the SPS reception 610 (i.e., the next SPS reception associated with the same HARQ process as the dynamic PDSCH 615), UE 115-*a* may expect to receive and may receive a repetition of the same transport block transmitted in the dynamic PDSCH 615 in the next SPS reception 610. Otherwise, if the HARQ feedback 620 is scheduled for transmission less than the threshold ($N_1$) number of symbols after the end of the SPS reception 610, UE 115-*a* may expect no data in the next scheduled SPS reception 610. That is, UE 115-*a* may determine whether the HARQ feedback 620 is scheduled for transmission more or less than a threshold ($N_1$) number of symbols after the end of the SPS reception 610, and UE 115-*a* may either receive a transport block repetition or retransmission in SPS reception 610 or expect no data in SPS reception 610 based on the determination.

Figure 7:
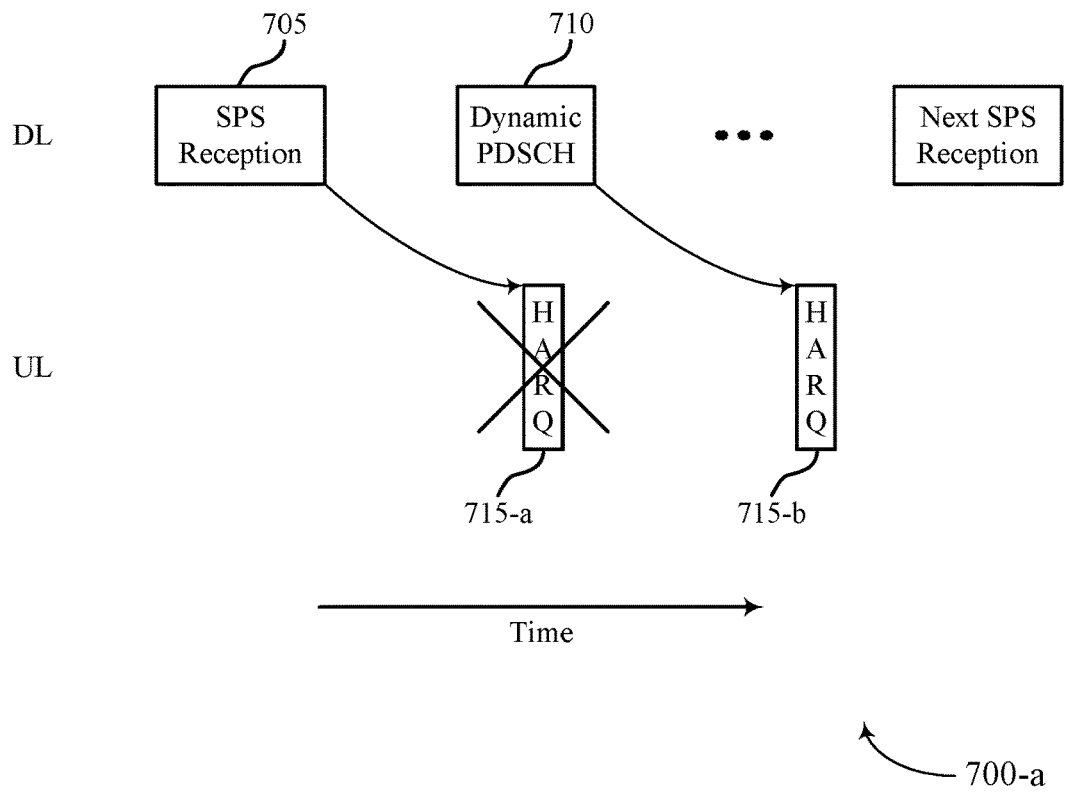
FIG. 7 illustrates an example of hybrid automatic repeat request (HARD) feedback reporting for SPS and dynamic downlink transmissions in accordance with aspects of the present disclosure.
Figure 7:
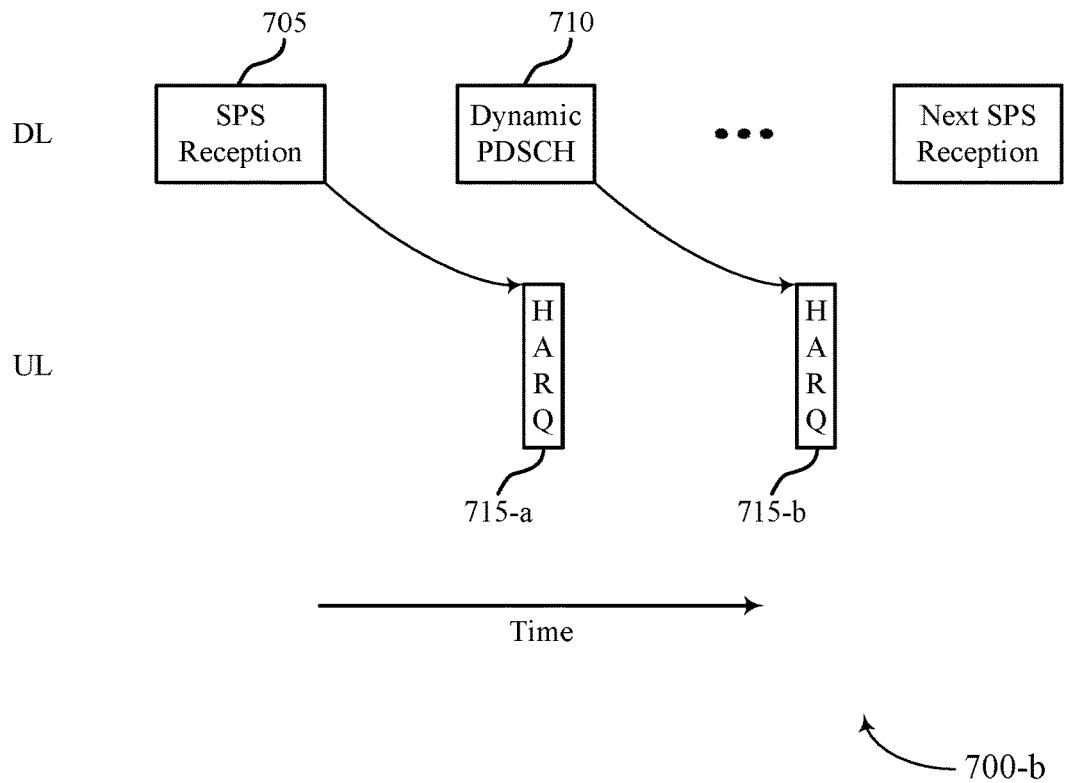

FIG. 7 illustrates an example of HARQ feedback reporting 700 for SPS and dynamic downlink transmissions in accordance with aspects of the present disclosure. In the example of FIG. 7, a UE 115-*a* may be scheduled for a dynamic PDSCH 710 after SPS reception 705 and before a transmission of HARQ feedback 715-*a* for the SPS reception 705. That is, UE 115-*a* may be scheduled to receive a dynamic PDSCH 710 for a retransmission for a given HARQ process, the UE 115-*a* may be scheduled for previous SPS receptions (e.g., SPS reception 705) corresponding to the same HARQ process, and the HARQ feedback for the SPS receptions may be scheduled for after the start of the dynamic PDSCH 710. In this example, it may be appropriate for UE 115-*a* to determine whether to transmit HARQ feedback 715-*a* on resources allocated for reporting HARQ feedback for SPS reception 705, HARQ feedback 715-*b* on resources allocated for reporting HARQ feedback for the dynamic PDSCH 710, or both.

In a first example 700-*a*, UE 115-*a* may avoid transmitting HARQ feedback 715-*a* on resources (e.g., PUCCH resources) allocated for reporting HARQ feedback for SPS reception 705. That is, UE 115-*a* may avoid transmitting HARQ feedback on PUCCH resources configured for SPS occasions associated with the same HARQ process as a dynamic PDSCH. Instead, after possibly combining the downlink data or transport block received in SPS reception 705 and dynamic PDSCH 710, UE 115-*a* may transmit HARQ feedback 715-*b* on resources allocated for reporting HARQ feedback for the dynamic PDSCH 710. That is, the HARQ feedback (e.g., for both SPS reception 705 and dynamic PDSCH 710) is sent on the PUCCH resource indicated by the PDCCH grant for the dynamic PDSCH (i.e., the retransmission).

In some cases, the codebook for the HARQ feedback 715-*b* may contain a single bit indicating whether the final decoding of the combination of the downlink data received in SPS reception 705 and dynamic PDSCH 710 was successful. In other cases, the codebook for the HARQ feedback 715-*b* may indicate whether the individual receptions and decoding of the downlink data (e.g., in SPS reception 705 and dynamic PDSCH 710) were successful and whether the combined decoding of the downlink data received in SPS reception 705 and dynamic PDSCH 710 was successful. In some examples, the UE 115-*a* may receive an indication (e.g., in a downlink assignment index (DAI) in DCI) of the codebook size and reporting procedure (e.g., whether to report HARQ feedback for individual decoding and/or combined decoding).

In a second example 700-*b*, UE 115-*a* may transmit HARQ feedback 715-*a* for SPS reception 705 on resources (e.g., configured PUCCH resources) allocated for reporting HARQ feedback for SPS reception 705, and UE 115-*a* may transmit HARQ feedback 715-*b* for the dynamic PDSCH 710 on resources (e.g., PUCCH resources indicated in the grant scheduling the dynamic PDSCH 710) allocated for reporting HARQ feedback for the dynamic PDSCH 710. In this example, the reliability of the HARQ feedback may be improved (e.g., though UE processing time and PUCCH overhead may be increased). Further, the UE 115-*a* may transmit the HARQ feedback 715-*a* for SPS reception 705 while receiving the dynamic PDSCH 710 or after receiving the dynamic PDSCH 710 (i.e., dynamic PDSCH is received before the HARQ for SPS reception 705 is sent).

In the examples described above, the PUCCH resources allocated for HARQ feedback 715-*a* and HARQ feedback 715-*b* may not overlap. In other examples, however, the PUCCH resources allocated for HARQ feedback 710-*a* and HARQ feedback 715-*b* may overlap. That is, the PUCCH resource allocated for providing HARQ feedback 715-*b* for the dynamic PDSCH 710 may overlap in time with the PUCCH resource allocated for providing HARQ feedback 715-*a* for SPS reception 705 (e.g., when the dynamic PDSCH 710 and SPS reception 705 are associated with the same HARQ process or different HARQ processes). In such examples, a UE 115-*a* may transmit HARQ feedback 715-*b* on the dynamic PUCCH resource (e.g., where the codebook construction may be similar to the codebook construction for reporting HARQ feedback on non-overlapping PUCCH resources). Alternatively, a UE 115-*a* may transmit HARQ feedback 715-*a* and HARQ feedback 715-*b* on both PUCCH resources (e.g., if UE 115-*a* is capable of simultaneous PUCCH transmissions and the overlapping between the dynamic PUCCH for the dynamic PDSCH and the configured PUCCH for SPS reception allows for simultaneous PUCCH transmissions).

Although the examples described with reference to FIG. 7 relate to reporting HARQ feedback for SPS reception and a dynamic PDSCH when the dynamic PDSCH is scheduled after the SPS reception and before a HARQ feedback transmission for SPS reception, it is to be understood that the same techniques may be applied for reporting HARQ feedback for SPS reception and a dynamic PDSCH if the SPS reception is scheduled after the dynamic PDSCH and before a HARQ feedback transmission for the dynamic PDSCH (as illustrated in FIG. 6).

Figure 8:
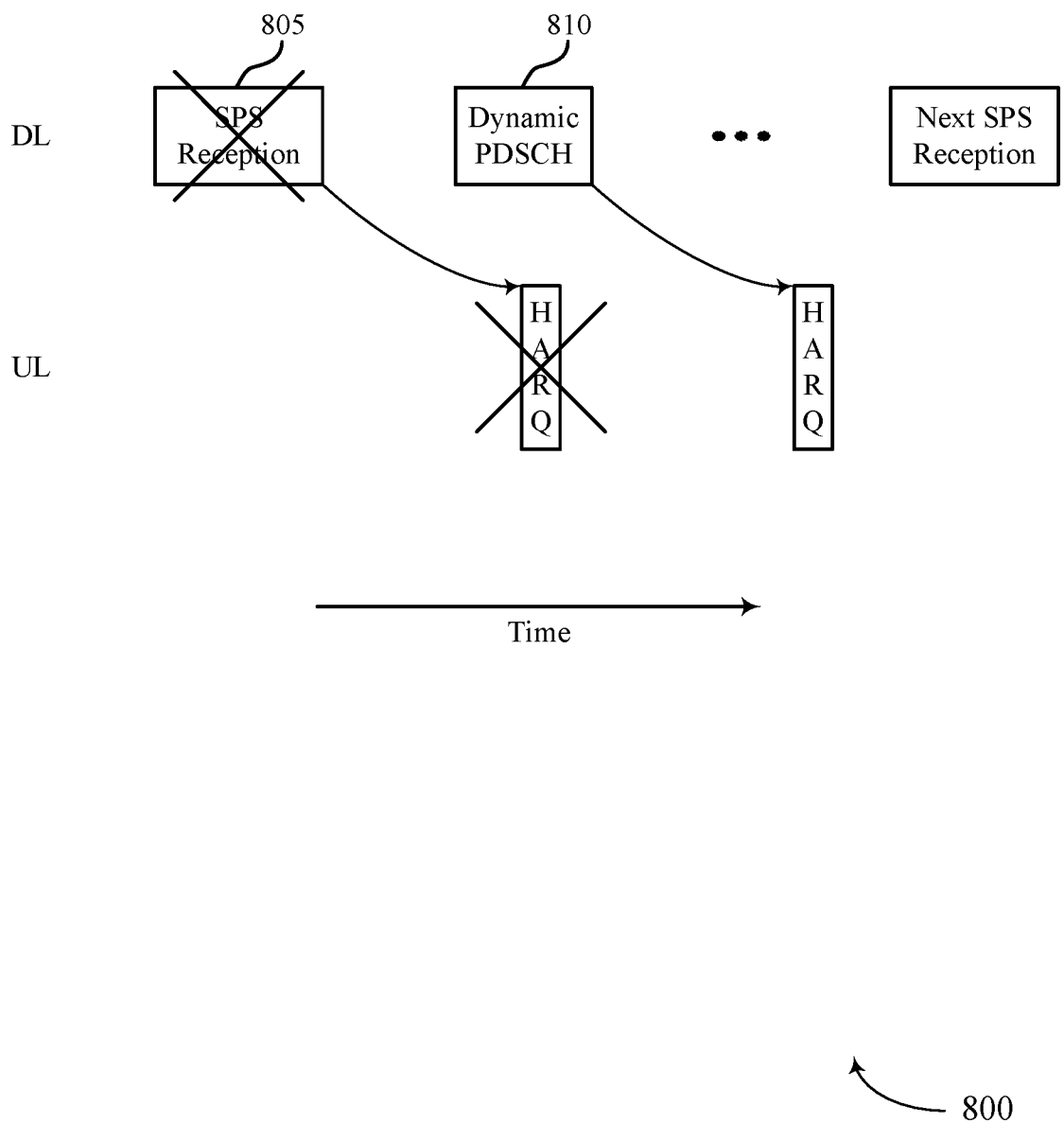
FIG. 8 illustrates an example of SPS and dynamic downlink transmission scheduling in accordance with aspects of the present disclosure.

FIG. 8 illustrates an example of SPS and dynamic downlink transmission scheduling 800 in accordance with aspects of the present disclosure. In the example of FIG. 8, if a UE 115-*a* is scheduled to receive a new transport block through a dynamic PDSCH 810 for a given HARQ process, and the HARQ feedback for SPS reception 805 is not scheduled before the start of the dynamic PDSCH 810, the UE 115-*a* may not expect to receive data in SPS reception 805-*a* (i.e., in previous SPS occasions corresponding to the same HARQ process ID). Alternatively, if the dynamic PDSCH 810 including the new transport block is associated with a transmission configuration indicator (TCI) state different from the TCI state associated with SPS reception 805 (e.g., the SPS downlink transmission and dynamic downlink transmission are transmitted using different ports), UE 115-*a* may receive separate data in both the SPS reception 805 and the dynamic PDSCH 810 (e.g., similar to multi transmission/reception point (multi-TRP) or multi-panel transmissions).

In the examples described above with reference to FIGS. 5-8, a UE 115-*a* may be scheduled to receive a second PDSCH after a first PDSCH and before the HARQ transmission for the first PDSCH (e.g., where the first or second PDSCH may be dynamic PDSCH associated with a dynamic downlink assignment or an SPS PDSCH associated with a configured downlink assignment). That is, the first and second PDSCHs may be scheduled on non-overlapping resources. In such examples, if the PDSCH duration of the configured downlink assignment does not overlap with the PDSCH duration of a downlink assignment received on the PDCCH for a serving cell, a physical layer at UE 115-*a* may receive, in the PDSCH duration of the configured downlink assignment, a transport block on the downlink shared channel according to the configured downlink assignment and may deliver it to the HARQ entity. The HARQ entity may then set the HARQ process ID to the HARQ process ID associated with this PDSCH duration. The UE 115-*a* may consider the new data indicator (NDI) bit for the corresponding HARQ process to have been toggled, and UE 115-*a* may indicate the presence of a configured downlink assignment and may deliver the stored HARQ information to the HARQ entity.

In other examples, however, a base station 105 may schedule downlink transmissions to a UE 115-*a* on a first PDSCH and a second PDSCH on overlapping time resources. In such cases, a timeline for receiving and processing the PDSCHs may be unknown. For example, if by the starting symbol of an SPS occasion, the UE 115-*a* has not decoded the PDCCH that assigns the dynamic PDSCH overlapping with the SPS occasion, the UE 115-*a* may not be able to provide HARQ feedback according to a timeline specified for reporting HARQ feedback for the SPS occasion. Further, the UE 115-*a* may not be able to determine whether to receive downlink data in the SPS occasion, since the SPS occasion may be cancelled by the PDCCH used to schedule the overlapping dynamic PDSCH. As described herein, a wireless communications system may support efficient techniques for scheduling an SPS downlink transmission and a dynamic downlink transmission.

Figure 9:
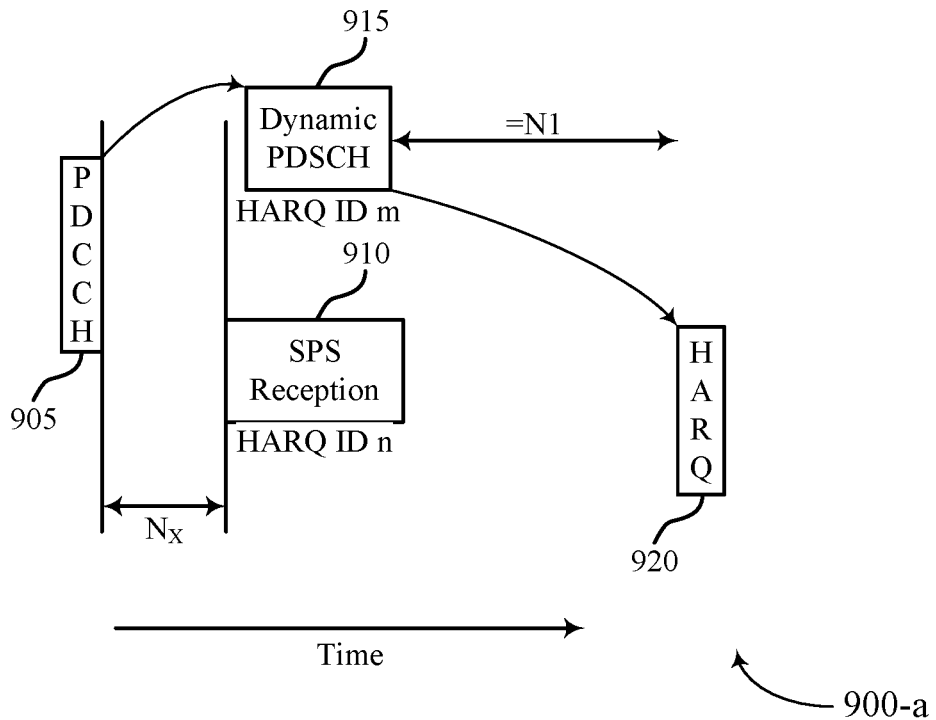
FIG. 9 illustrates an example of the scheduling of overlapping SPS and dynamic downlink transmissions in accordance with aspects of the present disclosure.
Figure 9:
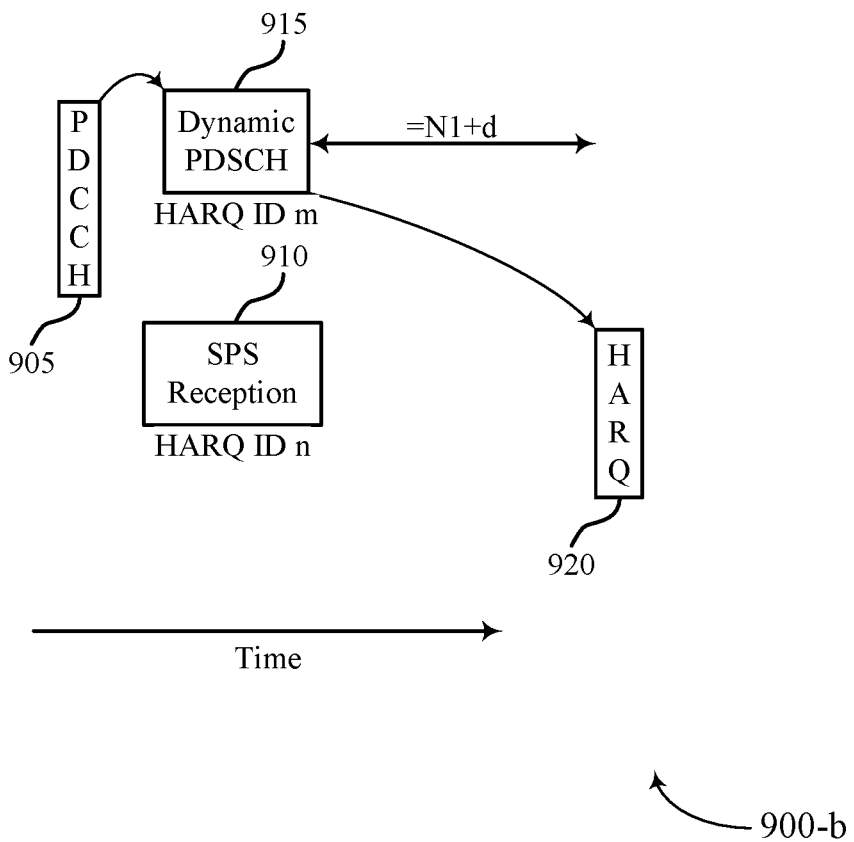

FIG. 9 illustrates an example of the scheduling 900 of overlapping SPS and dynamic downlink transmissions in accordance with aspects of the present disclosure. In the example of FIG. 9, a UE 115-*a* may be configured to transmit HARQ feedback for a dynamic PDSCH based on the timing of a PDCCH to ensure that the UE 115-*a* has sufficient time to process the PDCCH and the dynamic PDSCH. In a first example 900-*a*, UE 115-*a* may determine that a downlink grant in a PDCCH 905 used to schedule the dynamic PDSCH 915 is received a threshold amount of time ($N_x$) in advance of the SPS reception 910. Accordingly, in this example, UE 115-*a* may transmit HARQ feedback 920 for the dynamic PDSCH 915 after a processing time $N_1$. In a second example 900-*a*, UE 115-*a* may determine that a downlink grant in a PDCCH 905 used to schedule the dynamic PDSCH 915 is received less than a threshold amount of time ($N_x$) in advance of the SPS reception 910. Accordingly, in this example, UE 115-*a* may transmit HARQ feedback 920 for the dynamic PDSCH 915 after a processing time $N_1+d$. That is, if UE 115-*a* receives a PDCCH ending in symbol i that schedules a dynamic PDSCH that overlaps in time with an SPS occasion starting in symbol j, and the end of symbol i is less than a threshold number of symbols ($N_x$) before the beginning of symbol j, UE 115-*a* may provide HARQ feedback for the dynamic PDSCH $N_1+d$ symbols after the end of the dynamic PDSCH. In some cases, the value of d may depend on parameters such as a UE processing capability, a duration of the dynamic PDSCH, and/or a number of overlapping symbols between PDCCH 905 and SPS reception 910 (if any).

In some aspects, a UE 115-*a* may not be expected to be scheduled by a PDCCH ending in symbol i to receive a dynamic PDSCH overlapping in time with an SPS occasion starting in symbol j, if the end of symbol i is not at least a threshold number of symbols ($N_x$) before the beginning of symbol j. In such aspects, the threshold number of symbols may be determined according to a UE processing capability. Alternatively, if overlapping PDSCHs belong to different HARQ processes and have different TCI states (e.g., in multi-TRP or multi-panel), or are received on different cells, a UE 115-*a* may receive separate data (or the same data) on both PDSCHs (i.e., SPS and dynamic PDSCHs).

Figure 10:
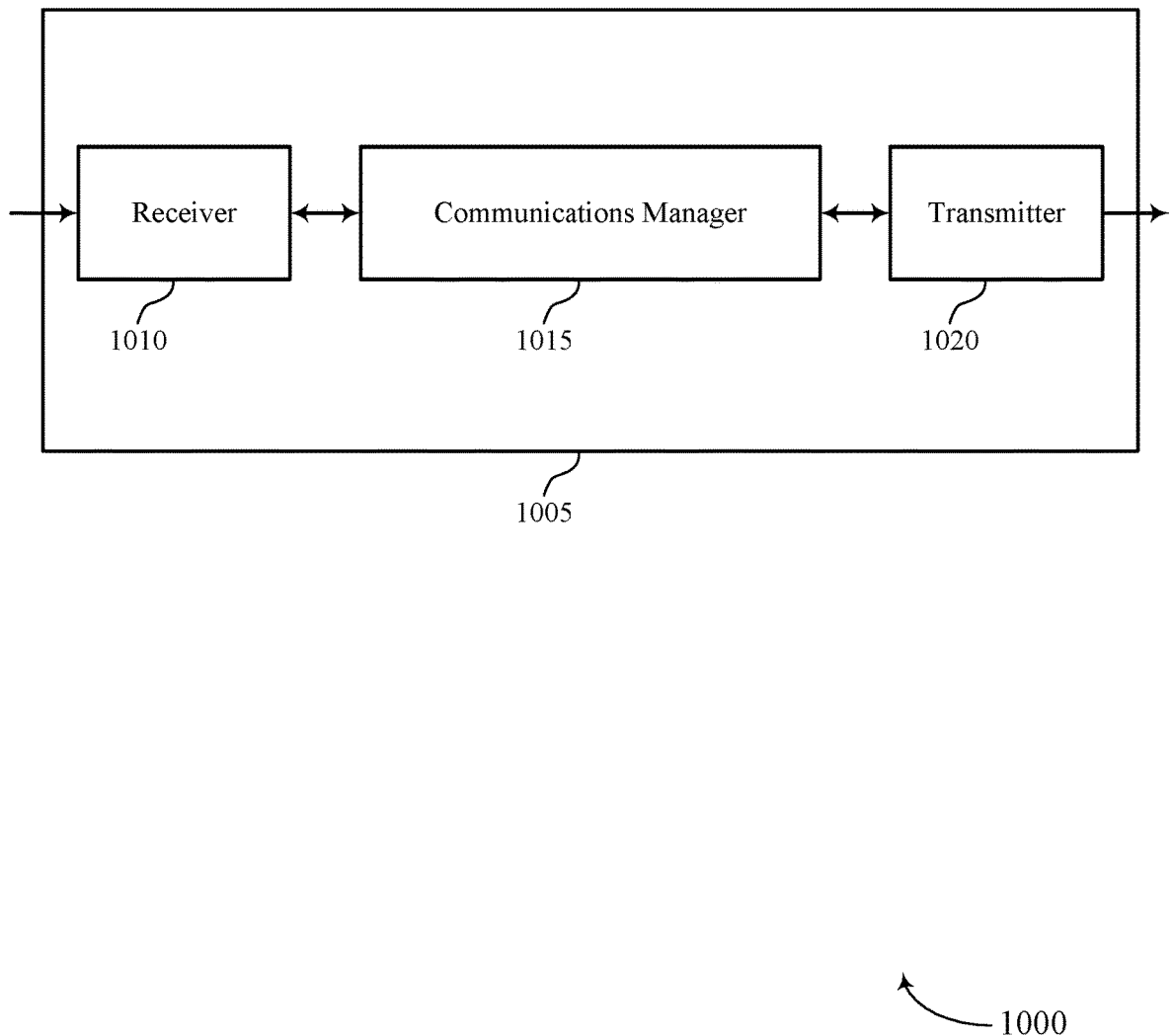
FIGS. 10 and 11 show block diagrams of devices that support coordination of SPS downlink transmissions and dynamic downlink transmissions in accordance with aspects of the present disclosure.

FIG. 10 shows a block diagram 1000 of a device 1005 that supports coordination of SPS downlink transmissions and dynamic downlink transmissions in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to coordination of SPS downlink transmissions and dynamic downlink transmissions, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive a downlink grant scheduling a dynamic downlink transmission from a base station, identify a semi-persistent scheduling occasion allocated for a semi-persistent scheduling downlink transmission from the base station, the semi-persistent scheduling downlink transmission being associated with a same feedback process identifier as the dynamic downlink transmission, receive either the first downlink data or no data in the semi-persistent scheduling downlink transmission based on the determining, determine that the dynamic downlink transmission is scheduled to occur after the semi-persistent scheduling downlink transmission and before an uplink feedback transmission for the semi-persistent scheduling downlink transmission, and receive first downlink data in the dynamic downlink transmission.

The communications manager 1015 may also receive a downlink grant scheduling a dynamic downlink transmission from a base station, identify a semi-persistent scheduling occasion allocated for a semi-persistent scheduling downlink transmission from the base station, the semi-persistent scheduling downlink transmission being associated with a same feedback process identifier as the dynamic downlink transmission, determine that the semi-persistent scheduling downlink transmission is scheduled to occur after the dynamic downlink transmission and before an uplink feedback transmission for the dynamic downlink transmission, receive either the first downlink data or no data in the semi-persistent scheduling downlink transmission based on the determining, and receive first downlink data in the dynamic downlink transmission.

The communications manager 1015 may also receive a downlink grant scheduling a dynamic downlink transmission from a base station, identify a semi-persistent scheduling occasion allocated for a semi-persistent scheduling downlink transmission from the base station, the semi-persistent scheduling occasion overlapping with the scheduled dynamic downlink transmission, determine whether the downlink grant is received a threshold amount of time in advance of the semi-persistent scheduling occasion, and decode first downlink data in the dynamic downlink transmission from the base station based at least in part on the downlink grant being received at least the threshold amount of time in advance of the semi-persistent scheduling occasion. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 1015 as described herein may be implemented to realize one or more potential advantages. One implementation may allow a UE to be able to receive downlink data in a second PDSCH when the second PDSCH is scheduled to be received after a first PDSCH and before HARQ feedback for the first PDSCH is transmitted. Because the UE may be able to receive downlink data in the second PDSCH, a base station may retransmit a transport block in the PDSCH, and the UE may have a higher chance of successfully decoding the transport block (e.g., based on combining the data received in the first and second PDSCHs). In another implementation, even if the UE expects no data in the second PDSCH, the base station may still be able to schedule PDSCHs for the UE freely without the UE experiencing any errors (e.g., without the UE being unable to determine how to interpret or handle the second PDSCH allocation). Further, the complexity at the base station associated with determining when to schedule dynamic PDSCHs may be negated. Further, in some cases, a processor at the UE may avoid attempting to decode a second PDSCH without first being able to identify the type of data (if any) in the second PDSCH.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
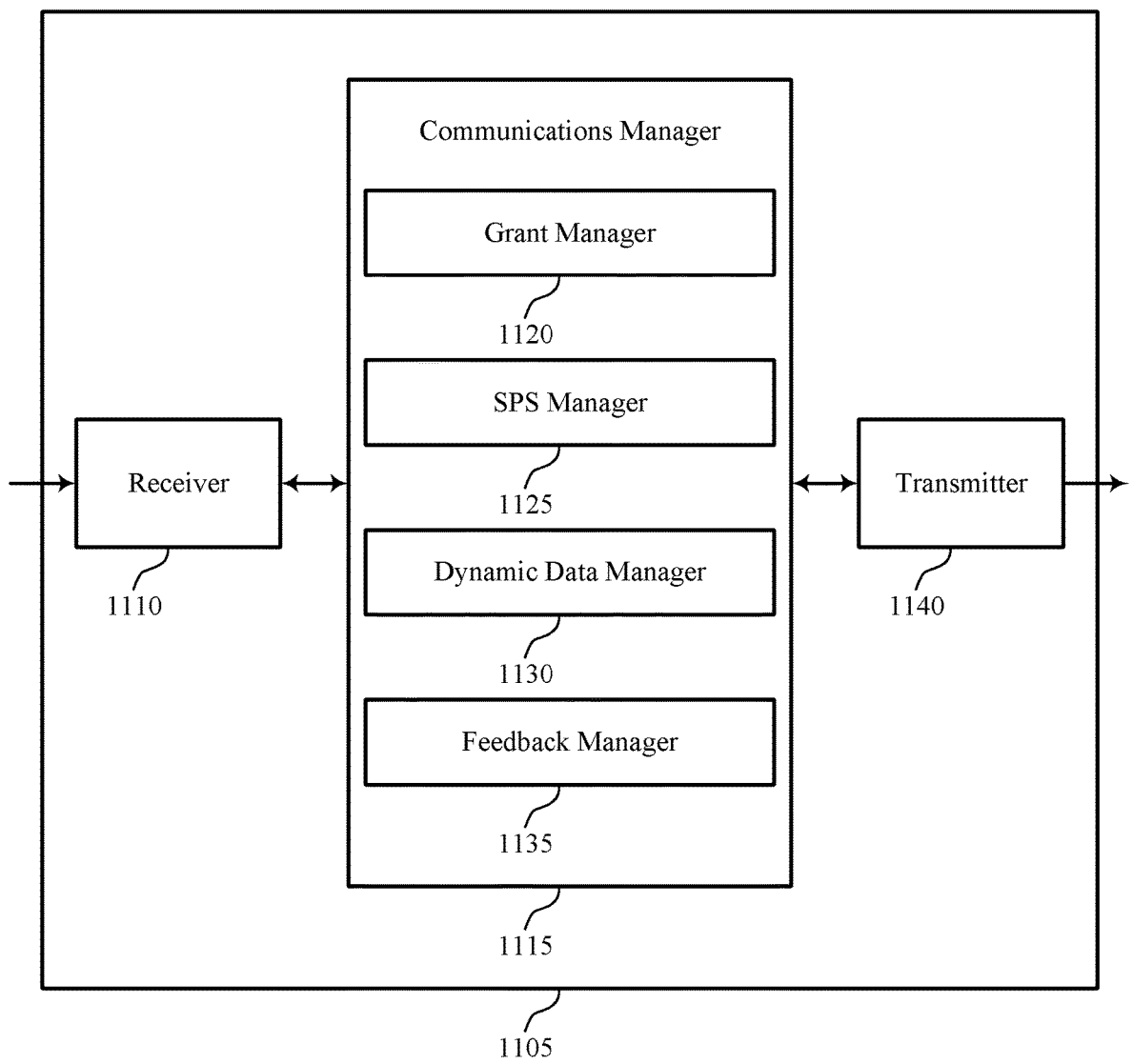

FIG. 11 shows a block diagram 1100 of a device 1105 that supports coordination of SPS downlink transmissions and dynamic downlink transmissions in accordance with aspects of the present disclosure. The device 1105 may be an example of aspects of a device 1005, or a UE 115 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to coordination of SPS downlink transmissions and dynamic downlink transmissions, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a grant manager 1120, a SPS manager 1125, a dynamic data manager 1130, and a feedback manager 1135. The communications manager 1115 may be an example of aspects of the communications manager 1310 described herein.

The grant manager 1120 may receive a downlink grant scheduling a dynamic downlink transmission from a base station. The SPS manager 1125 may identify a semi-persistent scheduling occasion allocated for a semi-persistent scheduling downlink transmission from the base station, the semi-persistent scheduling downlink transmission being associated with a same feedback process identifier as the dynamic downlink transmission. The dynamic data manager 1130 may determine that the dynamic downlink transmission is scheduled to occur after the semi-persistent scheduling downlink transmission and before an uplink feedback transmission for the semi-persistent scheduling downlink transmission and receive first downlink data in the dynamic downlink transmission. The dynamic data manager 1130 may determine whether the downlink grant is received a threshold amount of time in advance of the semi-persistent scheduling occasion and decode first downlink data in the dynamic downlink transmission from the base station based at least in part on the downlink grant being received at least the threshold amount of time in advance of the semi-persistent scheduling occasion. The SPS manager 1125 may receive either the first downlink data or no data in the semi-persistent scheduling downlink transmission based on the determining The grant manager 1120 may receive a downlink grant scheduling a dynamic downlink transmission from a base station. The SPS manager 1125 may identify a semi-persistent scheduling occasion allocated for a semi-persistent scheduling downlink transmission from the base station, the semi-persistent scheduling downlink transmission being associated with a same feedback process identifier as the dynamic downlink transmission, determine that the semi-persistent scheduling downlink transmission is scheduled to occur after the dynamic downlink transmission and before an uplink feedback transmission for the dynamic downlink transmission, and receive either the first downlink data or no data in the semi-persistent scheduling downlink transmission based on the determining. The dynamic data manager 1130 may receive first downlink data in the dynamic downlink transmission. The dynamic data manager 1130 may determine whether a physical downlink control channel (PDCCH) carrying the downlink grant ends the threshold amount of time in advance to a start of the semi-persistent scheduling occasion The grant manager 1120 may receive a downlink grant scheduling a dynamic downlink transmission from a base station. The SPS manager 1125 may identify a semi-persistent scheduling occasion allocated for a semi-persistent scheduling downlink transmission from the base station, the semi-persistent scheduling occasion overlapping with the scheduled dynamic downlink transmission. The dynamic data manager 1130 may receive first downlink data in the dynamic downlink transmission from the base station. The feedback manager 1135 may transmit an uplink feedback transmission for the dynamic downlink transmission based on the semi-persistent scheduling occasion overlapping with the scheduled dynamic downlink transmission and whether the downlink grant is received a threshold amount of time in advance of the semi-persistent scheduling occasion.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
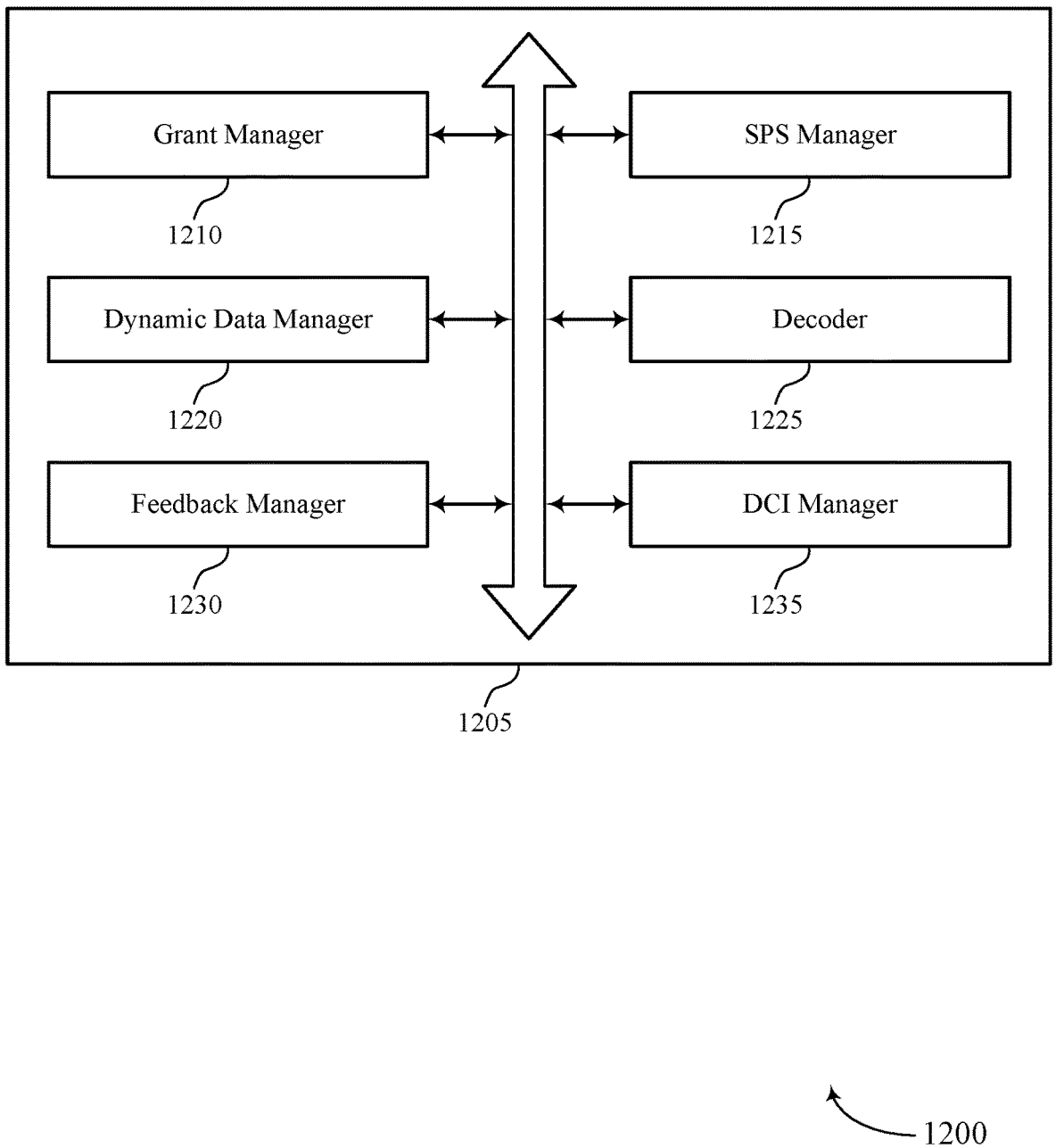
FIG. 12 shows a block diagram of a communications manager that supports coordination of SPS downlink transmissions and dynamic downlink transmissions in accordance with aspects of the present disclosure.

FIG. 12 shows a block diagram 1200 of a communications manager 1205 that supports coordination of SPS downlink transmissions and dynamic downlink transmissions in accordance with aspects of the present disclosure. The communications manager 1205 may be an example of aspects of a communications manager 1015, a communications manager 1115, or a communications manager 1310 described herein. The communications manager 1205 may include a grant manager 1210, a SPS manager 1215, a dynamic data manager 1220, a decoder 1225, a feedback manager 1230, and a DCI manager 1235. Each of these modules may communicate, directly or indirectly, with one another (e.g., via one or more buses).

The grant manager 1210 may receive a downlink grant scheduling a dynamic downlink transmission from a base station. In some examples, the grant manager 1210 may receive a downlink grant scheduling a dynamic downlink transmission from a base station. In some examples, the grant manager 1210 may receive a downlink grant scheduling a dynamic downlink transmission from a base station. In some examples, the grant manager 1210 may transmit the uplink feedback transmission for the dynamic downlink transmission after a processing time (N).

The SPS manager 1215 may identify a semi-persistent scheduling occasion allocated for a semi-persistent scheduling downlink transmission from the base station, the semi-persistent scheduling downlink transmission being associated with a same feedback process identifier as the dynamic downlink transmission. In some examples, the SPS manager 1215 may receive either the first downlink data or no data in the semi-persistent scheduling downlink transmission based on the determining. In some examples, the SPS manager 1215 may identify a semi-persistent scheduling occasion allocated for a semi-persistent scheduling downlink transmission from the base station, the semi-persistent scheduling downlink transmission being associated with a same feedback process identifier as the dynamic downlink transmission.

In some examples, the SPS manager 1215 may determine that the semi-persistent scheduling downlink transmission is scheduled to occur after the dynamic downlink transmission and before an uplink feedback transmission for the dynamic downlink transmission. In some examples, the SPS manager 1215 may receive either the first downlink data or no data in the semi-persistent scheduling downlink transmission based on the determining. In some examples, the SPS manager 1215 may identify a semi-persistent scheduling occasion allocated for a semi-persistent scheduling downlink transmission from the base station, the semi-persistent scheduling occasion overlapping with the scheduled dynamic downlink transmission.

In some examples, the SPS manager 1215 may avoid monitoring for downlink data in the semi-persistent scheduling occasion. In some examples, the SPS manager 1215 may avoid monitoring for semi-persistent scheduling downlink transmissions associated with the same feedback process identifier as the dynamic downlink transmission for the duration of the timer. In some examples, the SPS manager 1215 may no data is received in the semi-persistent scheduling downlink transmission, and a closest, previous semi-persistent scheduling downlink transmission that ends before the downlink grant is received is an initial transmission of the downlink data. In some examples, determining that the semi-persistent scheduling downlink transmission includes a retransmission of the first downlink data.

In some examples, the SPS manager 1215 may avoid monitoring for downlink data in the semi-persistent scheduling occasion. In some examples, the SPS manager 1215 may avoid monitoring for semi-persistent scheduling downlink transmissions associated with the same hybrid automatic repeat request identifier as the dynamic downlink transmission for the duration of the timer. In some examples, the SPS manager 1215 may determine that the number of symbols between the semi-persistent scheduling downlink transmission and the uplink feedback transmission for the dynamic downlink transmission is below a threshold. In some examples, the SPS manager 1215 may avoid monitoring for downlink data in the semi-persistent scheduling occasion based on the number of symbols being below the threshold. In some cases, the semi-persistent scheduling downlink transmission is associated with a same feedback process identifier as the dynamic downlink transmission.

The dynamic data manager 1220 may determine that the dynamic downlink transmission is scheduled to occur after the semi-persistent scheduling downlink transmission and before an uplink feedback transmission for the semi-persistent scheduling downlink transmission. In some examples, the dynamic data manager 1220 may receive first downlink data in the dynamic downlink transmission. In some examples, the dynamic data manager 1220 may receive first downlink data in the dynamic downlink transmission. In some examples, the dynamic data manager 1220 may receive first downlink data in the dynamic downlink transmission from the base station. In some examples, determining that the dynamic downlink transmission includes a retransmission of the first downlink data. In some examples, the dynamic data manager 1220 may determine that the semi-persistent scheduling occasion overlaps in time with the downlink grant or that the semi-persistent scheduling occasion is between the downlink grant and the dynamic downlink transmission.

The feedback manager 1230 may transmit an uplink feedback transmission for the dynamic downlink transmission based on the semi-persistent scheduling occasion overlapping with the scheduled dynamic downlink transmission and whether the downlink grant is received a threshold amount of time in advance of the semi-persistent scheduling occasion. In some examples, the feedback manager 1230 may start a timer associated with the feedback process identifier upon receiving the downlink grant for the dynamic downlink transmission. In some examples, the feedback manager 1230 may transmit the uplink feedback transmission for the semi-persistent scheduling downlink transmission. In some examples, the feedback manager 1230 may transmit an uplink feedback transmission for the dynamic downlink transmission.

In some examples, the feedback manager 1230 may transmit the single uplink feedback transmission for the semi-persistent scheduling downlink transmission and the dynamic downlink transmission. In some examples, the feedback manager 1230 may determine that a first uplink control channel allocated for the uplink feedback transmission for the semi-persistent scheduling downlink transmission overlaps in time with a second uplink control channel allocated for an uplink feedback transmission for the dynamic downlink transmission. In some examples, the feedback manager 1230 may avoid transmitting the uplink feedback transmission for the semi-persistent scheduling downlink transmission on the first uplink control channel and transmit the uplink feedback transmission for the dynamic downlink transmission on the second uplink control channel. or the feedback manager 1230 may transmit the uplink feedback transmission for the semi-persistent scheduling downlink transmission on the first uplink control channel and transmitting the uplink feedback transmission for the dynamic downlink transmission on the second uplink control channel.

In some examples, the feedback manager 1230 may start a timer associated with the hybrid automatic repeat request identifier upon receiving the downlink grant for the dynamic downlink transmission. In some examples, the feedback manager 1230 may transmit the uplink feedback transmission for the dynamic downlink transmission. In some examples, the feedback manager 1230 may transmit an uplink feedback transmission or the semi-persistent scheduling downlink transmission. In some examples, the feedback manager 1230 may transmit the single uplink feedback transmission for the dynamic downlink transmission and the semi-persistent scheduling downlink transmission. In some examples, the feedback manager 1230 may determine that a first uplink control channel allocated for the uplink feedback transmission for the dynamic downlink transmission overlaps in time with a second uplink control channel allocated for an uplink feedback transmission for the semi-persistent scheduling downlink transmission.

In some examples, the feedback manager 1230 may transmit the uplink feedback transmission for the dynamic downlink transmission on the first uplink control channel and avoid transmitting the uplink feedback transmission for the semi-persistent scheduling downlink transmission on the second uplink control channel or the feedback manager 1230 may transmit the uplink feedback transmission for the dynamic downlink transmission on the first uplink control channel and transmit the uplink feedback transmission for the semi-persistent scheduling downlink transmission on the second uplink control channel. In some examples, the feedback manager 1230 may transmit the uplink feedback transmission for the dynamic downlink transmission after a processing time (N) plus an additional amount of time (d). In some cases, the single uplink feedback transmission for the semi-persistent scheduling downlink transmission and the dynamic downlink transmission is transmitted on an uplink control channel allocated in the downlink grant.

In some cases, the single uplink feedback transmission for the semi-persistent scheduling downlink transmission and the dynamic downlink transmission includes individual feedback for each of the semi-persistent scheduling downlink transmission and the dynamic downlink transmission, combined feedback for the semi-persistent scheduling downlink transmission and the dynamic downlink transmission, or a combination thereof. In some cases, the single uplink feedback transmission for the dynamic downlink transmission and the semi-persistent scheduling downlink transmission is transmitted on an uplink control channel allocated in the downlink grant. In some cases, the single uplink feedback transmission for the semi-persistent scheduling downlink transmission and the dynamic downlink transmission includes individual feedback for each of the dynamic downlink transmission and the semi-persistent scheduling downlink transmission, combined feedback for the dynamic downlink transmission and the semi-persistent scheduling downlink transmission, or a combination thereof. In some cases, the additional amount of time is based on a processing capability of the UE, a duration of the dynamic downlink transmission, a number of overlapping symbols between the downlink grant and the semi-persistent scheduling occasion, or a combination thereof. In some cases, the threshold amount of time is based on a processing capability of the UE.

The decoder 1225 may combine the first downlink data received in the semi-persistent scheduling downlink transmission with the first downlink data received in the dynamic downlink transmission. In some examples, the decoder 1225 may determine whether the semi-persistent scheduling downlink transmission or a previous semi-persistent scheduling downlink transmission is an initial transmission of the first downlink data. In some examples, the decoder 1225 may determine that the semi-persistent scheduling downlink transmission is the initial transmission of the first downlink data. In some examples, the decoder 1225 may determine that the downlink grant overlaps with the semi-persistent scheduling occasion or that the number of symbols between the downlink grant and the semi-persistent scheduling occasion is below a threshold.

In some examples, the decoder 1225 may determine that the previous semi-persistent scheduling downlink transmission is the initial transmission of the first downlink data. In some examples, the decoder 1225 may combine the first downlink data received in the semi-persistent scheduling downlink transmission and the previous semi-persistent scheduling downlink transmission with the first downlink data received in the dynamic downlink transmission. In some examples, the decoder 1225 may determine that the downlink grant fails to overlap with the semi-persistent scheduling occasion or that the number of symbols between the downlink grant and the semi-persistent scheduling occasion is above a threshold. In some examples, the decoder 1225 may combine the first downlink data received in the dynamic downlink transmission with the first downlink data received in the semi-persistent scheduling downlink transmission.

In some examples, the decoder 1225 may determine that the number of symbols between the semi-persistent scheduling downlink transmission and the uplink feedback transmission for the dynamic downlink transmission is above a threshold. In some examples, determining that the semi-persistent scheduling downlink transmission includes a retransmission of the first downlink data based on the number of symbols being above the threshold. In some cases, the threshold is based on a capability of the UE.

The DCI manager 1235 may receive downlink control information that indicates whether the semi-persistent scheduling downlink transmission or the previous semi-persistent scheduling downlink transmission is the initial transmission of the first downlink data. In some cases, the downlink control information includes a bit that indicates whether the semi-persistent scheduling downlink transmission or the previous semi-persistent scheduling downlink transmission is the initial transmission of the first downlink data. In some cases, the downlink control information includes an indication of a redundancy version associated with the dynamic downlink transmission, and the redundancy version indicates whether the semi-persistent scheduling downlink transmission or the previous semi-persistent scheduling downlink transmission is the initial transmission of the first downlink data.

In some cases, a redundancy version index of zero indicates that the semi-persistent scheduling downlink transmission that overlaps with the downlink grant or starts after the downlink grant is received is the initial transmission of the first downlink data. In some cases, the redundancy version associated with the dynamic downlink transmission is preconfigured. In some cases, a non-zero redundancy version index indicates that the previous semi-persistent scheduling downlink transmission that ends before the downlink grant is received is the initial transmission of the first downlink data. In some cases, the redundancy version associated with the dynamic downlink transmission corresponds to the non-zero redundancy version index.

Figure 13:
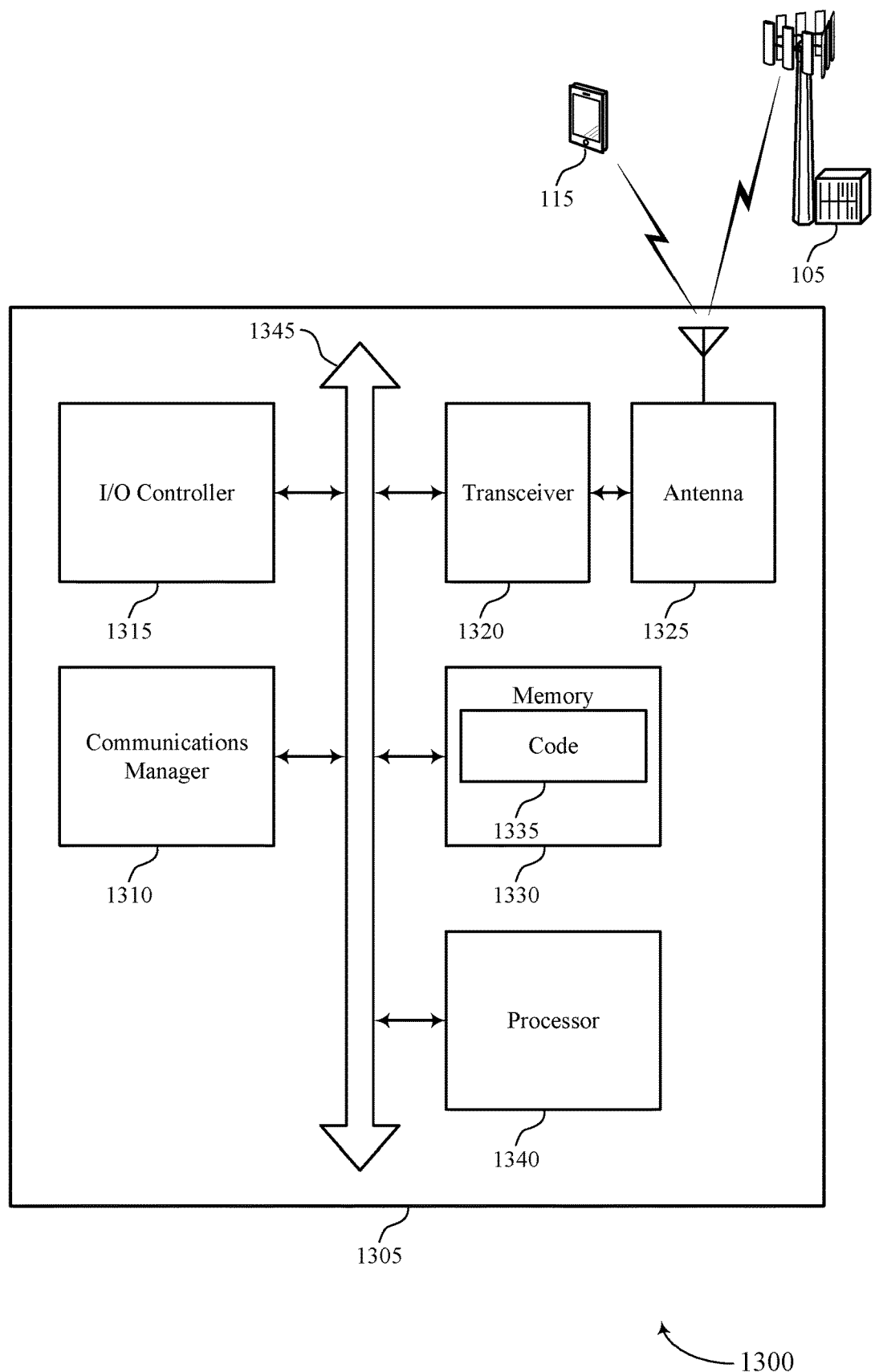
FIG. 13 shows a diagram of a system including a device that supports coordination of SPS downlink transmissions and dynamic downlink transmissions in accordance with aspects of the present disclosure.

FIG. 13 shows a diagram of a system 1300 including a device 1305 that supports coordination of SPS downlink transmissions and dynamic downlink transmissions in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may receive a downlink grant scheduling a dynamic downlink transmission from a base station, identify a semi-persistent scheduling occasion allocated for a semi-persistent scheduling downlink transmission from the base station, the semi-persistent scheduling downlink transmission being associated with a same feedback process identifier as the dynamic downlink transmission, receive either the first downlink data or no data in the semi-persistent scheduling downlink transmission based on the determining, determine that the dynamic downlink transmission is scheduled to occur after the semi-persistent scheduling downlink transmission and before an uplink feedback transmission for the semi-persistent scheduling downlink transmission, and receive first downlink data in the dynamic downlink transmission.

The communications manager 1310 may also receive a downlink grant scheduling a dynamic downlink transmission from a base station, identify a semi-persistent scheduling occasion allocated for a semi-persistent scheduling downlink transmission from the base station, the semi-persistent scheduling downlink transmission being associated with a same feedback process identifier as the dynamic downlink transmission, determine that the semi-persistent scheduling downlink transmission is scheduled to occur after the dynamic downlink transmission and before an uplink feedback transmission for the dynamic downlink transmission, receive either the first downlink data or no data in the semi-persistent scheduling downlink transmission based on the determining, and receive first downlink data in the dynamic downlink transmission.

The communications manager 1310 may also receive a downlink grant scheduling a dynamic downlink transmission from a base station, identify a semi-persistent scheduling occasion allocated for a semi-persistent scheduling downlink transmission from the base station, the semi-persistent scheduling occasion overlapping with the scheduled dynamic downlink transmission, receive first downlink data in the dynamic downlink transmission from the base station, and transmit an uplink feedback transmission for the dynamic downlink transmission based on the semi-persistent scheduling occasion overlapping with the scheduled dynamic downlink transmission and whether the downlink grant is received a threshold amount of time in advance of the semi-persistent scheduling occasion.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting coordination of SPS downlink transmissions and dynamic downlink transmissions).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
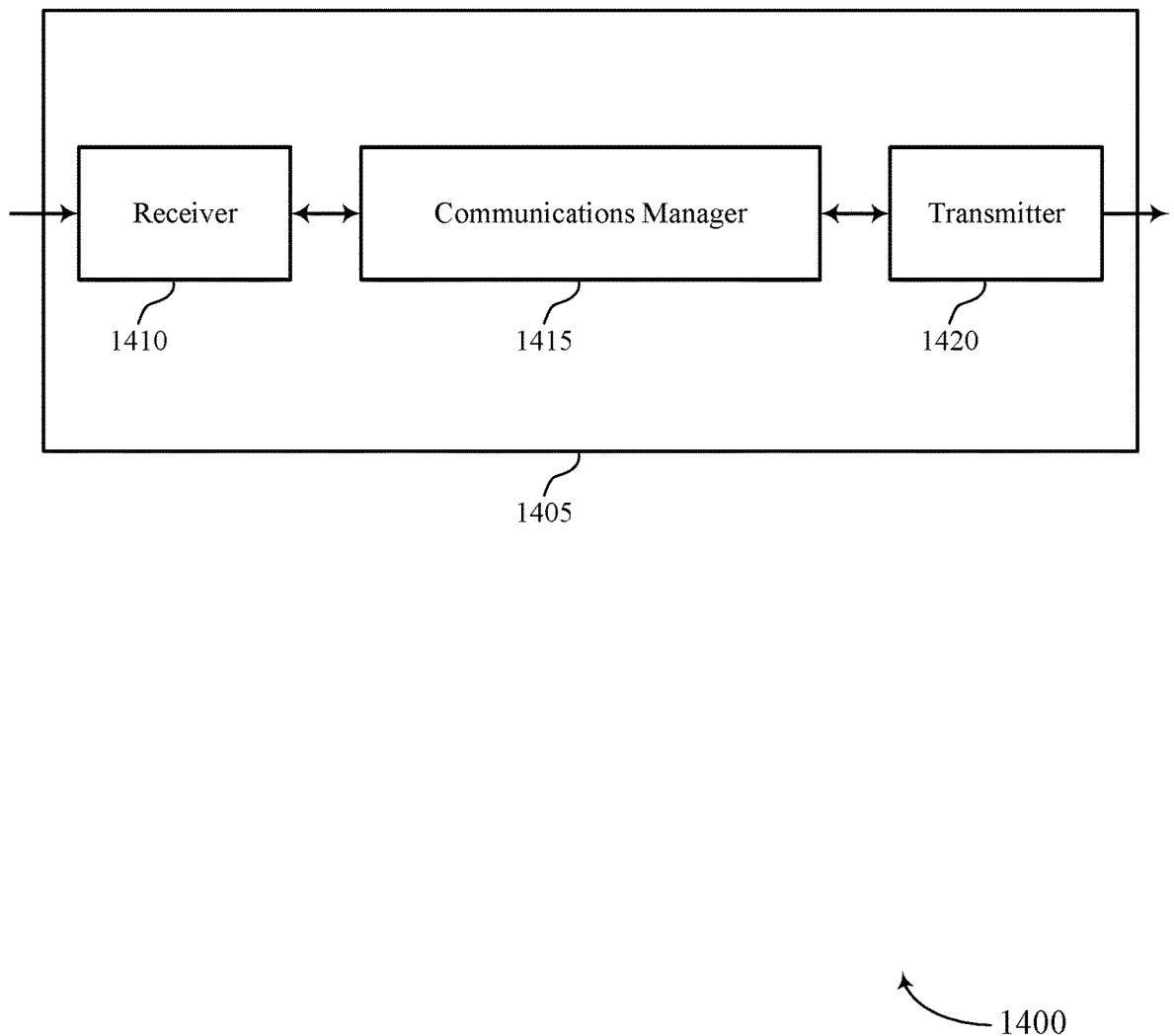
FIGS. 14 and 15 show block diagrams of devices that support coordination of SPS downlink transmissions and dynamic downlink transmissions in accordance with aspects of the present disclosure.

FIG. 14 shows a block diagram 1400 of a device 1405 that supports coordination of SPS downlink transmissions and dynamic downlink transmissions in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to coordination of SPS downlink transmissions and dynamic downlink transmissions, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may transmit a downlink grant scheduling a dynamic downlink transmission to a UE, identify a semi-persistent scheduling occasion allocated for a semi-persistent scheduling downlink transmission to the UE, the semi-persistent scheduling downlink transmission being associated with a same feedback process identifier as the dynamic downlink transmission, transmit either the first downlink data or no data in the semi-persistent scheduling downlink transmission based on the determining, determine that the dynamic downlink transmission is scheduled to occur after the semi-persistent scheduling downlink transmission and before an uplink feedback transmission from the UE for the semi-persistent scheduling downlink transmission, and transmit first downlink data in the dynamic downlink transmission.

The communications manager 1415 may also transmit a downlink grant scheduling a dynamic downlink transmission to a UE, identify a semi-persistent scheduling occasion allocated for a semi-persistent scheduling downlink transmission to the UE, the semi-persistent scheduling downlink transmission being associated with a same feedback process identifier as the dynamic downlink transmission, determine that the semi-persistent scheduling downlink transmission is scheduled to occur after the dynamic downlink transmission and before an uplink feedback transmission from the UE for the dynamic downlink transmission, transmit either the first downlink data or no data in the semi-persistent scheduling downlink transmission based on the determining, and transmit first downlink data in the dynamic downlink transmission.

The communications manager 1415 may also identify a semi-persistent scheduling occasion allocated for a semi-persistent scheduling downlink transmission to a UE, identify resources on which to schedule a dynamic downlink transmission to the UE, where the identified resources overlap with the semi-persistent scheduling occasion, determine that there is sufficient time for a downlink grant to be transmitted a threshold amount of time in advance of the semi-persistent scheduling occasion, and transmit the downlink grant scheduling the dynamic downlink transmission the threshold amount of time in advance of the semi-persistent scheduling occasion based on the determining.

The communications manager 1415 may also transmit a downlink grant scheduling a dynamic downlink transmission to a UE, identify a semi-persistent scheduling occasion allocated for a semi-persistent scheduling downlink transmission to the UE, the semi-persistent scheduling occasion overlapping with the scheduled dynamic downlink transmission, transmit first downlink data in the dynamic downlink transmission to the UE, and receive, from the UE, an uplink feedback transmission for the dynamic downlink transmission based on the semi-persistent scheduling occasion overlapping with the scheduled dynamic downlink transmission and whether the downlink grant is transmitted a threshold amount of time in advance of the semi-persistent scheduling occasion. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
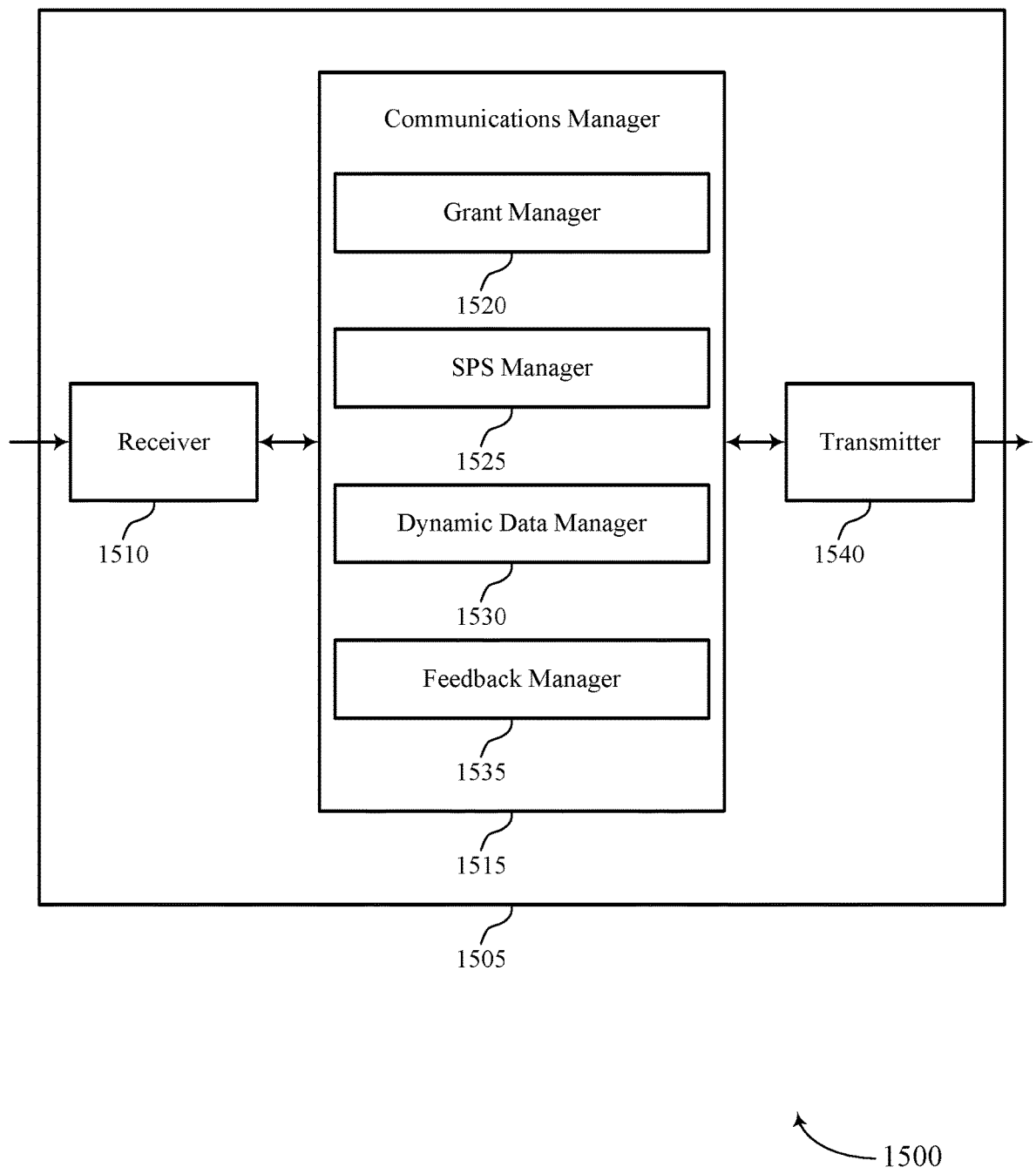

FIG. 15 shows a block diagram 1500 of a device 1505 that supports coordination of SPS downlink transmissions and dynamic downlink transmissions in accordance with aspects of the present disclosure. The device 1505 may be an example of aspects of a device 1405, or a base station 105 as described herein. The device 1505 may include a receiver 1510, a communications manager 1515, and a transmitter 1540. The device 1505 may also include a processor. Each of these components may be in communication with one another (e.g., via one or more buses).

The receiver 1510 may receive information such as packets, user data, or control information associated with various information channels (e.g., control channels, data channels, and information related to coordination of SPS downlink transmissions and dynamic downlink transmissions, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a grant manager 1520, a SPS manager 1525, a dynamic data manager 1530, and a feedback manager 1535. The communications manager 1515 may be an example of aspects of the communications manager 1710 described herein.

The grant manager 1520 may transmit a downlink grant scheduling a dynamic downlink transmission to a UE. The SPS manager 1525 may identify a semi-persistent scheduling occasion allocated for a semi-persistent scheduling downlink transmission to the UE, the semi-persistent scheduling downlink transmission being associated with a same feedback process identifier as the dynamic downlink transmission. The dynamic data manager 1530 may determine that the dynamic downlink transmission is scheduled to occur after the semi-persistent scheduling downlink transmission and before an uplink feedback transmission from the UE for the semi-persistent scheduling downlink transmission and transmit first downlink data in the dynamic downlink transmission. The SPS manager 1525 may transmit either the first downlink data or no data in the semi-persistent scheduling downlink transmission based on the determining The grant manager 1520 may transmit a downlink grant scheduling a dynamic downlink transmission to a UE. The SPS manager 1525 may identify a semi-persistent scheduling occasion allocated for a semi-persistent scheduling downlink transmission to the UE, the semi-persistent scheduling downlink transmission being associated with a same feedback process identifier as the dynamic downlink transmission, determine that the semi-persistent scheduling downlink transmission is scheduled to occur after the dynamic downlink transmission and before an uplink feedback transmission from the UE for the dynamic downlink transmission, and transmit either the first downlink data or no data in the semi-persistent scheduling downlink transmission based on the determining. The dynamic data manager 1530 may transmit first downlink data in the dynamic downlink transmission.

The SPS manager 1525 may identify a semi-persistent scheduling occasion allocated for a semi-persistent scheduling downlink transmission to a UE. The dynamic data manager 1530 may identify resources on which to schedule a dynamic downlink transmission to the UE, where the identified resources overlap with the semi-persistent scheduling occasion. The grant manager 1520 may determine that there is sufficient time for a downlink grant to be transmitted a threshold amount of time in advance of the semi-persistent scheduling occasion and transmit the downlink grant scheduling the dynamic downlink transmission the threshold amount of time in advance of the semi-persistent scheduling occasion based on the determining.

The grant manager 1520 may transmit a downlink grant scheduling a dynamic downlink transmission to a UE. The SPS manager 1525 may identify a semi-persistent scheduling occasion allocated for a semi-persistent scheduling downlink transmission to the UE, the semi-persistent scheduling occasion overlapping with the scheduled dynamic downlink transmission. The dynamic data manager 1530 may transmit first downlink data in the dynamic downlink transmission to the UE. The feedback manager 1535 may receive, from the UE, an uplink feedback transmission for the dynamic downlink transmission based on the semi-persistent scheduling occasion overlapping with the scheduled dynamic downlink transmission and whether the downlink grant is transmitted a threshold amount of time in advance of the semi-persistent scheduling occasion.

The transmitter 1540 may transmit signals generated by other components of the device 1505. In some examples, the transmitter 1540 may be collocated with a receiver 1510 in a transceiver module. For example, the transmitter 1540 may be an example of aspects of the transceiver 1720 described with reference to FIG. 17. The transmitter 1540 may utilize a single antenna or a set of antennas.

Figure 16:
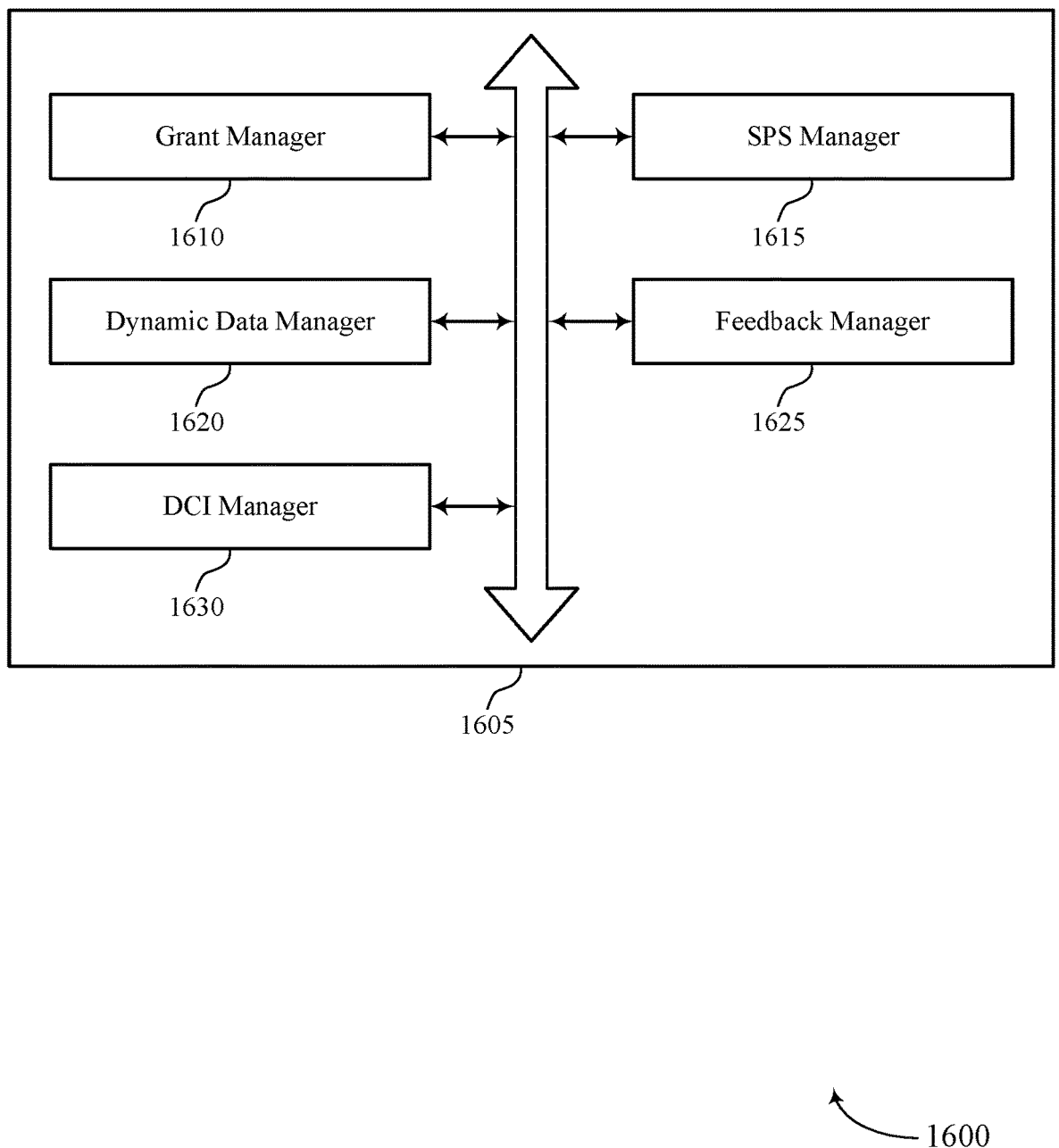
FIG. 16 shows a block diagram of a communications manager that supports coordination of SPS downlink transmissions and dynamic downlink transmissions in accordance with aspects of the present disclosure.

FIG. 16 shows a block diagram 1600 of a communications manager 1605 that supports coordination of SPS downlink transmissions and dynamic downlink transmissions in accordance with aspects of the present disclosure. The communications manager 1605 may be an example of aspects of a communications manager 1415, a communications manager 1515, or a communications manager 1710 described herein. The communications manager 1605 may include a grant manager 1610, a SPS manager 1615, a dynamic data manager 1620, a feedback manager 1625, and a DCI manager 1630. Each of these modules may communicate, directly or indirectly, with one another (e.g., via one or more buses).

The grant manager 1610 may transmit a downlink grant scheduling a dynamic downlink transmission to a UE. In some examples, the grant manager 1610 may transmit a downlink grant scheduling a dynamic downlink transmission to a UE. In some examples, the grant manager 1610 may determine that there is sufficient time for a downlink grant to be transmitted a threshold amount of time in advance of the semi-persistent scheduling occasion. In some examples, the grant manager 1610 may transmit the downlink grant scheduling the dynamic downlink transmission the threshold amount of time in advance of the semi-persistent scheduling occasion based on the determining. In some examples, the grant manager 1610 may transmit a downlink grant scheduling a dynamic downlink transmission to a UE. In some examples, the grant manager 1610 may receive an uplink feedback transmission for the dynamic downlink transmission after a processing time (N). In some cases, the threshold amount of time is based on a processing capability of the UE.

The SPS manager 1615 may identify a semi-persistent scheduling occasion allocated for a semi-persistent scheduling downlink transmission to the UE, the semi-persistent scheduling downlink transmission being associated with a same feedback process identifier as the dynamic downlink transmission. In some examples, the SPS manager 1615 may transmit either the first downlink data or no data in the semi-persistent scheduling downlink transmission based on the determining. In some examples, the SPS manager 1615 may identify a semi-persistent scheduling occasion allocated for a semi-persistent scheduling downlink transmission to the UE, the semi-persistent scheduling downlink transmission being associated with a same feedback process identifier as the dynamic downlink transmission. In some examples, the SPS manager 1615 may determine that the semi-persistent scheduling downlink transmission is scheduled to occur after the dynamic downlink transmission and before an uplink feedback transmission from the UE for the dynamic downlink transmission.

In some examples, the SPS manager 1615 may transmit either the first downlink data or no data in the semi-persistent scheduling downlink transmission based on the determining. In some examples, the SPS manager 1615 may identify a semi-persistent scheduling occasion allocated for a semi-persistent scheduling downlink transmission to a UE. In some examples, the SPS manager 1615 may identify a semi-persistent scheduling occasion allocated for a semi-persistent scheduling downlink transmission to the UE, the semi-persistent scheduling occasion overlapping with the scheduled dynamic downlink transmission. In some examples, the SPS manager 1615 may avoid transmitting semi-persistent scheduling downlink transmissions associated with the same feedback process identifier as the dynamic downlink transmission for the duration of the timer.

In some examples, the SPS manager 1615 may avoid transmitting semi-persistent scheduling downlink transmissions associated with the same feedback process identifier as the dynamic downlink transmission for the duration of the timer. In some examples, the SPS manager 1615 may determine that the number of symbols between the semi-persistent downlink transmission and the uplink feedback transmission for the dynamic downlink transmission is above a threshold. In some examples, the SPS manager 1615 may retransmit the first downlink data in the semi-persistent scheduling downlink transmission. In some examples, the SPS manager 1615 may determine that the number of symbols between the semi-persistent downlink transmission and the uplink feedback transmission for the dynamic downlink transmission is below a threshold. In some examples, the SPS manager 1615 may avoid transmitting downlink data in the semi-persistent scheduling occasion.

In some examples, the SPS manager 1615 may transmit the semi-persistent scheduling downlink transmission and the dynamic downlink transmission on the overlapping resources. In some cases, the semi-persistent scheduling downlink transmission is associated with a same feedback process identifier as the dynamic downlink transmission. In some cases, the semi-persistent scheduling downlink transmission is associated with a same feedback process identifier as the dynamic downlink transmission.

The dynamic data manager 1620 may determine that the dynamic downlink transmission is scheduled to occur after the semi-persistent scheduling downlink transmission and before an uplink feedback transmission from the UE for the semi-persistent scheduling downlink transmission. In some examples, the dynamic data manager 1620 may transmit first downlink data in the dynamic downlink transmission. In some examples, the dynamic data manager 1620 may transmit first downlink data in the dynamic downlink transmission. In some examples, the dynamic data manager 1620 may identify resources on which to schedule a dynamic downlink transmission to the UE, where the identified resources overlap with the semi-persistent scheduling occasion. In some examples, the dynamic data manager 1620 may transmit first downlink data in the dynamic downlink transmission to the UE. In some examples, the dynamic data manager 1620 may determine that the semi-persistent scheduling occasion overlaps in time with the downlink grant or that the semi-persistent scheduling occasion is between the downlink grant and the dynamic downlink transmission. In some examples, the dynamic data manager 1620 may transmit the first downlink data in the dynamic downlink transmission.

The feedback manager 1625 may receive, from the UE, an uplink feedback transmission for the dynamic downlink transmission based on the semi-persistent scheduling occasion overlapping with the scheduled dynamic downlink transmission and whether the downlink grant is transmitted a threshold amount of time in advance of the semi-persistent scheduling occasion. In some examples, the feedback manager 1625 may start a timer associated with the feedback process identifier upon transmitting the downlink grant for the dynamic downlink transmission. In some examples, the feedback manager 1625 may receive the uplink feedback transmission for the semi-persistent scheduling downlink transmission. In some examples, the feedback manager 1625 may receive an uplink feedback transmission for the dynamic downlink transmission.

In some examples, the feedback manager 1625 may receive the single uplink feedback transmission for the semi-persistent scheduling downlink transmission and the dynamic downlink transmission. In some examples, the feedback manager 1625 may determine that a first uplink control channel allocated for the uplink feedback transmission for the semi-persistent scheduling downlink transmission overlaps in time with a second uplink control channel allocated for an uplink feedback transmission for the dynamic downlink transmission. In some examples, the feedback manager 1625 may receive the uplink feedback transmission for the dynamic downlink transmission on the second uplink control channel, or the feedback manager 1625 may receive the uplink feedback transmission for the semi-persistent scheduling downlink transmission on the first uplink control channel and receiving the uplink feedback transmission for the dynamic downlink transmission on the second uplink control channel.

In some examples, the feedback manager 1625 may start a timer associated with the feedback process identifier upon transmitting the downlink grant for the dynamic downlink transmission. In some examples, the feedback manager 1625 may receive the uplink feedback transmission for the dynamic downlink transmission. In some examples, the feedback manager 1625 may receive an uplink feedback transmission for the semi-persistent scheduling downlink transmission. In some examples, the feedback manager 1625 may receive the single uplink feedback transmission for the dynamic downlink transmission and the semi-persistent scheduling downlink transmission. In some examples, the feedback manager 1625 may determine that a first uplink control channel allocated for the uplink feedback transmission for the dynamic downlink transmission overlaps in time with a second uplink control channel allocated for an uplink feedback transmission for the semi-persistent scheduling downlink transmission.

In some examples, the feedback manager 1625 may receive the uplink feedback transmission for the dynamic downlink transmission on the first uplink control channel, or the feedback manager 1625 may receive the uplink feedback transmission for the dynamic downlink transmission on the first uplink control channel and receiving the uplink feedback transmission k for the semi-persistent scheduling downlink transmission on the second uplink control channel. In some examples, the feedback manager 1625 may receive an uplink feedback transmission for the dynamic downlink transmission after a processing time (N) plus an additional amount of time (d). In some cases, the single uplink feedback transmission for the semi-persistent scheduling downlink transmission and the dynamic downlink transmission is received on an uplink control channel allocated in the downlink grant.

In some cases, the single uplink feedback transmission for the semi-persistent scheduling downlink transmission and the dynamic downlink transmission includes individual feedback for each of the semi-persistent scheduling downlink transmission and the dynamic downlink transmission, combined feedback for the semi-persistent scheduling downlink transmission and the dynamic downlink transmission, or a combination thereof. In some cases, the single uplink feedback transmission for the dynamic downlink transmission and the semi-persistent scheduling downlink transmission is received on an uplink control channel allocated in the downlink grant.

In some cases, the single uplink feedback transmission for the semi-persistent scheduling downlink transmission and the dynamic downlink transmission includes individual feedback for each of the dynamic downlink transmission and the semi-persistent scheduling downlink transmission, combined feedback for the dynamic downlink transmission and the semi-persistent scheduling downlink transmission, or a combination thereof. In some cases, the additional amount of time is based on a processing capability of the UE, a duration of the dynamic downlink transmission, a number of overlapping symbols between the downlink grant and the semi-persistent scheduling occasion, or a combination thereof. In some cases, the threshold amount of time is based on a processing capability of the UE.

The DCI manager 1630 may transmit downlink control information that indicates whether the semi-persistent scheduling downlink transmission or a previous semi-persistent scheduling downlink transmission is an initial transmission of the first downlink data. In some cases, the downlink control information includes a bit that indicates whether the semi-persistent scheduling downlink transmission or the previous semi-persistent scheduling downlink transmission is the initial transmission of the first downlink data. In some cases, the downlink control information includes an indication of a redundancy version associated with the dynamic downlink transmission, and the redundancy version indicates whether the semi-persistent scheduling downlink transmission or the previous semi-persistent scheduling downlink transmission is the initial transmission of the first downlink data.

In some cases, a redundancy version index of zero indicates that the semi-persistent scheduling downlink transmission that overlaps with the downlink grant or starts after the downlink grant is transmitted is the initial transmission of the first downlink data. In some cases, the redundancy version associated with the dynamic downlink transmission is preconfigured. In some cases, a non-zero redundancy version index indicates that the previous semi-persistent scheduling downlink transmission that ends before the downlink grant is transmitted is the initial transmission of the first downlink data. In some cases, the redundancy version associated with the dynamic downlink transmission corresponds to the non-zero redundancy version index.

Figure 17:
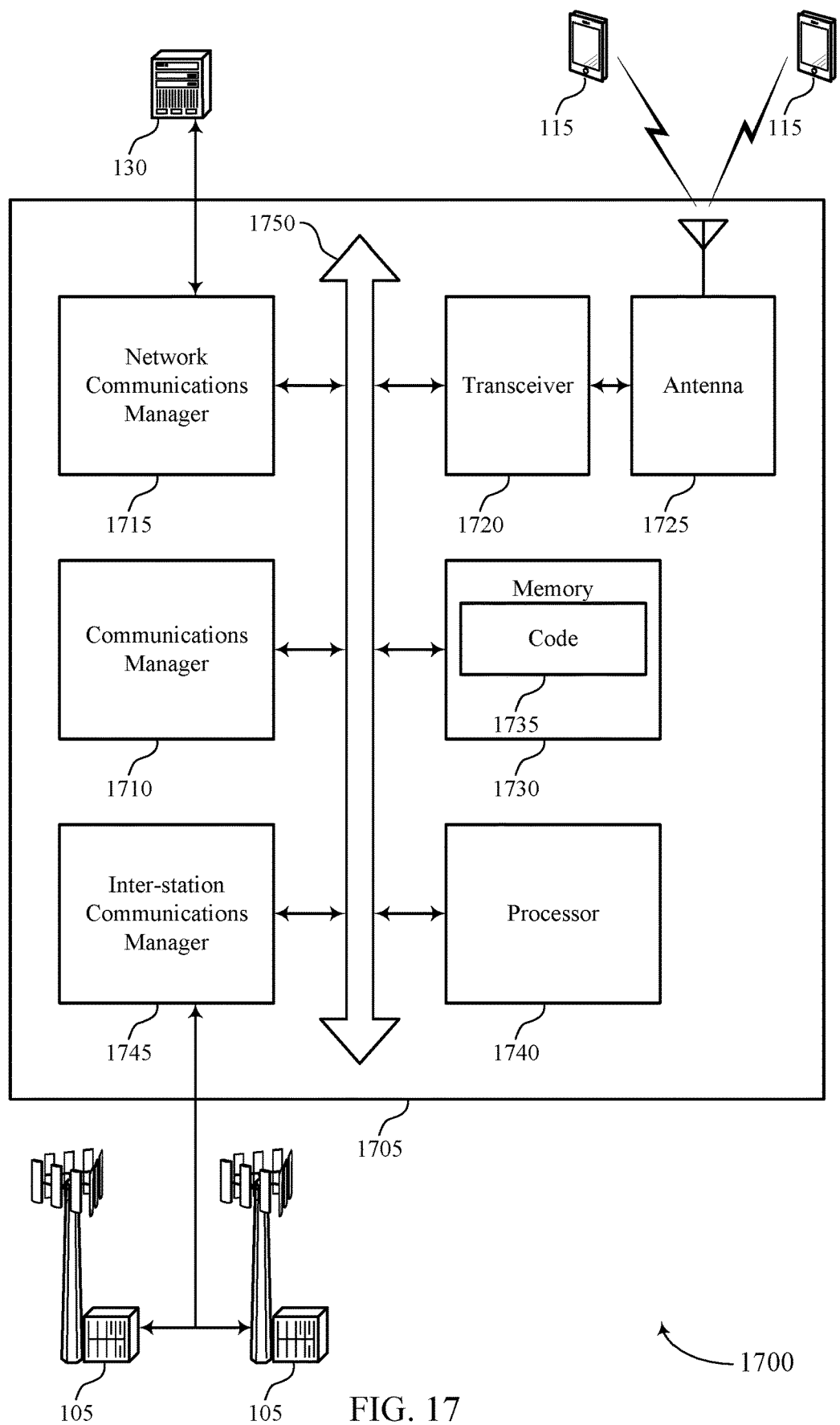
FIG. 17 shows a diagram of a system including a device that supports coordination of SPS downlink transmissions and dynamic downlink transmissions in accordance with aspects of the present disclosure.

FIG. 17 shows a diagram of a system 1700 including a device 1705 that supports coordination of SPS downlink transmissions and dynamic downlink transmissions in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may transmit a downlink grant scheduling a dynamic downlink transmission to a UE, identify a semi-persistent scheduling occasion allocated for a semi-persistent scheduling downlink transmission to the UE, the semi-persistent scheduling downlink transmission being associated with a same feedback process identifier as the dynamic downlink transmission, transmit either the first downlink data or no data in the semi-persistent scheduling downlink transmission based on the determining, determine that the dynamic downlink transmission is scheduled to occur after the semi-persistent scheduling downlink transmission and before an uplink feedback transmission from the UE for the semi-persistent scheduling downlink transmission, and transmit first downlink data in the dynamic downlink transmission.

The communications manager 1710 may also transmit a downlink grant scheduling a dynamic downlink transmission to a UE, identify a semi-persistent scheduling occasion allocated for a semi-persistent scheduling downlink transmission to the UE, the semi-persistent scheduling downlink transmission being associated with a same feedback process identifier as the dynamic downlink transmission, determine that the semi-persistent scheduling downlink transmission is scheduled to occur after the dynamic downlink transmission and before an uplink feedback transmission from the UE for the dynamic downlink transmission, transmit either the first downlink data or no data in the semi-persistent scheduling downlink transmission based on the determining, and transmit first downlink data in the dynamic downlink transmission.

The communications manager 1710 may also identify a semi-persistent scheduling occasion allocated for a semi-persistent scheduling downlink transmission to a UE, identify resources on which to schedule a dynamic downlink transmission to the UE, where the identified resources overlap with the semi-persistent scheduling occasion, determine that there is sufficient time for a downlink grant to be transmitted a threshold amount of time in advance of the semi-persistent scheduling occasion, and transmit the downlink grant scheduling the dynamic downlink transmission the threshold amount of time in advance of the semi-persistent scheduling occasion based on the determining.

The communications manager 1710 may also transmit a downlink grant scheduling a dynamic downlink transmission to a UE, identify a semi-persistent scheduling occasion allocated for a semi-persistent scheduling downlink transmission to the UE, the semi-persistent scheduling occasion overlapping with the scheduled dynamic downlink transmission, transmit first downlink data in the dynamic downlink transmission to the UE, and receive, from the UE, an uplink feedback transmission for the dynamic downlink transmission based on the semi-persistent scheduling occasion overlapping with the scheduled dynamic downlink transmission and whether the downlink grant is transmitted a threshold amount of time in advance of the semi-persistent scheduling occasion.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting coordination of SPS downlink transmissions and dynamic downlink transmissions).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
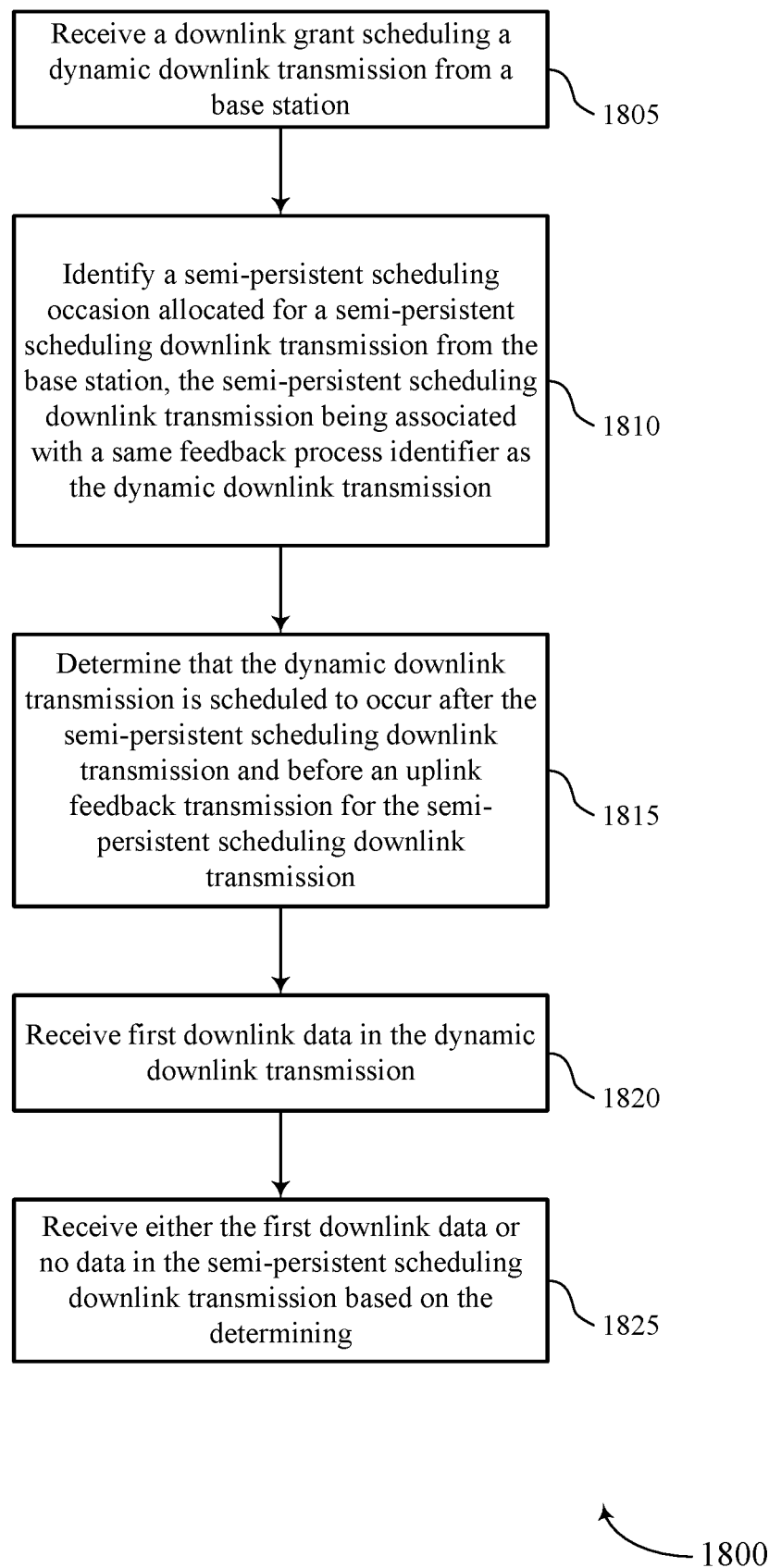
FIGS. 18 through 24 show flowcharts illustrating methods that support coordination of SPS downlink transmissions and dynamic downlink transmissions in accordance with aspects of the present disclosure.

FIG. 18 shows a flowchart illustrating a method 1800 that supports coordination of SPS downlink transmissions and dynamic downlink transmissions in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally, or alternatively, a UE may perform aspects of the functions described below using special-purpose hardware.

At 1805, the UE may receive a downlink grant scheduling a dynamic downlink transmission from a base station. The operations of 1805 may be performed according to the methods described herein. In some examples, aspects of the operations of 1805 may be performed by a grant manager as described with reference to FIGS. 10 through 13.

At 1810, the UE may identify a semi-persistent scheduling occasion allocated for a semi-persistent scheduling downlink transmission from the base station, the semi-persistent scheduling downlink transmission being associated with a same feedback process identifier as the dynamic downlink transmission. The operations of 1810 may be performed according to the methods described herein. In some examples, aspects of the operations of 1810 may be performed by a SPS manager as described with reference to FIGS. 10 through 13.

At 1815, the UE may determine that the dynamic downlink transmission is scheduled to occur after the semi-persistent scheduling downlink transmission and before an uplink feedback transmission for the semi-persistent scheduling downlink transmission. The operations of 1815 may be performed according to the methods described herein. In some examples, aspects of the operations of 1815 may be performed by a dynamic data manager as described with reference to FIGS. 10 through 13.

At 1820, the UE may receive first downlink data in the dynamic downlink transmission. The operations of 1820 may be performed according to the methods described herein. In some examples, aspects of the operations of 1820 may be performed by a dynamic data manager as described with reference to FIGS. 10 through 13.

At 1825, the UE may receive either the first downlink data or no data in the semi-persistent scheduling downlink transmission based on the determining. The operations of 1825 may be performed according to the methods described herein. In some examples, aspects of the operations of 1825 may be performed by a SPS manager as described with reference to FIGS. 10 through 13.

Figure 19:
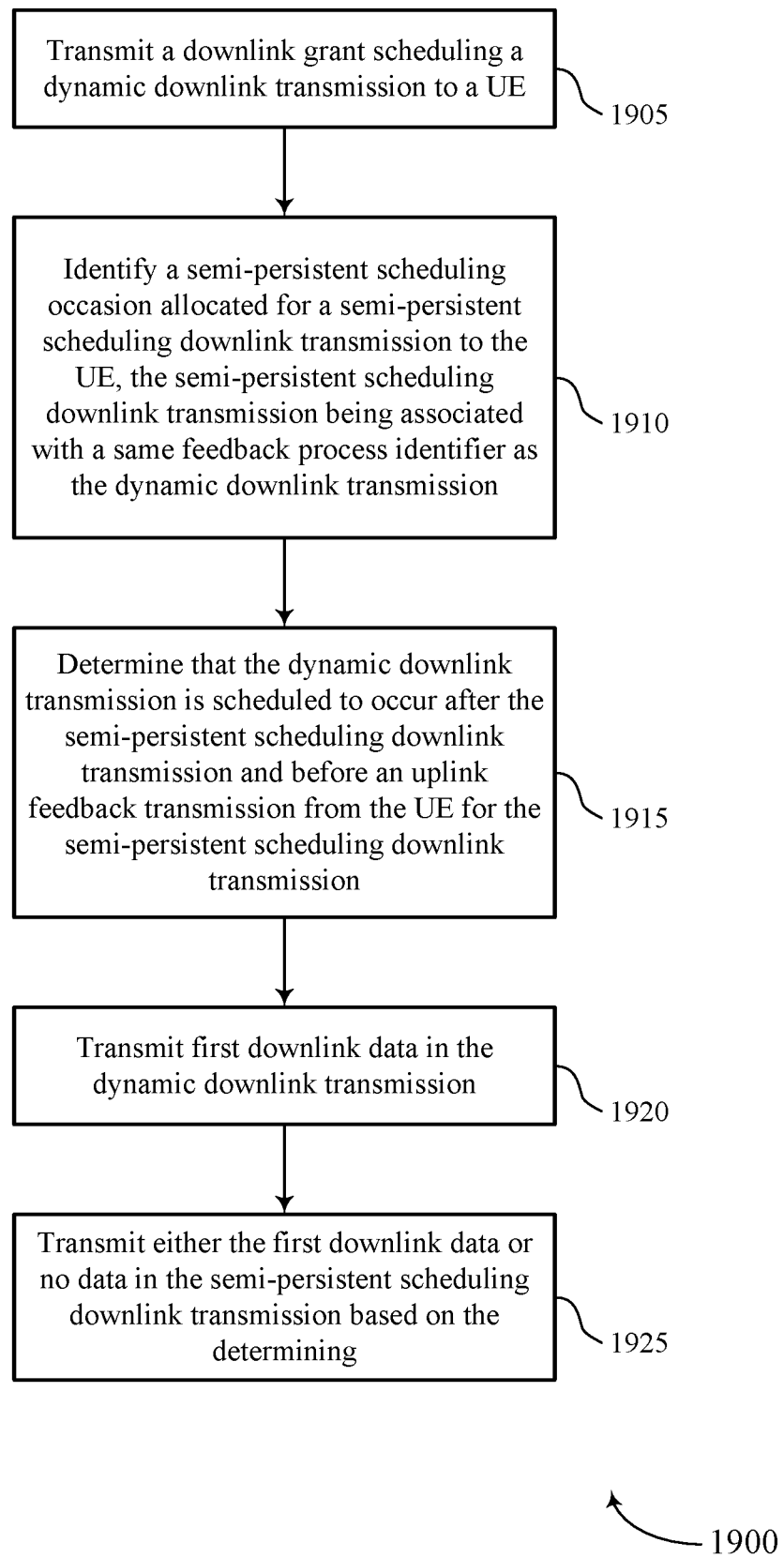

FIG. 19 shows a flowchart illustrating a method 1900 that supports coordination of SPS downlink transmissions and dynamic downlink transmissions in accordance with aspects of the present disclosure. The operations of method 1900 may be implemented by a base station 105 or its components as described herein. For example, the operations of method 1900 may be performed by a communications manager as described with reference to FIGS. 14 through 17. In some examples, a base station may execute a set of instructions to control the functional elements of the base station to perform the functions described below. Additionally, or alternatively, a base station may perform aspects of the functions described below using special-purpose hardware.

At 1905, the base station may transmit a downlink grant scheduling a dynamic downlink transmission to a UE. The operations of 1905 may be performed according to the methods described herein. In some examples, aspects of the operations of 1905 may be performed by a grant manager as described with reference to FIGS. 14 through 17.

At 1910, the base station may identify a semi-persistent scheduling occasion allocated for a semi-persistent scheduling downlink transmission to the UE, the semi-persistent scheduling downlink transmission being associated with a same feedback process identifier as the dynamic downlink transmission. The operations of 1910 may be performed according to the methods described herein. In some examples, aspects of the operations of 1910 may be performed by a SPS manager as described with reference to FIGS. 14 through 17.

At 1915, the base station may determine that the dynamic downlink transmission is scheduled to occur after the semi-persistent scheduling downlink transmission and before an uplink feedback transmission from the UE for the semi-persistent scheduling downlink transmission. The operations of 1915 may be performed according to the methods described herein. In some examples, aspects of the operations of 1915 may be performed by a dynamic data manager as described with reference to FIGS. 14 through 17.

At 1920, the base station may transmit first downlink data in the dynamic downlink transmission. The operations of 1920 may be performed according to the methods described herein. In some examples, aspects of the operations of 1920 may be performed by a dynamic data manager as described with reference to FIGS. 14 through 17.

At 1925, the base station may transmit either the first downlink data or no data in the semi-persistent scheduling downlink transmission based on the determining. The operations of 1925 may be performed according to the methods described herein. In some examples, aspects of the operations of 1925 may be performed by a SPS manager as described with reference to FIGS. 14 through 17.

Figure 20:
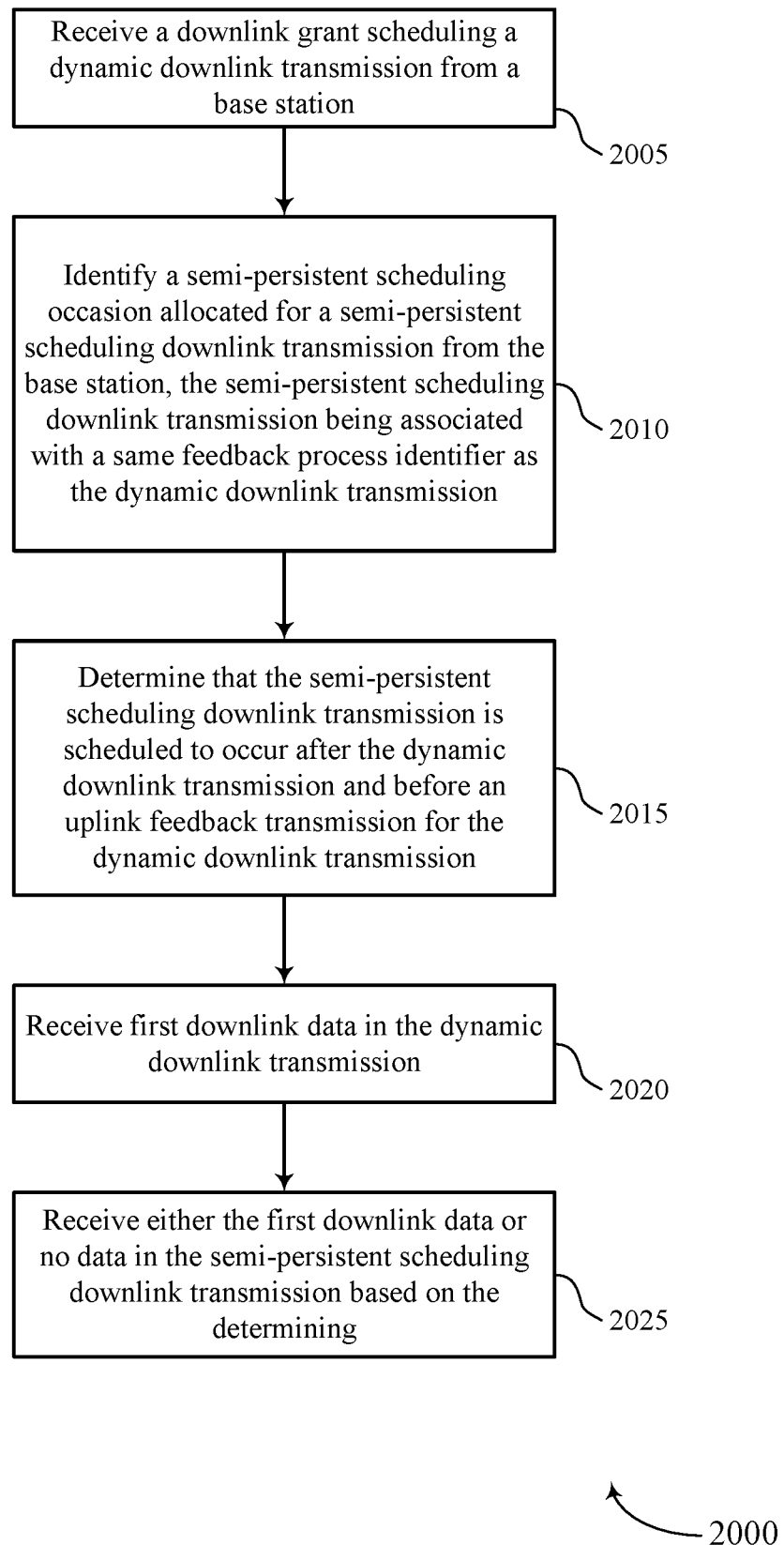

FIG. 20 shows a flowchart illustrating a method 2000 that supports coordination of SPS downlink transmissions and dynamic downlink transmissions in accordance with aspects of the present disclosure. The operations of method 2000 may be implemented by a UE 115 or its components as described herein. For example, the operations of method 2000 may be performed by a communications manager as described with reference to FIGS. 10 through 13. In some examples, a UE may execute a set of instructions to control the functional elements of the UE to perform the functions described below. Additionally, or alternatively, a UE may perform aspects of the functions described below using special-purpose hardware.

At 2005, the UE may receive a downlink grant scheduling a dynamic downlink transmission from a base station. The operations of 2005 may be performed according to the methods described herein. In some examples, aspects of the operations of 2005 may be performed by a grant manager as described with reference to FIGS. 10 through 13.

At 2010, the UE may identify a semi-persistent scheduling occasion allocated for a semi-persistent scheduling downlink transmission from the base station, the semi-persistent scheduling downlink transmission being associated with a same feedback process identifier as the dynamic downlink transmission. The operations of 2010 may be performed according to the methods described herein. In some examples, aspects of the operations of 2010 may be performed by a SPS manager as described with reference to FIGS. 10 through 13.

At 2015, the UE may determine that the semi-persistent scheduling downlink transmission is scheduled to occur after the dynamic downlink transmission and before an uplink feedback transmission for the dynamic downlink transmission. The operations of 2015 may be performed according to the methods described herein. In some examples, aspects of the operations of 2015 may be performed by a SPS manager as described with reference to FIGS. 10 through 13.

At 2020, the UE may receive first downlink data in the dynamic downlink transmission. The operations of 2020 may be performed according to the methods described herein. In some examples, aspects of the operations of 2020 may be performed by a dynamic data manager as described with reference to FIGS. 10 through 13.

At 2025, the UE may receive either the first downlink data or no data in the semi-persistent scheduling downlink transmission based on the determining. The operations of 2025 may be performed according to the methods described herein. In some examples, aspects of the operations of 2025 may be performed by a SPS manager as described with reference to FIGS. 10 through 13.

Figure 21:
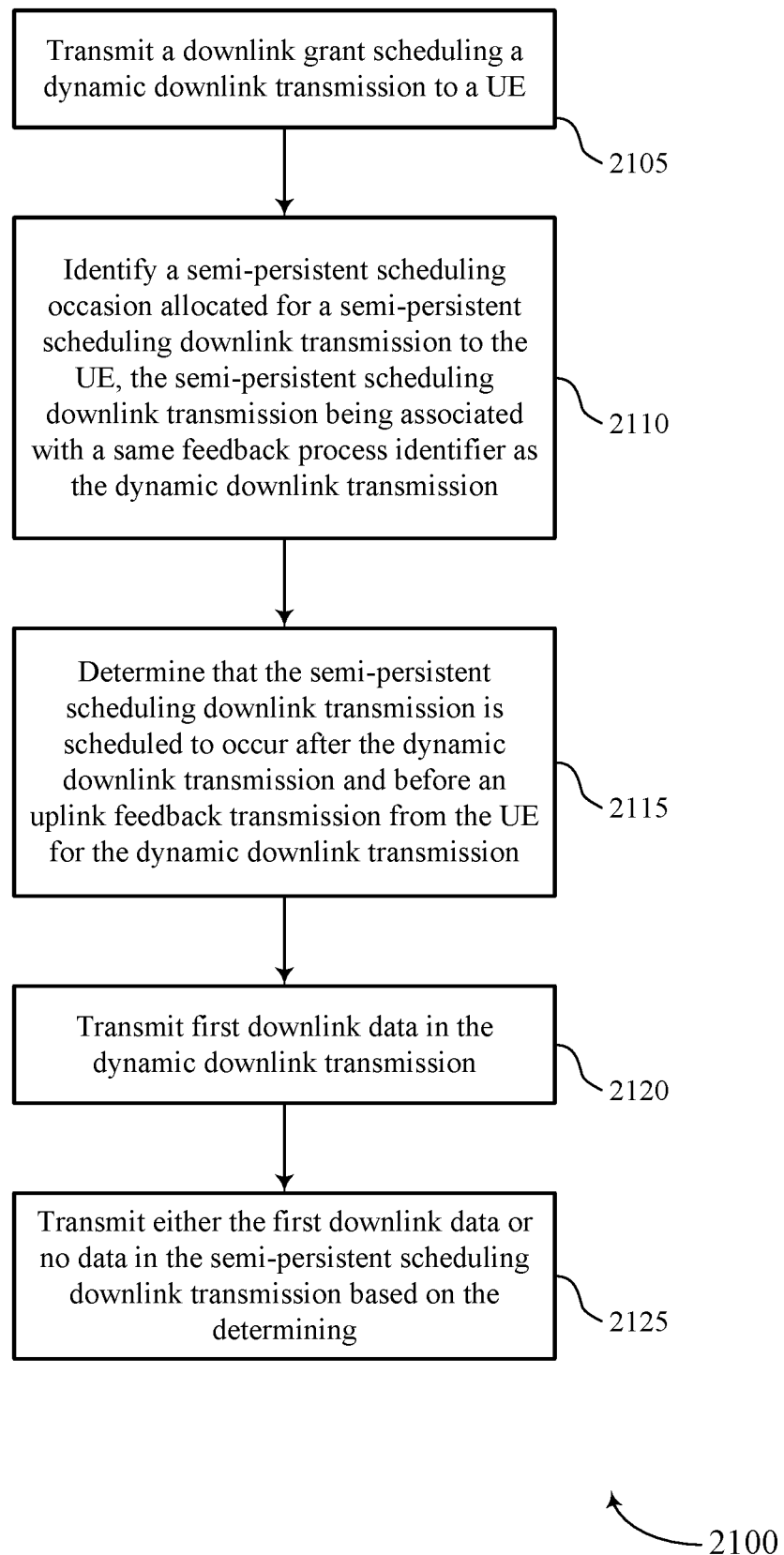

FIG. 21 shows a flowchart illustrating a method 2100 that supports coordination of SPS downlink transmissions and dynamic downlink transmissions in accordance with aspects of the present disclosure. The operations of method 2100 may be implemented by a base station 105 or its components as described herein. For example, the operations of method 2100 may be performed by a communications manager as described with reference to FIGS. 14 through 17. In some examples, a base station may execute a set of instructions to control the functional elements of the base station to perform the functions described below. Additionally, or alternatively, a base station may perform aspects of the functions described below using special-purpose hardware.

At 2105, the base station may transmit a downlink grant scheduling a dynamic downlink transmission to a UE. The operations of 2105 may be performed according to the methods described herein. In some examples, aspects of the operations of 2105 may be performed by a grant manager as described with reference to FIGS. 14 through 17.

At 2110, the base station may identify a semi-persistent scheduling occasion allocated for a semi-persistent scheduling downlink transmission to the UE, the semi-persistent scheduling downlink transmission being associated with a same feedback process identifier as the dynamic downlink transmission. The operations of 2110 may be performed according to the methods described herein. In some examples, aspects of the operations of 2110 may be performed by a SPS manager as described with reference to FIGS. 14 through 17.

At 2115, the base station may determine that the semi-persistent scheduling downlink transmission is scheduled to occur after the dynamic downlink transmission and before an uplink feedback transmission from the UE for the dynamic downlink transmission. The operations of 2115 may be performed according to the methods described herein. In some examples, aspects of the operations of 2115 may be performed by a SPS manager as described with reference to FIGS. 14 through 17.

At 2120, the base station may transmit first downlink data in the dynamic downlink transmission. The operations of 2120 may be performed according to the methods described herein. In some examples, aspects of the operations of 2120 may be performed by a dynamic data manager as described with reference to FIGS. 14 through 17.

At 2125, the base station may transmit either the first downlink data or no data in the semi-persistent scheduling downlink transmission based on the determining. The operations of 2125 may be performed according to the methods described herein. In some examples, aspects of the operations of 2125 may be performed by a SPS manager as described with reference to FIGS. 14 through 17.

Figure 22:
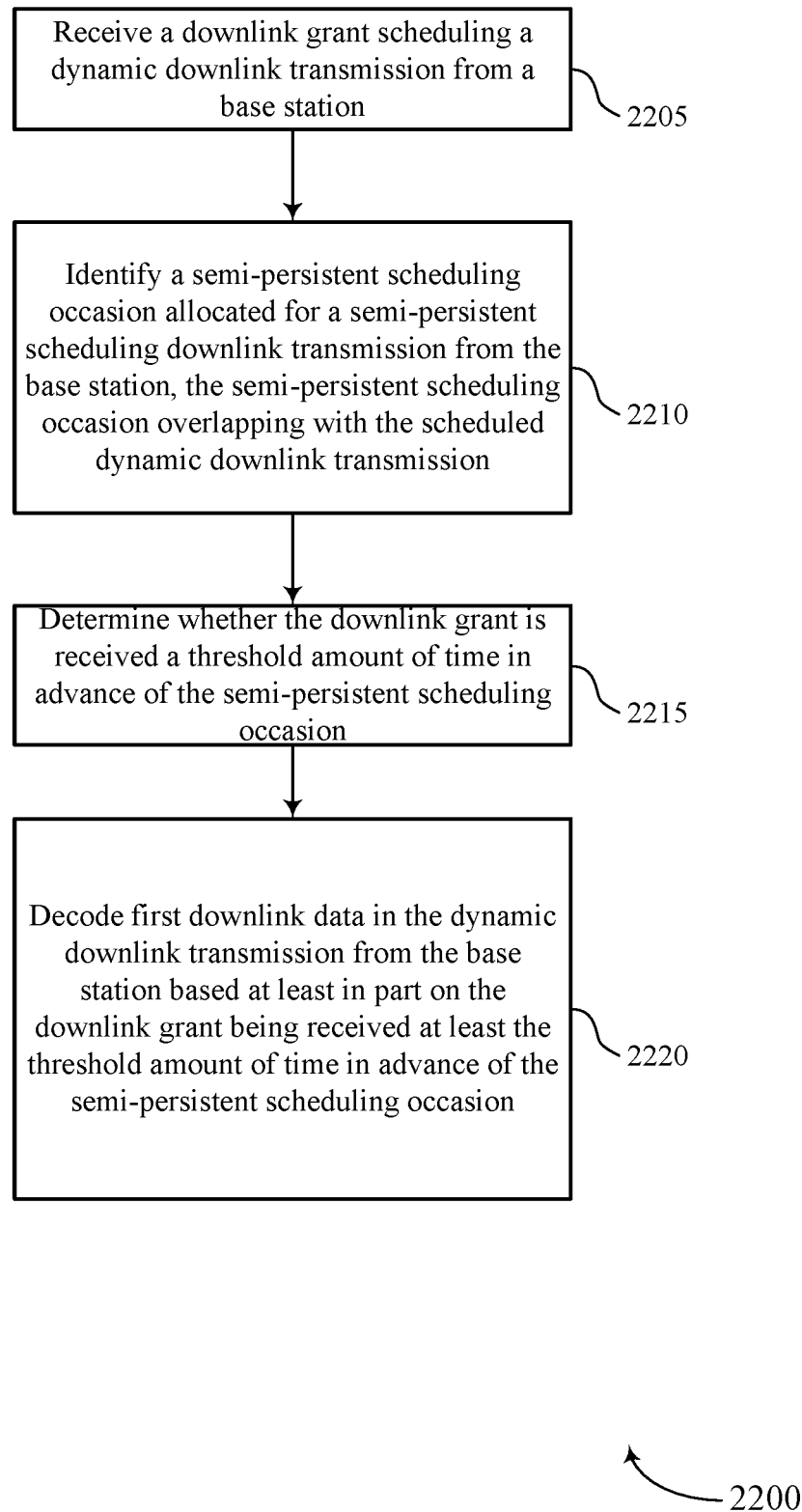

FIG. 22 shows a flowchart illustrating a method 2200 that supports coordination of SPS downlink transmissions and dynamic downlink transmissions in accordance with aspects of the present disclosure. The operations of method 2200 may be implemented by a UE 115 or its components as described herein. For example, the operations of method 2200 may be performed by a communications manager as described with reference to FIGS. 10 through 13. In some examples, a UE may execute a set of instructions to control the functional elements of the UE to perform the functions described below. Additionally, or alternatively, a UE may perform aspects of the functions described below using special-purpose hardware.

At 2205, the UE may receive a downlink grant scheduling a dynamic downlink transmission from a base station. The operations of 2205 may be performed according to the methods described herein. In some examples, aspects of the operations of 2205 may be performed by a grant manager as described with reference to FIGS. 10 through 13.

At 2210, the UE may identify a semi-persistent scheduling occasion allocated for a semi-persistent scheduling downlink transmission from the base station, the semi-persistent scheduling occasion overlapping with the scheduled dynamic downlink transmission. The operations of 2210 may be performed according to the methods described herein. In some examples, aspects of the operations of 2210 may be performed by a SPS manager as described with reference to FIGS. 10 through 13.

At 2215, the UE may determine whether the downlink grant is received a threshold amount of time in advance of the semi-persistent scheduling occasion. The operations of 2215 may be performed according to the methods described herein. In some examples, aspects of the operations of 2215 may be performed by a dynamic data manager as described with reference to FIGS. 10 through 13.

At 2220, the UE may decode first downlink data in the dynamic downlink transmission from the base station based at least in part on the downlink grant being received at least the threshold amount of time in advance of the semi-persistent scheduling occasion. The operations of 2220 may be performed according to the methods described herein. In some examples, aspects of the operations of 2220 may be performed by a dynamic data manager as described with reference to FIGS. 10 through 13.

Figure 23:
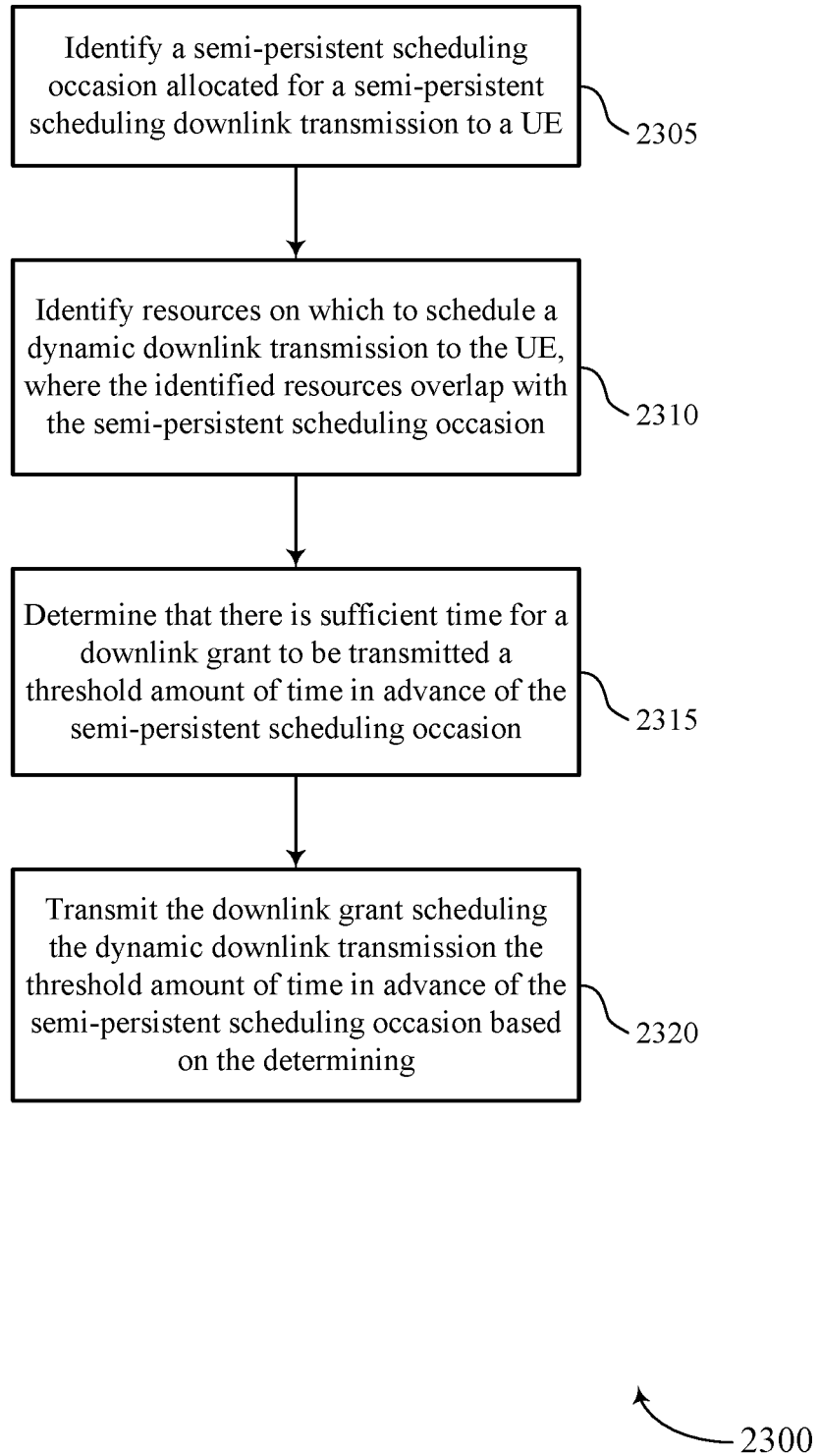

FIG. 23 shows a flowchart illustrating a method 2300 that supports coordination of SPS downlink transmissions and dynamic downlink transmissions in accordance with aspects of the present disclosure. The operations of method 2300 may be implemented by a base station 105 or its components as described herein. For example, the operations of method 2300 may be performed by a communications manager as described with reference to FIGS. 14 through 17. In some examples, a base station may execute a set of instructions to control the functional elements of the base station to perform the functions described below. Additionally, or alternatively, a base station may perform aspects of the functions described below using special-purpose hardware.

At 2305, the base station may identify a semi-persistent scheduling occasion allocated for a semi-persistent scheduling downlink transmission to a UE. The operations of 2305 may be performed according to the methods described herein. In some examples, aspects of the operations of 2305 may be performed by a SPS manager as described with reference to FIGS. 14 through 17.

At 2310, the base station may identify resources on which to schedule a dynamic downlink transmission to the UE, where the identified resources overlap with the semi-persistent scheduling occasion. The operations of 2310 may be performed according to the methods described herein. In some examples, aspects of the operations of 2310 may be performed by a dynamic data manager as described with reference to FIGS. 14 through 17.

At 2315, the base station may determine that there is sufficient time for a downlink grant to be transmitted a threshold amount of time in advance of the semi-persistent scheduling occasion. The operations of 2315 may be performed according to the methods described herein. In some examples, aspects of the operations of 2315 may be performed by a grant manager as described with reference to FIGS. 14 through 17.

At 2320, the base station may transmit the downlink grant scheduling the dynamic downlink transmission the threshold amount of time in advance of the semi-persistent scheduling occasion based on the determining. The operations of 2320 may be performed according to the methods described herein. In some examples, aspects of the operations of 2320 may be performed by a grant manager as described with reference to FIGS. 14 through 17.

Figure 24:
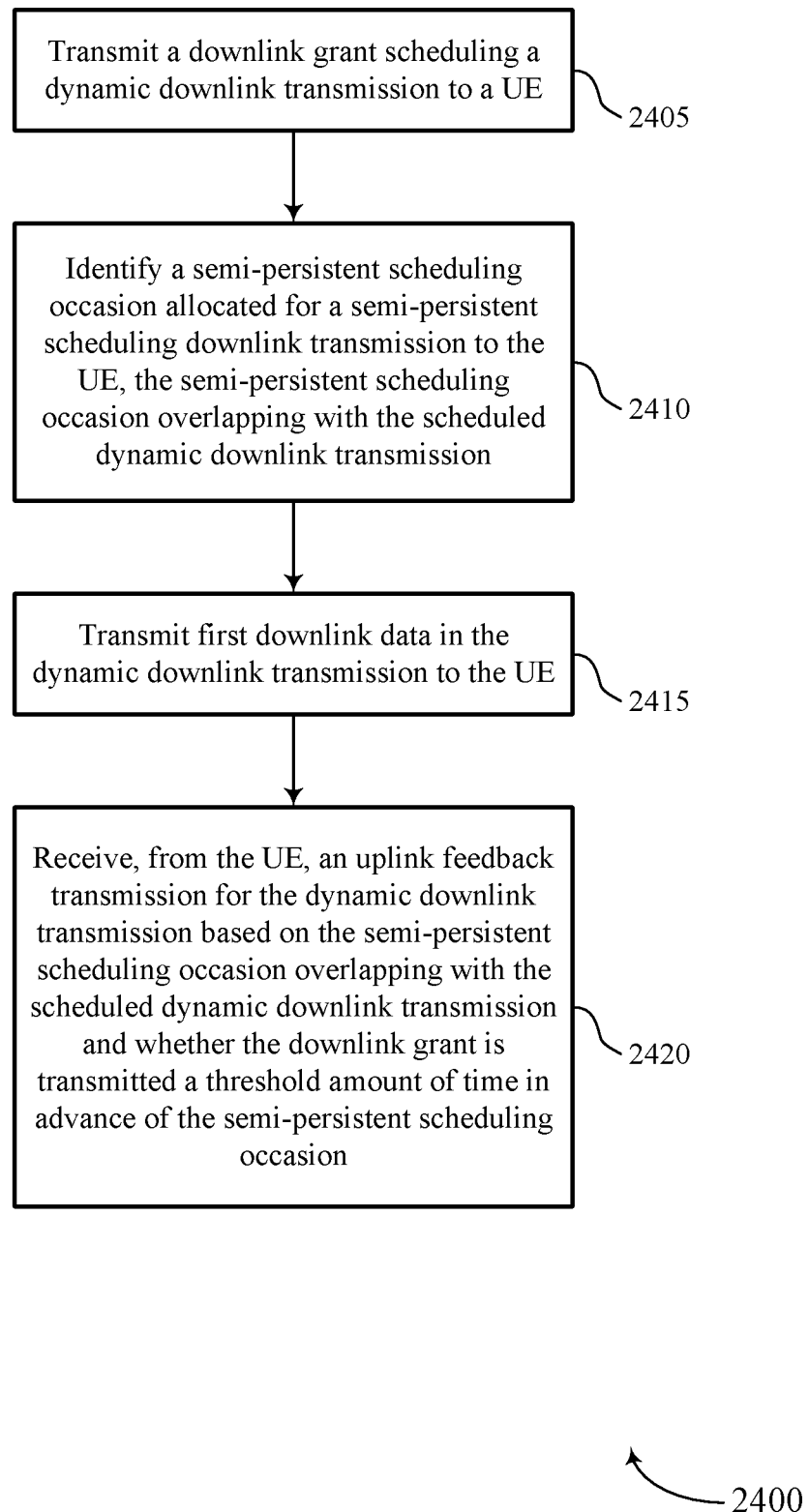

FIG. 24 shows a flowchart illustrating a method 2400 that supports coordination of SPS downlink transmissions and dynamic downlink transmissions in accordance with aspects of the present disclosure. The operations of method 2400 may be implemented by a base station 105 or its components as described herein. For example, the operations of method 2400 may be performed by a communications manager as described with reference to FIGS. 14 through 17. In some examples, a base station may execute a set of instructions to control the functional elements of the base station to perform the functions described below. Additionally, or alternatively, a base station may perform aspects of the functions described below using special-purpose hardware.

At 2405, the base station may transmit a downlink grant scheduling a dynamic downlink transmission to a UE. The operations of 2405 may be performed according to the methods described herein. In some examples, aspects of the operations of 2405 may be performed by a grant manager as described with reference to FIGS. 14 through 17.

At 2410, the base station may identify a semi-persistent scheduling occasion allocated for a semi-persistent scheduling downlink transmission to the UE, the semi-persistent scheduling occasion overlapping with the scheduled dynamic downlink transmission. The operations of 2410 may be performed according to the methods described herein. In some examples, aspects of the operations of 2410 may be performed by a SPS manager as described with reference to FIGS. 14 through 17.

At 2415, the base station may transmit first downlink data in the dynamic downlink transmission to the UE. The operations of 2415 may be performed according to the methods described herein. In some examples, aspects of the operations of 2415 may be performed by a dynamic data manager as described with reference to FIGS. 14 through 17.

At 2420, the base station may receive, from the UE, an uplink feedback transmission for the dynamic downlink transmission based on the semi-persistent scheduling occasion overlapping with the scheduled dynamic downlink transmission and whether the downlink grant is transmitted a threshold amount of time in advance of the semi-persistent scheduling occasion. The operations of 2420 may be performed according to the methods described herein. In some examples, aspects of the operations of 2420 may be performed by a feedback manager as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Example 1: A method for wireless communication at a user equipment (UE), comprising: receiving a downlink grant scheduling a dynamic downlink transmission from a base station; identifying a semi-persistent scheduling occasion allocated for a semi-persistent scheduling downlink transmission from the base station, the semi-persistent scheduling occasion overlapping with the scheduled dynamic downlink transmission; determining whether the downlink grant is received a threshold amount of time in advance of the semi-persistent scheduling occasion; and decoding first downlink data in the dynamic downlink transmission from the base station based at least in part on the downlink grant being received at least the threshold amount of time in advance of the semi-persistent scheduling occasion.

Example 2: The method of example 1, comprising: transmitting an uplink feedback transmission for the dynamic downlink transmission based at least in part on the semi-persistent scheduling occasion overlapping with the scheduled dynamic downlink transmission Example 3: The method of any of examples 1 or 2, wherein the downlink grant is received less than the threshold amount of time in advance of the semi-persistent scheduling occasion, the method further comprising: transmitting the uplink feedback transmission for the dynamic downlink transmission after a processing time (N) plus an additional amount of time (d).

Example 4: The method of any of examples 1 or 2, wherein the downlink grant is received at least the threshold amount of time in advance of the semi-persistent scheduling occasion, the method further comprising: transmitting the uplink feedback transmission for the dynamic downlink transmission after a processing time (N).

Example 5: The method of example 1, wherein determining whether the downlink grant is received a threshold amount of time in advance of the semi-persistent scheduling occasion further comprises: determining whether a physical downlink control channel (PDCCH) carrying the downlink grant ends the threshold amount of time in advance to a start of the semi-persistent scheduling occasion.

Example 6: The method of example 1, wherein the threshold amount of time is based at least in part on a processing capability of the UE.

Example 7: A method for wireless communication at a base station, comprising: identifying a semi-persistent scheduling occasion allocated for a semi-persistent scheduling downlink transmission to a user equipment (UE); identifying resources on which to schedule a dynamic downlink transmission to the UE, wherein the identified resources overlap with the semi-persistent scheduling occasion; determining that there is sufficient time for a downlink grant to be transmitted a threshold amount of time in advance of the semi-persistent scheduling occasion; and transmitting the downlink grant scheduling the dynamic downlink transmission the threshold amount of time in advance of the semi-persistent scheduling occasion based at least in part on the determining.

Example 8: The method of example 7, wherein the semi-persistent scheduling downlink transmission is associated with a same feedback process identifier as the dynamic downlink transmission.

Example 9: The method of example 7, wherein the semi-persistent scheduling downlink transmission is associated with a different feedback process identifier from the dynamic downlink transmission, the method further comprising: transmitting the semi-persistent scheduling downlink transmission and the dynamic downlink transmission on the overlapping resources.

Example 10: The method of example 7, wherein the threshold amount of time is based at least in part on a processing capability of the UE.

Example 11: A method for wireless communication at a user equipment (UE), comprising: receiving a downlink grant scheduling a dynamic downlink transmission from a base station; identifying a semi-persistent scheduling occasion allocated for a semi-persistent scheduling downlink transmission from the base station, the semi-persistent scheduling downlink transmission being associated with a same feedback process identifier as the dynamic downlink transmission; determining that the dynamic downlink transmission is scheduled to occur after the semi-persistent scheduling downlink transmission and before an uplink feedback transmission for the semi-persistent scheduling downlink transmission; receiving first downlink data in the dynamic downlink transmission; and receiving either the first downlink data or no data in the semi-persistent scheduling downlink transmission based at least in part on the determining.

Example 12: The method of example 11, wherein no data is received in the semi-persistent scheduling downlink transmission, the method further comprising: avoiding monitoring for downlink data in the semi-persistent scheduling occasion.

Example 13: The method of any of examples 11 or 12, wherein avoiding monitoring for downlink data in the semi-persistent scheduling occasion comprises: starting a timer associated with the feedback process identifier upon receiving the downlink grant for the dynamic downlink transmission; and avoiding monitoring for semi-persistent scheduling downlink transmissions associated with the same feedback process identifier as the dynamic downlink transmission for the duration of the timer.

Example 14: The method of example 11, wherein determining that the dynamic downlink transmission is scheduled to occur after the semi-persistent scheduling downlink transmission and before the uplink feedback transmission for the semi-persistent scheduling downlink transmission comprises: determining that the semi-persistent scheduling occasion overlaps in time with the downlink grant or that the semi-persistent scheduling occasion is between the downlink grant and the dynamic downlink transmission.

Example 15: The method of example 11, further comprising: transmitting an uplink feedback transmission for the dynamic downlink transmission.

Example 16: The method of example 11, wherein the uplink feedback transmission comprises a single uplink feedback transmission for the semi-persistent scheduling downlink transmission and the dynamic downlink transmission, the method further comprising: transmitting the single uplink feedback transmission for the semi-persistent scheduling downlink transmission and the dynamic downlink transmission.

Example 17: The method of any of examples 11 or 16, wherein the single uplink feedback transmission for the semi-persistent scheduling downlink transmission and the dynamic downlink transmission is transmitted on an uplink control channel allocated in the downlink grant.

Example 18: The method of any of examples 11 or 16, wherein the single uplink feedback transmission for the semi-persistent scheduling downlink transmission and the dynamic downlink transmission comprises individual feedback for each of the semi-persistent scheduling downlink transmission and the dynamic downlink transmission, combined feedback for the semi-persistent scheduling downlink transmission and the dynamic downlink transmission, or a combination thereof.

Example 19: A method for wireless communication at a user equipment (UE), comprising: receiving a downlink grant scheduling a dynamic downlink transmission from a base station; identifying a semi-persistent scheduling occasion allocated for a semi-persistent scheduling downlink transmission from the base station, the semi-persistent scheduling downlink transmission being associated with a same feedback process identifier as the dynamic downlink transmission; determining that the semi-persistent scheduling downlink transmission is scheduled to occur after the dynamic downlink transmission and before an uplink feedback transmission for the dynamic downlink transmission; receiving first downlink data in the dynamic downlink transmission; and receiving either the first downlink data or no data in the semi-persistent scheduling downlink transmission based at least in part on the determining.

Example 20: The method of example 19, wherein no data is received in the semi-persistent scheduling downlink transmission, the method further comprising: avoiding monitoring for downlink data in the semi-persistent scheduling occasion.

Example 21: The method of any of examples 19 or 20, wherein avoiding monitoring for downlink data in the semi-persistent scheduling occasion comprises: starting a timer associated with the hybrid automatic repeat request identifier upon receiving the downlink grant for the dynamic downlink transmission; and avoiding monitoring for semi-persistent scheduling downlink transmissions associated with the same hybrid automatic repeat request identifier as the dynamic downlink transmission for the duration of the timer.

Example 22: The method of example 19, further comprising: transmitting an uplink feedback transmission or the semi-persistent scheduling downlink transmission.

Example 23: The method of example 19, wherein the uplink feedback transmission comprises a single uplink feedback transmission for the dynamic downlink transmission and the semi-persistent scheduling downlink transmission, the method further comprising: transmitting the single uplink feedback transmission for the dynamic downlink transmission and the semi-persistent scheduling downlink transmission.

Example 24: The method of any of examples 19 or 23, wherein the single uplink feedback transmission for the dynamic downlink transmission and the semi-persistent scheduling downlink transmission is transmitted on an uplink control channel allocated in the downlink grant.

Example 25: The method of any of examples 19 or 23, wherein the single uplink feedback transmission for the semi-persistent scheduling downlink transmission and the dynamic downlink transmission comprises individual feedback for each of the dynamic downlink transmission and the semi-persistent scheduling downlink transmission, combined feedback for the dynamic downlink transmission and the semi-persistent scheduling downlink transmission, or a combination thereof.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a downlink grant scheduling a dynamic downlink transmission from a base station;
    identifying a semi-persistent scheduling occasion allocated for a semi-persistent scheduling downlink transmission from the base station, the semi-persistent scheduling occasion overlapping with the scheduled dynamic downlink transmission;

determining whether the downlink grant is received a threshold amount of time in advance of the semi-persistent scheduling occasion; and decoding first downlink data in the dynamic downlink transmission from the base station based at least in part on the downlink grant being received at least the threshold amount of time in advance of the semi-persistent scheduling occasion.

2. The method of claim 1, further comprising:

transmitting an uplink feedback transmission for the dynamic downlink transmission based at least in part on the semi-persistent scheduling occasion overlapping with the scheduled dynamic downlink transmission.

3. The method of claim 2, wherein the downlink grant is received less than the threshold amount of time in advance of the semi-persistent scheduling occasion, the method further comprising:

transmitting the uplink feedback transmission for the dynamic downlink transmission after a processing time (N) plus an additional amount of time (d).

4. The method of claim 2, wherein the downlink grant is received at least the threshold amount of time in advance of the semi-persistent scheduling occasion, the method further comprising:

transmitting the uplink feedback transmission for the dynamic downlink transmission after a processing time (N).

5. The method of claim 1, wherein determining whether the downlink grant is received a threshold amount of time in advance of the semi-persistent scheduling occasion further comprises:

determining whether a physical downlink control channel (PDCCH) carrying the downlink grant ends the threshold amount of time in advance to a start of the semi-persistent scheduling occasion.

6. The method of claim 1, wherein the threshold amount of time is based at least in part on a processing capability of the UE.

7. A method for wireless communication at a base station, comprising:

identifying a semi-persistent scheduling occasion allocated for a semi-persistent scheduling downlink transmission to a user equipment (UE);

identifying resources on which to schedule a dynamic downlink transmission to the UE, wherein the identified resources overlap with the semi-persistent scheduling occasion;

determining that there is sufficient time for a downlink grant to be transmitted a threshold amount of time in advance of the semi-persistent scheduling occasion; and transmitting the downlink grant scheduling the dynamic downlink transmission the threshold amount of time in advance of the semi-persistent scheduling occasion based at least in part on the determining.

8. The method of claim 7, wherein the semi-persistent scheduling downlink transmission is associated with a same feedback process identifier as the dynamic downlink transmission.

9. The method of claim 7, wherein the semi-persistent scheduling downlink transmission is associated with a different feedback process identifier from the dynamic downlink transmission, the method further comprising:

transmitting the semi-persistent scheduling downlink transmission and the dynamic downlink transmission on the overlapping resources.

10. The method of claim 7, wherein the threshold amount of time is based at least in part on a processing capability of the UE.

11. A method for wireless communication at a user equipment (UE), comprising:

receiving a downlink grant scheduling a dynamic downlink transmission from a base station;

identifying a semi-persistent scheduling occasion allocated for a semi-persistent scheduling downlink transmission from the base station, the semi-persistent scheduling downlink transmission being associated with a same feedback process identifier as the dynamic downlink transmission;

determining that the dynamic downlink transmission is scheduled to occur after the semi-persistent scheduling downlink transmission and before an uplink feedback transmission for the semi-persistent scheduling downlink transmission;

receiving first downlink data in the dynamic downlink transmission; and receiving either the first downlink data or no data in the semi-persistent scheduling downlink transmission based at least in part on the determining.

12. The method of claim 11, wherein no data is received in the semi-persistent scheduling downlink transmission, the method further comprising:

avoiding monitoring for downlink data in the semi-persistent scheduling occasion.

13. The method of claim 12, wherein avoiding monitoring for downlink data in the semi-persistent scheduling occasion comprises:

starting a timer associated with a feedback process identifier upon receiving the downlink grant for the dynamic downlink transmission; and avoiding monitoring for semi-persistent scheduling downlink transmissions associated with the same feedback process identifier as the dynamic downlink transmission for a duration of the timer.

14. The method of claim 11, wherein determining that the dynamic downlink transmission is scheduled to occur after the semi-persistent scheduling downlink transmission and before the uplink feedback transmission for the semi-persistent scheduling downlink transmission comprises:

determining that the semi-persistent scheduling occasion overlaps in time with the downlink grant or that the semi-persistent scheduling occasion is between the downlink grant and the dynamic downlink transmission.

15. The method of claim 11, further comprising:

transmitting an uplink feedback transmission for the dynamic downlink transmission.

16. The method of claim 11, wherein the uplink feedback transmission comprises a single uplink feedback transmission for the semi-persistent scheduling downlink transmission and the dynamic downlink transmission, the method further comprising:

transmitting the single uplink feedback transmission for the semi-persistent scheduling downlink transmission and the dynamic downlink transmission.

17. The method of claim 16, wherein the single uplink feedback transmission for the semi-persistent scheduling downlink transmission and the dynamic downlink transmission is transmitted on an uplink control channel allocated in the downlink grant.

18. The method of claim 16, wherein the single uplink feedback transmission for the semi-persistent scheduling downlink transmission and the dynamic downlink transmission comprises individual feedback for each of the semi-persistent scheduling downlink transmission and the dynamic downlink transmission, combined feedback for the semi-persistent scheduling downlink transmission and the dynamic downlink transmission, or a combination thereof.

19. A method for wireless communication at a user equipment (UE), comprising:
    receiving a downlink grant scheduling a dynamic downlink transmission from a base station;
    identifying a semi-persistent scheduling occasion allocated for a semi-persistent scheduling downlink transmission from the base station, the semi-persistent scheduling downlink transmission being associated with a same feedback process identifier as the dynamic downlink transmission;
    determining that the semi-persistent scheduling downlink transmission is scheduled to occur after the dynamic downlink transmission and before an uplink feedback transmission for the dynamic downlink transmission;
    receiving first downlink data in the dynamic downlink transmission; and
    receiving either the first downlink data or no data in the semi-persistent scheduling downlink transmission based at least in part on the determining.

20. The method of claim 19, wherein no data is received in the semi-persistent scheduling downlink transmission, the method further comprising:
    avoiding monitoring for downlink data in the semi-persistent scheduling occasion.

21. The method of claim 20, wherein avoiding monitoring for downlink data in the semi-persistent scheduling occasion comprises:
    starting a timer associated with a hybrid automatic repeat request identifier upon receiving the downlink grant for the dynamic downlink transmission; and
    avoiding monitoring for semi-persistent scheduling downlink transmissions associated with the same hybrid automatic repeat request identifier as the dynamic downlink transmission for a duration of the timer.

22. The method of claim 19, further comprising:
    transmitting an uplink feedback transmission or the semi-persistent scheduling downlink transmission.

23. The method of claim 19, wherein the uplink feedback transmission comprises a single uplink feedback transmission for the dynamic downlink transmission and the semi-persistent scheduling downlink transmission, the method further comprising:
    transmitting the single uplink feedback transmission for the dynamic downlink transmission and the semi-persistent scheduling downlink transmission.

24. The method of claim 23, wherein the single uplink feedback transmission for the dynamic downlink transmission and the semi-persistent scheduling downlink transmission is transmitted on an uplink control channel allocated in the downlink grant.

25. The method of claim 23, wherein the single uplink feedback transmission for the semi-persistent scheduling downlink transmission and the dynamic downlink transmission comprises individual feedback for each of the dynamic downlink transmission and the semi-persistent scheduling downlink transmission, combined feedback for the dynamic downlink transmission and the semi-persistent scheduling downlink transmission, or a combination thereof.

26. An apparatus for wireless communication, comprising:
    a processor;
    memory in electronic communication with the processor; and
    instructions stored in the memory and operable, when executed by the processor, to cause the apparatus to:
        receive a downlink grant scheduling a dynamic downlink transmission from a base station;
        identify a semi-persistent scheduling occasion allocated for a semi-persistent scheduling downlink transmission from the base station, the semi-persistent scheduling occasion overlapping with the scheduled dynamic downlink transmission;
        determine whether the downlink grant is received a threshold amount of time in advance of the semi-persistent scheduling occasion; and
        decode first downlink data in the dynamic downlink transmission from the base station based at least in part on the downlink grant being received at least the threshold amount of time in advance of the semi-persistent scheduling occasion.

27. An apparatus for wireless communication, comprising:
    a processor;
    memory in electronic communication with the processor; and
    instructions stored in the memory and operable, when executed by the processor, to cause the apparatus to:
        identify a semi-persistent scheduling occasion allocated for a semi-persistent scheduling downlink transmission to a user equipment (UE);
        identify resources on which to schedule a dynamic downlink transmission to the UE, wherein the identified resources overlap with the semi-persistent scheduling occasion;
        determine that there is sufficient time for a downlink grant to be transmitted a threshold amount of time in advance of the semi-persistent scheduling occasion; and
        transmit the downlink grant scheduling the dynamic downlink transmission the threshold amount of time in advance of the semi-persistent scheduling occasion based at least in part on the determining.

28. An apparatus for wireless communication, comprising:
    a processor;
    memory in electronic communication with the processor; and
    instructions stored in the memory and operable, when executed by the processor, to cause the apparatus to:
        receive a downlink grant scheduling a dynamic downlink transmission from a base station;
        identify a semi-persistent scheduling occasion allocated for a semi-persistent scheduling downlink transmission from the base station, the semi-persistent scheduling downlink transmission being associated with a same feedback process identifier as the dynamic downlink transmission;
        determine that the dynamic downlink transmission is scheduled to occur after the semi-persistent scheduling downlink transmission and before an uplink feedback transmission for the semi-persistent scheduling downlink transmission;
        receive first downlink data in the dynamic downlink transmission; and receive either the first downlink data or no data in the semi-persistent scheduling downlink transmission based at least in part on the determining.

29. An apparatus for wireless communication, comprising:
   a processor;
   memory in electronic communication with the processor; and
   instructions stored in the memory and operable, when executed by the processor, to cause the apparatus to:
      receive a downlink grant scheduling a dynamic downlink transmission from a base station;
      identify a semi-persistent scheduling occasion allocated for a semi-persistent scheduling downlink transmission from the base station, the semi-persistent scheduling downlink transmission being associated with a same feedback process identifier as the dynamic downlink transmission;
      determine that the semi-persistent scheduling downlink transmission is scheduled to occur after the dynamic downlink transmission and before an uplink feedback transmission for the dynamic downlink transmission;
      receive first downlink data in the dynamic downlink transmission; and
      receive either the first downlink data or no data in the semi-persistent scheduling downlink transmission based at least in part on the determining.

\* \* \* \* \*